United States Patent
Thornton et al.

(10) Patent No.: US 6,665,293 B2
(45) Date of Patent: Dec. 16, 2003

(54) APPLICATION FOR A VOICE OVER IP (VOIP) TELEPHONY GATEWAY AND METHODS FOR USE THEREIN

(75) Inventors: Timothy R. Thornton, Brick, NJ (US); Rajiv Bhatia, Marlboro, NJ (US); Ki Choon Suh, Middletown, NJ (US); Cheng Chen, Holmdel, NJ (US)

(73) Assignee: Quintum Technologies, Inc., Eatontown, NJ (US)

( * ) Notice: Subject to any disclaimer, the term of this patent is extended or adjusted under 35 U.S.C. 154(b) by 97 days.

(21) Appl. No.: 09/961,105

(22) Filed: Sep. 21, 2001

(65) Prior Publication Data

US 2002/0101860 A1 Aug. 1, 2002

Related U.S. Application Data

(62) Division of application No. 09/437,644, filed on Nov. 10, 1999.

(51) Int. Cl.$^7$ .............................. H04L 12/66; H04J 3/16
(52) U.S. Cl. ................... 370/352; 370/401; 370/467
(58) Field of Search ................................ 370/352, 401, 370/353–357, 467, 466, 230, 235; 379/88.17, 220.01, 219

(56) References Cited

U.S. PATENT DOCUMENTS

| | | | |
|---|---|---|---|
| 5,838,683 A | 11/1998 | Corley et al. | 370/408 |
| 5,875,234 A | 2/1999 | Clayton et al. | 379/93.05 |
| 6,026,087 A | 2/2000 | Mirashrafi | 370/389 |
| 6,064,653 A | 5/2000 | Farris | 370/237 |
| 6,185,204 B1 | 2/2001 | Voit | 370/352 |
| 6,430,176 B1 * | 8/2002 | Christie, IV | 370/355 |
| 6,434,139 B1 * | 8/2002 | Liu et al. | 370/352 |
| 6,470,020 B1 * | 10/2002 | Barker et al. | 370/401 |

FOREIGN PATENT DOCUMENTS

| | | |
|---|---|---|
| EP | 0 848 560 | 6/1998 |
| WO | WO 99/05590 | 2/1999 |

OTHER PUBLICATIONS

A. Cray, "IP PBXs: Open Questions, Net managers trying to escape the tyranny of traditional PBX vendore have a cheaper option. But can they really trust the IP alternative?", Data Communications, Mar. 1999, pp. 69–70, 72, 74, 76, 78, 80, 82, 83.
"Star Vox: Solutions: Multi-site Network Telephony Solution", downloaded on Jul. 20, 1999 from http://www.starvox.com/solutions/sol_msnt.html (1 pp).
"Star Vox: Market Trends: Migration of Voice to Data Network", downloaded on Jul. 20, 1999 from http://www-.starvox.com/trends/tds_mvdn.html (1 pp).
"Nortel Networks Introduces Next Generation Internet Telephony for Enterprises, Brings Together the Worlds of Telephony and Data", downloaded on Jul. 20, 1999, from http://www.nortelnetworks.com/corporate/.../ 6_8_9999393Enterprise_Internet_Telephony.html (5 pps.).

(List continued on next page.)

*Primary Examiner*—Duc Ho
(74) *Attorney, Agent, or Firm*—Michaelson & Wallace; Peter L. Michaelson

(57) ABSTRACT

Apparatus, and accompanying methods for use therein, for a telephony gateway intended for use, e.g., paired use, at opposite ends of a data network connection, in conjunction with at each end, e.g., a private branch exchange (PBX) for automatically routing telephone calls, e.g., voice, data and facsimile, between two peer PBXs over either a public switched telephone network (PSTN) or a data network, based on, among other aspects, cost considerations for handling each such call and called directory numbers, monitoring quality of service (QoS) then provided through the data network and switching ("auto-switching") such calls back and forth between the PSTN and the data network, as needed, in response to dynamic changes in the QoS such that the call is carried over a connection then providing a sufficient QoS.

28 Claims, 26 Drawing Sheets

OTHER PUBLICATIONS

"Nortel Networks: CALA Press Room: Key Corporate News", downloaded on Jul. 20, 1999 from http://www.nortelnetworks.com/corporate/global/cala/press/keynews/entJun. 99 eng.html (5 pps.).

"Nortel Networks: News & Event: Inca: Internet Telephony Portfolio", downloaded on Jul. 20, 1999 from http://www.nortelnetworks.com/corporate/events/inca/internet_telephony_portfolio.html (3 pps.).

"NetPhone IPBX, Intranet PBX and IP Telephony Gateway, Features and Benefits" (2 pps.).

"NetPhone, Communications Servers, The Standard for Small to Medium Sized Businesses" (4 pps.).

"NetPhone, NetPhone Connect, IP Telephony Gateway" (2 pps.).

"Cisco—Cisco IP Telephony", downloaded Mar. 31, 1999 from http://www.cisco.com/warp/public/744/ (1 pp.).

"Cisco—Cisco IP Telephony: Product Literature", downloaded Mar. 31, 1999 from http://www.cisco.com/warp/public/744/literature.shtml (2 pps.).

"Cisco IP Telephone Model 12 SP+", downloaded Mar. 31, 1999 from http://www.cisco.com/warp/public/744/ipphone/sp12p ds.htm (3 pps.).

"Cisco IP Telephone Model 30 VIP", downloaded Mar. 31, 1999 from http://www.cisco.com/warp/public/744/ipphone/phone_ds.htm (3 pps.).

"Cisco CallManager 2.2 and Integrated Voice Applications", downloaded Mar. 31, 1999 from http://www.cisco.com/warp/public/744/callmgr/callm.ds.htm (6 pps.).

"Cisco Access Analog Station Gateways—Models AS-2,4, 8", downloaded Mar. 31, 1999 from http://www.cisco.com/warp/public/744/gateway/as248 ds.htm (2 pps.).

"Cisco Access Analog Trunk Gateways—Models AT-2,4, 8", downloaded Mar. 31, 1999 from http://www.cisco.com/warp/public/744/gateway/at248 ds.htm (3 pps.).

"Cisco Access Digital Gateway (T1 Rate)—Model DT-24", downloaded Mar. 31, 1999 from http://www.cisco.com/warp/public/744/gateway/dt24 ds.htm (3 pps.).

"Enterprise IP Packet Telephony Solutions Guide", downloaded Mar. 31, 1999 from http://www.cisco.com/warp/public/744/iptel wp.htm (19 pps.).

"Control Protocol for Multimedia Communication, Series H: Audiovisual and Multimedia Systems Infrastructure of Audiovisual Services—Communication Procedures", ITU–T Recommendation H.245, ITU–T Telecommunication Standardization Sector of ITU, International Telecommunication Union, Jul. 1997 (219 pps.).

"Packet–based Multimedia Communications Systems, Series H: Audiovisual and Multimedia Systems Infrastructure of Audiovisual Services", ITU–T Recommendation H.245, ITU–T Telecommunication Standardization Sector of ITU, International Telecommunication Union, Version 3, May 1999 (131 pps.).

Communication Between Administrative Domains, H.225 Annex G Draft Decision, International Telecommunication Union, Santiago, Chile, May 17–18, 1999 (49 pps.).

Draft H.225.0 Version 3, International Telecommunication Union, Santiago, Chile, May 18–28, 1999 (161 pps.).

* cited by examiner

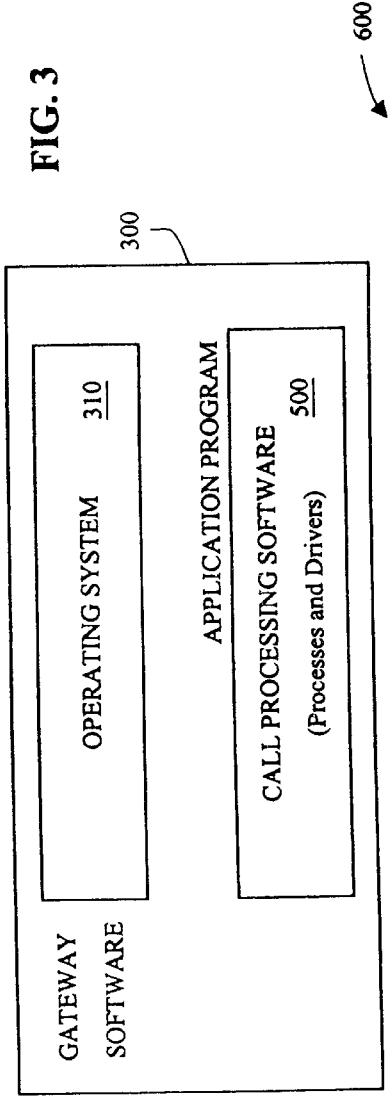

| Process(es) | Relative Priority | |
|---|---|---|
| TCP/IP 535, CM 505 | 255 | Highest execution priority |
| VPH 517 | 200 | This process is in the data path for packetized voice transfer between the T1/E1 trunks (via the DSPs) and Ethernet. Hence, a high execution priority is needed to minimize delay associated with VoIP packets. |
| GK 700, BE 900 | 150 | Gatekeeper and border element processes |
| CH 560, T1AB 575, P.323 553, Q.931 577, Q.921 572 | 100 | These processes are related to call control and signaling. |
| Others | 50 | These processes are mostly related to configuration, network management, etc. |
| IDLE (502) | 10 | This priority should be lower than that for all other processes but higher than O/S internal idle process. |

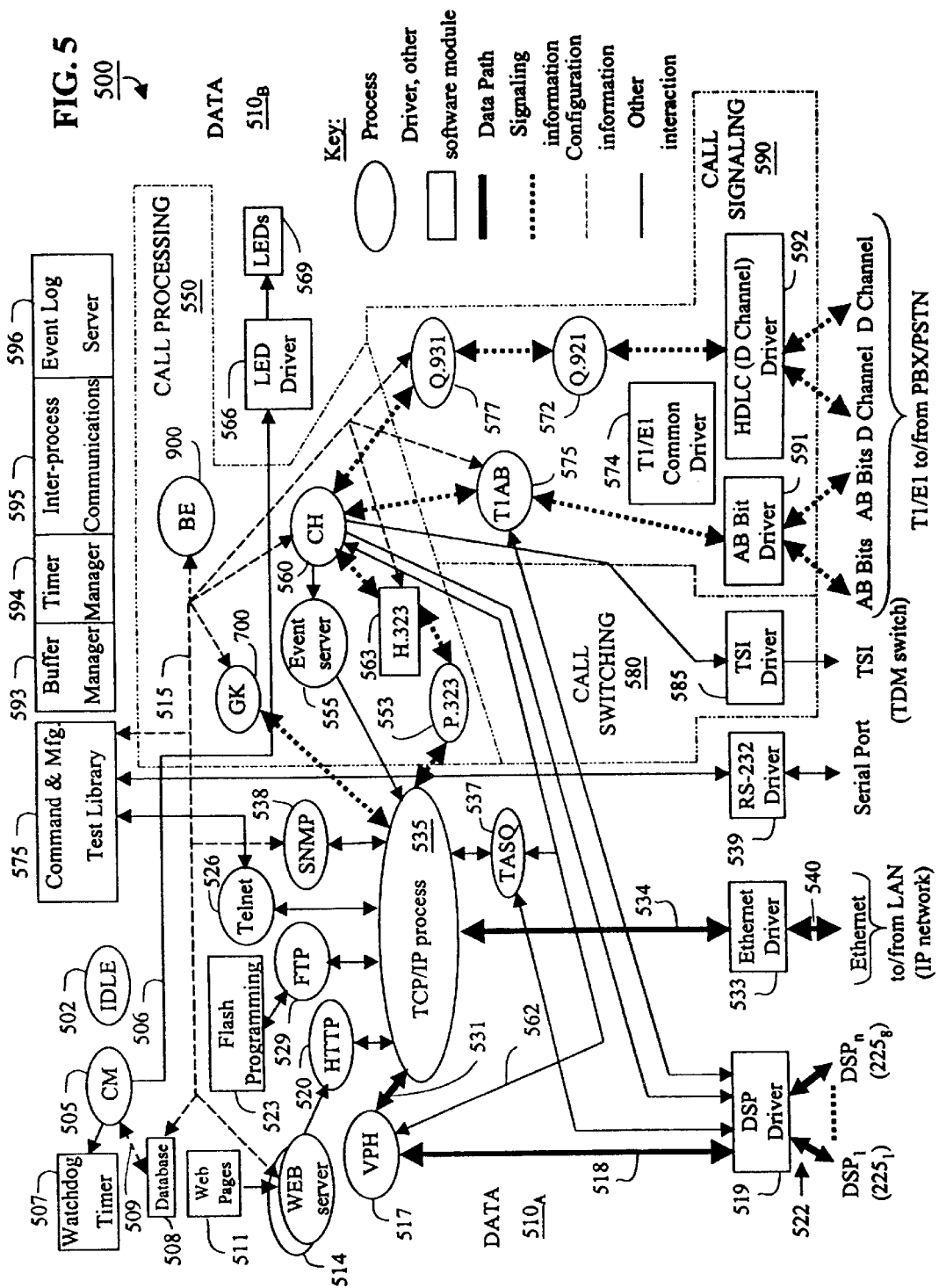

FIG. 11 — Basic VoIP call sequence 1100

PBX-IP-PBX

IP to PSTN switchover using pooled DN

IP to PSTN switchover using called DN

FIG. 18  PSTN to IP switchover

FIG. 19   Simple inter-domain call routing sequence

Complex inter-domain call routing sequence

FIG. 21  Service Establishment sequence

FIG. 22    Information transfer sequence

Call Teardown 2300

FIG. 26
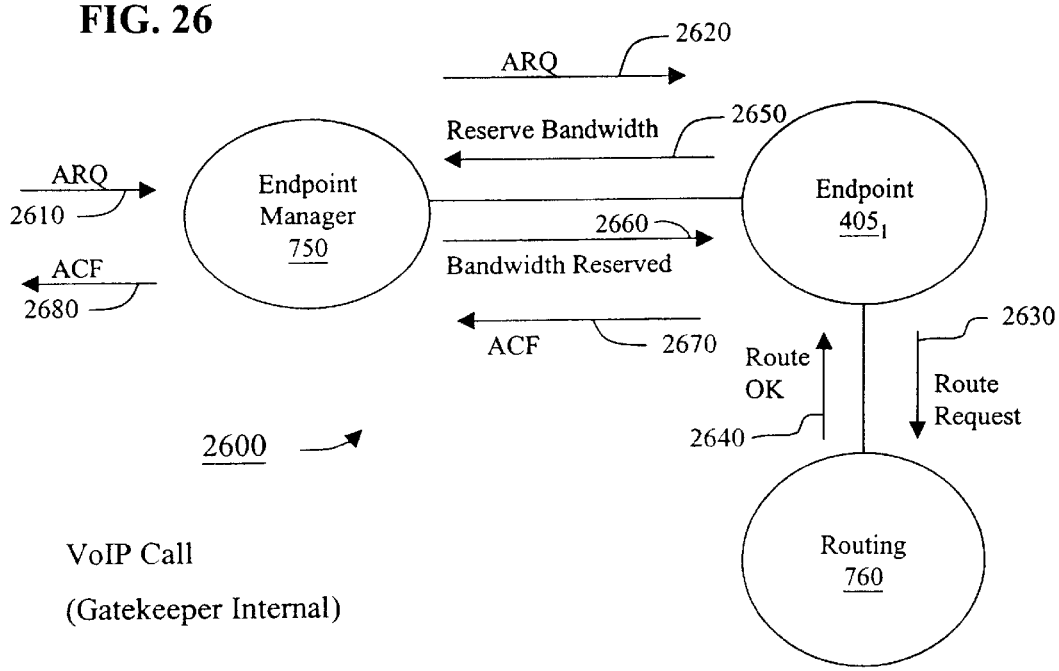
2600
VoIP Call
(Gatekeeper Internal)
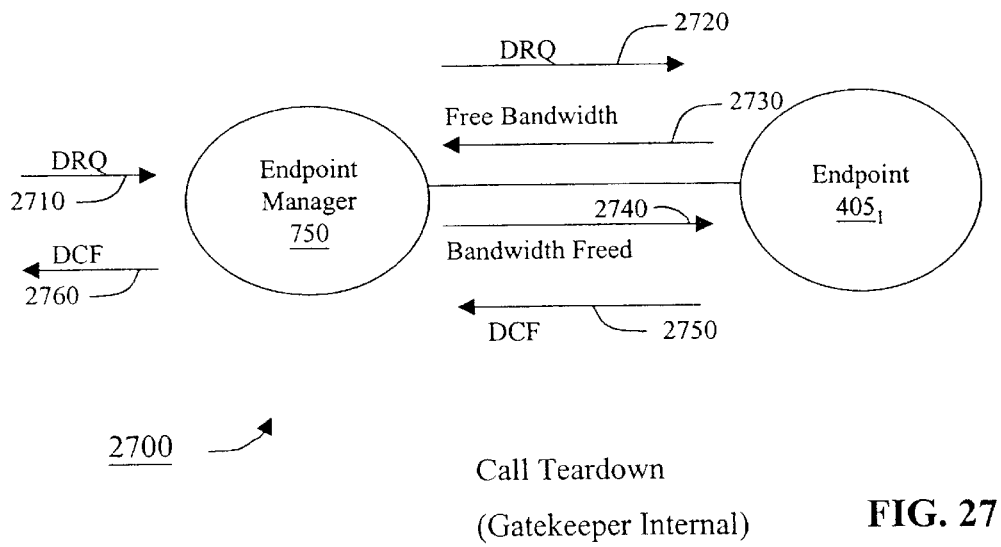
2700
Call Teardown
(Gatekeeper Internal)
FIG. 27

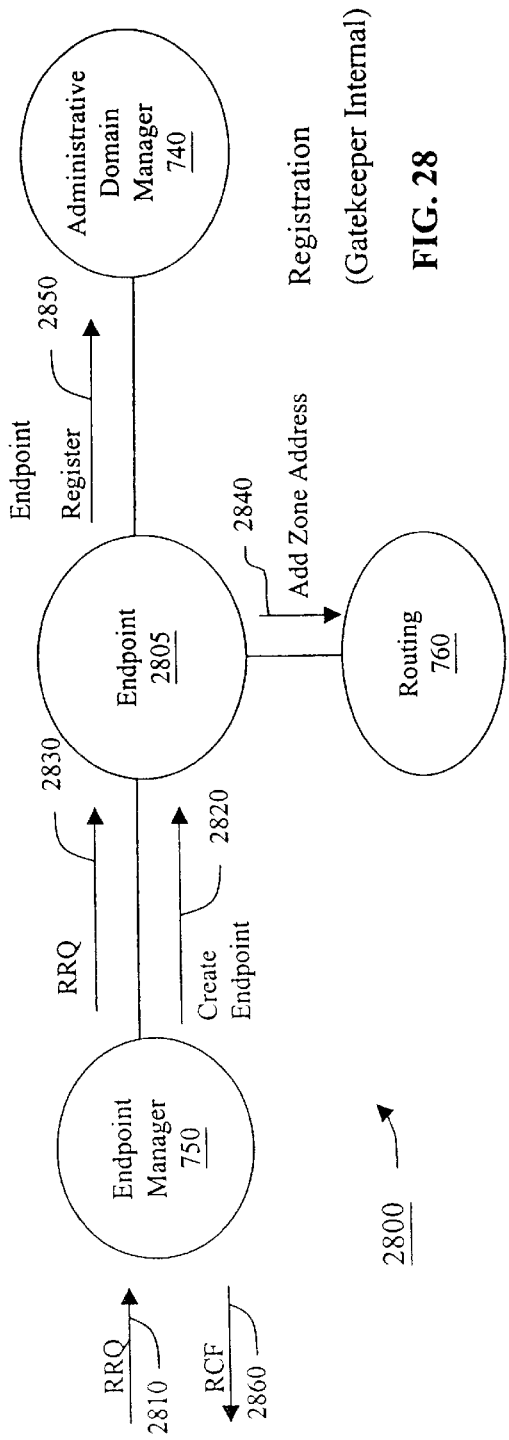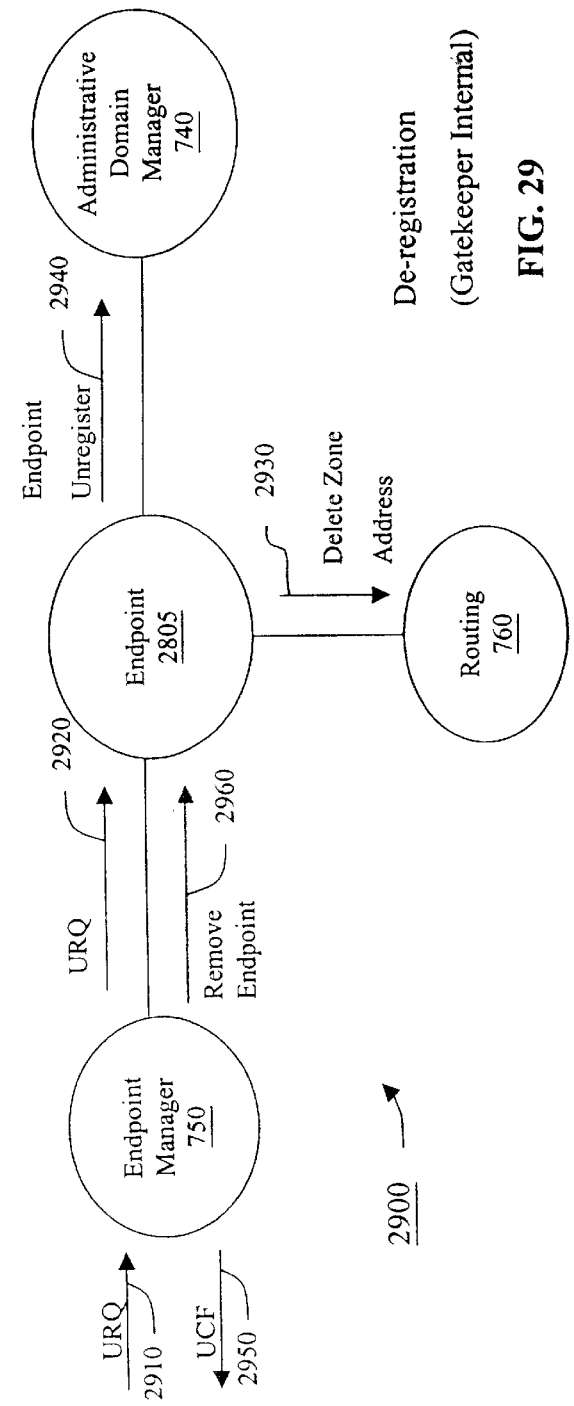

APPLICATION FOR A VOICE OVER IP (VOIP) TELEPHONY GATEWAY AND METHODS FOR USE THEREIN

This application is a division of Ser. No. 09/437,644 filed Nov. 10, 1999.

BACKGROUND OF THE DISCLOSURE

1. Field of the Invention

The invention relates to apparatus, and accompanying methods for use therein, for a telephony gateway intended for use, e.g., paired use, at opposite ends of a data network connection, in conjunction with at each end, e.g., a private branch exchange (PBX) for automatically routing telephone calls, e.g., voice, data and facsimile, between two peer PBXs over either a public switched telephone network (PSTN) or a data network, based on, among other aspects, cost considerations for handling each such call and called directory numbers, monitoring quality of service (QoS) then provided through the data network and switching ("auto-switching") such calls back and forth between the PSTN and the data network, as needed, in response to dynamic changes in the QOS such that the call is carried over a connection then providing a sufficient QoS.

2. Description of the Prior Art

Over the past century, telephone communications have become rather ubiquitous as the public switched telephone network (PSTN) has expanded into increasingly rural and other remote areas of the country, thus affording nearly universal telephone access. The PSTN provides real-time circuit-switched connections between caller and called parties, i.e., it establishes a continuous real-time link between caller and called locations, the latter often being specified by a string of digits entered by the caller; maintains that connection for the duration of a telephone call and then tears down that connection once that call terminates.

While basic plain old telephone service (POTs) connections typically provide continuous high quality analog connections, suited for voice, facsimile and relatively low speed data, such connections, based on their toll charges, can be expensive to use. Telephone companies frequently price these connections based on distance and time, i.e., a distance between the caller and called locations and duration of each call. Over the past few years in the United States, competition among regional and long distance telephone companies has existed and is intensifying, so much so as to effectively, in many instances, reduce telephone toll charges. However, such competition is only now emerging in many foreign countries. Further, various foreign governments have set relatively high interconnection tariffs to protect their local telephone companies, which are frequently governmentally regulated monopolies, from competitive pricing pressures arising from foreign carriers. Consequently, while telephone charges, on a per minute basis, are relatively inexpensive in the United States, the same is not true for telephone calls within and between foreign countries. In that regard, international calls between one country and another, such as the United States, can be rather expensive.

For many types of communication, such as data, continuous real-time switched connections, provided by the PSTN, are simply not necessary, given, e.g., relaxed latency restrictions for data, and are too costly.

Hence, within the last decade, private packet networks (commonly referred to as private "data" networks) have experienced phenomenal growth as organizations, particularly those with computer and other digital equipment stationed at disparately located offices, sought cost-effective methods of communicating digital information between these offices. For ease of use and to accommodate as wide a universe of currently available network equipment and computer software as possible, these networks are generally designed to embody Internet Protocol (IP) based routing (which is the same methodology used in the Internet).

Though initial costs associated with implementing a private data network can be significant, average per use charges incurred through use of such a network tend to be considerably less than the toll charges for similar carriage, in terms of an amount of information being communicated, associated with the PSTN and hence, if the private network is sufficiently well used, can provide substantial cost savings to its owner as compared with equivalent use of the PSTN.

During the course of designing a private data network, various long-haul communication links that underlie the network are often chosen to provide bandwidth which, to accommodate anticipated growth, greatly exceeds current usage requirements. A common result of this is that many organizations, which have private data networks in operation, find themselves with significant amounts of unused (excess) installed bandwidth, which they have already built into their cost structure, available on their networks. Hence, some amount of additional traffic can be carried over this available bandwidth at what is, for all intents and purposes, essentially no additional cost. However, bandwidth is ephemeral: it is either consumed or not; it can not be stored for future use and hence, if not used when it is available, is simply wasted.

Those organizations that have implemented and use private data networks also tend to be extremely heavy telephone users as well, thus incurring substantial telephone charges on a regular continuing basis. These organizations include relatively large corporations, as well as government, academic and military organizations. Moreover, with increasing global computerization caused by explosive proliferation of personal computer usage over the past decade, even mid-sized and relatively small organizations with multiple offices are increasingly experiencing a need for access to an IP-based data network to facilitate inter-office data sharing and data communication. Though these organizations rarely, if ever, have sufficient usage to justify implementing their own networks, they are increasingly turning, for reasons of security and economy, to various network providers who offer secure access to a shared private IP network.

Recognizing the substantial telephone charges which these organizations regularly incur, particularly when viewed in the context of excess bandwidth available on their private data networks (whether dedicated or shared) and a near zero marginal cost of utilizing that bandwidth, these organizations would likely stand to economically benefit if this bandwidth could be used in some fashion to carry telephone calls that would otherwise be routed, at much higher cost particularly for international traffic, through the PSTN.

Currently, an effort, commonly referred to as "Voice over IP" (or more simply just "VoIP"), is underway in the art to develop technology and ultimately commercial products that can be utilized to transport, as an alternative to use of the PSTN, voice, data and facsimile communication, which would heretofore be carried over the PSTN, in packetized fashion over an IP data network, such as the Internet or a private data network. As currently envisioned in the art and described in A. Cary, "IP PBXs: Open Questions", *Data*

*Communications,* March 1999, pages 69–83 and particularly page 72, products embodying this technology will probably utilize one of two basic approaches: (a) an "adjunct" approach, and (b) a LAN-based approach. The adjunct approach would use existing subscriber PBXs, subscriber line wiring and telephone sets but incorporate a VoIP telephony gateway, as an "adjunct", at each of a number different sites. At each site, a corresponding gateway would be situated between PSTN trunk connections to a PBX at that site and connections to an IP network, so as to route incoming and outgoing telephone calls between PBX peers at these sites through the IP network. In contrast, the LAN-based approach would replace conventional telephone subscriber equipment and telephone PBXs with IP-compatible telephones to packetize voice calls, and carry these calls over local area networks (LANs).

The LAN based approach is likely to meet with significant disfavor and commercial skepticism owing to a substantial expense, particularly with large organizations that have extensive telephone systems, associated with removing and replacing existing telephone equipment, including PBXs and telephone instruments. This will be particularly true if, as we believe, the end-user price of a VoIP telephony gateway can kept to a reasonable level. Should this occur, the adjunct approach, by requiring a significantly reduced capital outlay while potentially providing substantial savings on telephone toll charges, will likely be widely adopted in the market and hence experience significant, widespread and rapid commercial success.

While carriage of telephony traffic over an IP network clearly holds theoretical promise and economic attraction, particularly through use of an "adjunct" approach, several obstacles exist, of which the following are illustrative. Any of these obstacles, if not properly addressed, could seriously hamper practical implementation and eventual deployment of this approach.

First, quality of service associated with a data connection provided through an IP network can vary widely. Such a connection can experience wide dynamic changes in latency, jitter and/or packet loss. Given the error correction processing that usually occurs at each end of a data connection, packet traffic can usually withstand transient changes, to a fairly significant degree, caused by any of these affects, before integrity of its payload data becomes jeopardized. However, voice traffic is particularly sensitive to these affects. Specifically, if packetized speech were to be subjected to transient changes in any of these affects, then this speech, once converted into an analog signal, may well contain audible distortion that might be highly objectionable to an individual on either end of a call. Consequently, any equipment that routes telephony traffic, originally destined to a PSTN, over an IP network instead must incorporate some mechanism to measure quality of service (QoS) of a networked connection, provided through the IP network, which carries telephony traffic and then switch this traffic over to the PSTN whenever the QoS of this connection sufficiently degrades. Preferably, this switchover itself should occur when distortion caused by a degradation in the QoS would likely become objectionable to a listener at either end of a call. In addition, this equipment should implement the switchover itself in a manner that is substantially inaudible, i.e., transparent, or at least not objectionable to that listener. In that regard, one illustrative device, referred to as "Selsius-IP PBX" gateway and recently developed by Cisco Systems, apparently switches a telephone call from the IP network to the PSTN should the latency on the IP network rise too far.

Second, not every telephone call needs to be routed over an IP network. In fact, no economic benefit results from routing certain calls over this network; these calls would best be handled through the PSTN. These calls include those which are, e.g., strictly local in nature, including, e.g., "911" calls, as well as those to toll-free numbers.

Furthermore, any VoIP gateway that is intended to carry telephone traffic must exhibit a very high degree of reliability and fault-tolerance, preferably similar to that of the PSTN itself.

Though efforts are currently underway at various organizations to develop a VoIP telephony gateway, between a PSTN and an IP network, to date, no commercial products appear to exist in the marketplace that implement IP telephony in a manner that remedies the above-noted obstacles.

In that regard, various gateways that have been announced seem deficient with respect to overcoming one or more of these obstacles. In that regard, one such illustrative device referred to as "NetPhone IPBX" gateway developed by NetPhone, Inc. of Marlborough, Mass. appears to provide a fallback capability to switch a telephone call to the PSTN from the IP network only in the event either the IP connection fails or a computer operating system, on which a software portion of the gateway executes, fails but not if QoS of the IP connection simply degrades.

No VoIP telephony gateway of which we are aware appears to be capable of selective call placement, i.e., deciding whether, from a nature of the telephone call itself, i.e., a called directory number, that call is best routed over the IP network or the PSTN and then routing the call accordingly, and/or is sufficiently reliable and fault-tolerant.

Therefore, a significant need currently exists in the art for a VoIP telephony gateway, particularly in view of the widespread adoption and substantial cost savings that could well accrue from its use, that is not only able to route a telephone call to an IP network in lieu of the PSTN but also can switch the call between these networks, as needed, based on QoS then being provided by the IP network. Such a gateway should also provide selective call placement such that those telephone calls that are not able to generate a cost savings, or other benefit, from being handled through the IP network are identified and routed to the PSTN rather than to the IP network. In addition, such a gateway should be highly reliable and fault-tolerant.

SUMMARY OF THE INVENTION

The present invention advantageously satisfies these needs, while overcoming known obstacles in the art, by providing a telephony gateway which, when operated with a similar peer gateway and each connected at an opposite ends of PSTN and data network connections, dynamically switches a call alternately between the data network and the PSTN based on real-time measurements of quality of service (QoS) then associated with the data network so as to carry the call over the particular network then providing sufficient QoS.

In accordance with our inventive teachings, once a telephone call has been initially routed to either the PSTN or to the data network (e.g., an IP network), then, should the QoS of a connection through the data network change, the call will be automatically switched ("auto-switched") to and routed through the other network, with the switching dynamically changing, during the duration of the call and in a substantially transparent manner to both the calling and called parties, alternating between the data network and the PSTN, as necessary, in response to dynamic changes in the QoS of the data network.

In particular, the inventive gateway determines network quality through dynamic measurements of latency, packet loss and error rate (jitter). Should either gateway involved in a call determine that network quality has either increased or decreased to necessitate an auto-switch either to the data network from the PSTN or the opposite, that gateway (hereinafter, for simplicity of reference, the "calling gateway") will initiate an information exchange, using our inventive extensions to the H.323 protocol, with its peer gateway (hereinafter, the "called" gateway).

Specifically, if the call is to transition from the data network to the PSTN, the called gateway will select an available directory number from a pool of directory numbers (PDN) that has been assigned to it during its configuration and convey that specific number to the calling gateway. Once the calling gateway receives the particular PDN, it originates a circuit-switched call over its PSTN trunk connection to that PDN. The called gateway, sensing an incoming call on its PDN, will determine whether this number corresponds to the particular PDN on which that gateway is now expecting a call. If it is a different PDN number from that which it is expected, that gateway sends a message to the calling gateway over the network connection and waits for a gateway to claim this call. If this call is on the correct PDN, then the called gateway switches the call from its network connection to the now established circuit-switched connection through the PSTN. Once this occurs, the data network connection for this call is torn down by both gateways as if the call were completed. Auto-switching also occurs in reverse, from the PSTN back to the data network, when network quality sufficiently improves.

As per our inventive teachings, peered gateways facilitate auto-switching of telephone calls between the PSTN and the data network by establishing call-specific information for each call, including a unique call identifier (CallId), and Calling and Called Flags and communicating that information between themselves during call setup. Gateways communicate this information by embedding this information into various H.323 messages, specifically in a so-called "nonstandard Data" field, using call independent signaling. By virtue of this information, the gateways on calling and called sides form the same association for each call routed therebetween and with a common CallId used for that call. This identifier distinguishes that call from any other then being handled by either gateway such that these two peered gateways, acting in unison, can switch this particular call between these networks, as needed, without affecting any other calls.

Specifically, through use of call independent signaling features of an H.323 standard, a Calling Flag is embedded within an H.323 SETUP message, and a Called Flag, a CallId and a selected PDN are all embedded within an H.323 CALL PROCEEDING or H.323 CONNECT message. In that regard, the contents of the Calling Flag, which are generated by a calling side, contains information, for a given call being established, which indicates, to a called side, whether, from the calling gateway, that call can be auto-switched. In response to this SETUP message, the called side generates and saves a CallId number which uniquely identifies that call and then passes that ID back to the calling side, along with the Called Flag and PDN. The Called Flag specifies whether, from the called gateway, this call can be auto-switched. The calling side then saves this information for later use in properly auto-switching the call between the data network and the PSTN, should a need to auto-switch then occur.

Our inventive gateway functions as an entity within an H.323 environment. The gateway implements at least one gatekeeper, to which the gateway registers itself, and at least one border element. The gatekeeper manages a group of endpoints which collectively constitute a zone. An administrative domain is formed of at least one gatekeeper and a border element connected to the gatekeeper(s) in the domain. The border element provides external network access into the administrative domain.

Advantageously, as a feature of our invention, for increased local redundancy, our inventive gateway also implements peered border elements. Peered border elements function together and behave as a single monolithic border element, i.e., one "logical" border element, but with their functionality being duplicated across these such elements. Hence, if either of the peered border elements in an administrative domain fails, the other peered element can provide inter-domain routing and inter-zone routing within that domain. Peered border elements preferably have a loosely coupled distributed architecture, with no hierarchical differences. All transactions from gatekeepers or one border element in a domain are shared with its peer border element. As such, transaction data stored in one peered border element remains synchronized with that stored in the other, such that either one border element can immediately undertake transaction processing should its peer border element fail or be taken out of service.

Each peered border element has both TCP/IP server and client connections. Messages between peer border elements include information download and information update messages, as well as messages to establish and disconnect TCP/IP connections therebetween. An information download message is sent by one "originating" border element to its peer, upon establishing a TCP connection with that peer. This message shares all the call routing capabilities of the originating border element with its peer. The message contains local service relationships (internal to a domain), local descriptors, external service relationships (external to a domain) and external descriptors. The local service relationships define transport addresses of each of the gatekeepers that has a service relationship with the originating border element. The local descriptors define routing descriptors and are obtained from either a static configuration of the same domain as the originating border element or from gatekeepers, located within this domain, that have established service relationships with the originating border element. The external service relationships define, for the originating border element, transport addresses of those border elements external to this domain that have established a service relationship with the originating border element. The external descriptors define routing descriptors, that are obtained from either a static configuration of the H.323 environment or from border elements, located external to the domain that contains the originating border element, that have established service relationships with the originating border element. An information update message is sent from the originating border element to its peer in order to notify the latter of a change either in information affecting a gatekeeper located within the same domain or information received from a border element located external to this domain. The particular border element within an pair of "peered" border elements that originally received such information is responsible to send that information to all its peers.

Furthermore, each gateway advantageously provides, as another feature of our invention, selective call routing to route, based on called directory numbers, only those of its outgoing calls to the data network that can provide effective cost savings to the calling parties and/or their organizations.

This routing is based on called number information, e.g., predefined called numbers and lists of bypass telephone numbers (BPN) and telephone exchanges, that can be programmed into the gateway during its configuration. As such, local calls and calls to "911" and the like which provide no appreciable cost savings, if any, to a calling party (or his(her) organization) are automatically routed to the PSTN for the entire duration of each such call.

BRIEF DESCRIPTION OF THE DRAWINGS

The teachings of the present invention can be readily understood by considering the following detailed description in conjunction with the accompanying drawings, in which:

FIG. 3 depicts a very high-level block diagram of the software that is employed in the inventive gateway;

FIG. 5 depicts a lower-level block diagram of call processing software 500, that forms a portion of gateway software 300 shown in FIG. 3 and which is employed in the inventive gateway;

FIG. 6 depicts table 600 showing execution priorities of processes that are used within call processing software 500 shown in FIG. 5;

FIG. 26 depicts inter-process interactions 2600 that occur within a gatekeeper to route a VoIP call being made by a gateway registered with that gatekeeper;

FIG. 27 depicts inter-process interactions 2700 that occur within a gatekeeper to tear down a VoIP call;

FIG. 28 depicts inter-process interactions 2800 that occur within a gatekeeper for registering a new gateway with that gatekeeper; and FIG. 29 depicts inter-process interactions 2900 that occur within a gatekeeper for de-registering a gateway from that gatekeeper.

To facilitate understanding, identical reference numerals have been used, where possible, to designate identical elements that are common to various figures.

DETAILED DESCRIPTION

After considering the following description, those skilled in the art will clearly realize that the teachings of the present invention can be readily utilized in a telephony gateway for use in conjunction with any wide area network (WAN), whether it be a private data network or a publicly accessible network, such as the Internet. Our invention is particularly, though not exclusively, suited for use with gateways that are intended to be used with those WANs that rely on the Internet Protocol (IP) to control message routing. Nevertheless, after considering the following discussion, those skilled in the art will readily appreciate how to use our inventive gateway with any of a wide range of differing types of computer networks, other than just IP networks, and to modify that gateway, as necessary, to conform to the requirements of the specific network protocol(s) to be used in any given situation. To simplify the discussion and facilitate understanding, we will describe our inventive gateway in the context of use with a private IP data network. Also, the term "voice" as used herein is generically defined to encompass all types of communication modalities that are typically carried over a subscriber (plain old telephone—POTs) connection, such as, e.g., speech, facsimile or modem data.

To facilitate reader understanding, we will first provide a brief overview of IP telephony, particularly as implemented through the present invention, followed by a description of the hardware components of our inventive gateway, and then followed by the software executed by that gateway. Since our inventive gateway is intended to function in a conventional H.323 environment with H.323 processing being software implemented, then, to provide an appropriate backdrop for the software, we will briefly describe that environment prior to discussing the software in detail. To enhance elucidation, we will then discuss messaging which our inventive gateway implements to provide inter-gateway call routing and associated call handling procedures, including registration and de-registration.

A. Overview

Figure 1:
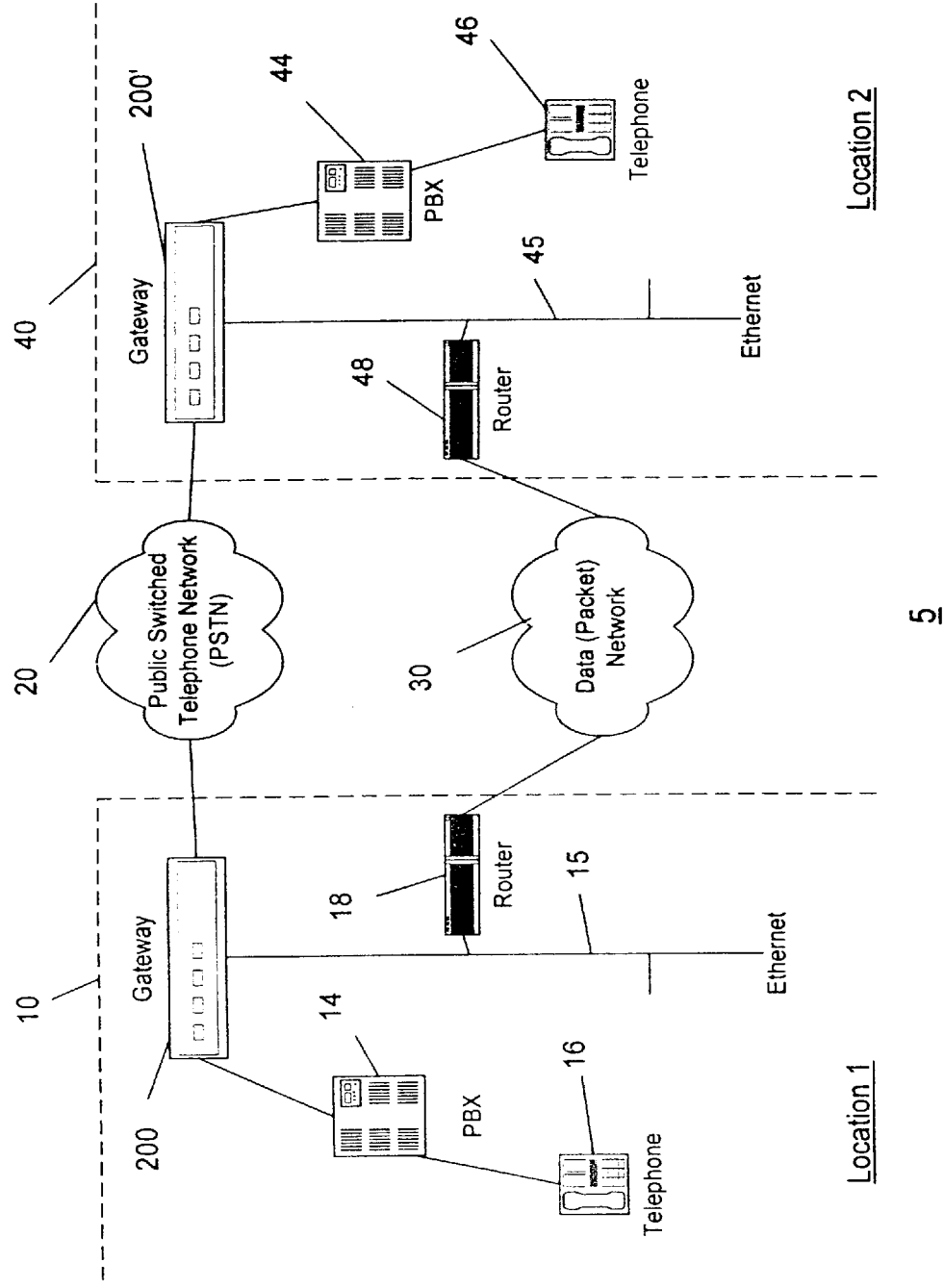
FIG. 1 depicts a simplified high-level block diagram of a network environment that incorporates the present inventive VoIP telephony gateway.

FIG. 1 depicts a simplified high-level block diagram of a network environment that incorporates the present inventive VoIP telephony gateway.

As shown, this environment includes a conventional private IP data (packet) network 30 that inter-connects, via routers 18 and 48, two illustrative Ethernet-based local area networks (LANs) 15 and 45, respectively (while a private network often interconnects a considerable number of separate LANs, for simplicity, only two such LANs are explicitly shown and discussed herein). Each of these LANs itself inter-connects a number of locally situated conventional IP-based devices, such as networked computers, printers and other equipment all of which are not shown for simplicity. LANs 15 and 45 may be widely spaced from each other by a considerable distance, such as one LAN interconnecting such devices situated at a customer site (denoted "Location 1") in one city, such as New York, and another LAN interconnecting additional such devices situated at another site (denoted "Location 2") for the same customer but in a geographically disparate city, such as London, though these LANs need not be so widely spaced apart.

In addition, each location is equipped with various telephones, of which telephone 16 in Location 1 and telephone 46 in Location 2 are illustrative, to serve the individuals stationed there. The telephones that serve any one location are typically connected to a conventional private branch exchange (PBX) which, by performing incoming call termination and outgoing line selection, shares use of telecommunications lines and trunks provided through a local central office (not shown for simplicity) that forms part of public switched telephone network (PSTN) 20, thus reducing cost. PBX 14 is connected to telephones existing in Location 1; PBX 44 is connected to telephones existing in Location 2. For simplicity, only one telephone is shown at each location, though in actuality each location may contain tens, hundreds, thousands or more different subscriber telephones interconnected to a respective PBX. Ordinarily, each of these PBXs would be connected, via various outgoing and incoming trunks, to a corresponding telco (telephone company) central office located within and at a fringe of PSTN 20 to route calls over this network. Typically, for a call transiting between Location 1 to Location 2, a user stationed at, e.g., telephone 16, would dial a number of a telephone, such as telephone 46 for an individual, at Location 2. PBX 14 would select an outgoing telephone line to a central office switch (for a relatively large PBX, this amounts to selecting an available time slot in an outgoing, e.g., T1 trunk) and also provide dial tone to telephone 16. The PBX would then pass the dialed number to the central office which then routes the call, via PSTN 20, to a telco central office that serves PBX 44 and, via an incoming trunk that serves that PBX, to a subscriber line terminated by telephone 46. PBX 44 would ring telephone 46 and when an off-hook connection occurs would connect the remote caller through to a called party situated at that telephone.

As thusfar described and as conventionally occurs in many large organizations, telephony traffic does not flow over the data network.

Network 30 and individual LANs 15 and 45 connected thereto are often designed to provide substantial amounts of available bandwidth that accommodates anticipated growth in network usage and which greatly exceeds current user requirements. As such, private network 30 and its interconnected LANs exhibit significant amounts of unused (excess) installed bandwidth which, if not consumed, would be wasted. Hence, network 30 and its LANs can carry some amount of additional traffic over this available bandwidth at what is essentially no additional cost.

To take advantage of this available bandwidth, an inventive gateway is situated on each LAN and interposed between each PBX and the PSTN. In particular, gateways 200 and 200' (which are identical, apart from internally-stored configuration information) reside as distinct ports on LANs 15 and 45, and are situated between PBX 14 and the PSTN, and between PBX 44 and the PSTN, respectively.

Advantageously, each gateway provides either of two paths for telephony traffic to follow: either conventionally through a PSTN, e.g., PSTN 20, or over a data network, such as network 30.

As described in detail below, each gateway dynamically measures quality of service of real-time connections then available through the data network to its peer gateway locations. If the quality of service (QoS) as measured in terms of latency, phase jitter and lost packets, is sufficiently high to support voice traffic, an originating gateway, which serves a calling number, will translate a called number into a corresponding IP address and will route a telephone call through the data network in lieu of the PSTN. Alternatively, if at the time of the call, the QoS of the data network is inadequate to support high quality speech, the originating gateway will route the call through the PSTN for conventional carriage therethrough to the called party.

In accordance with our inventive teachings, once a telephone call has been initially routed to either PSTN 20 or to data network 30, then, should the QoS of the data network change, the call will be switched to the other network, with the call having then been dynamically switched, during the duration of the call and in a substantially transparent manner to the calling and called parties, alternately between the data network and the PSTN in response to changes in the QoS of data network 30 such that the call travels over that network then providing a sufficient QoS. Hence, assume that the originating gateway, e.g., gateway 200, acting in concert with its peer gateway, e.g., gateway 200', were to route a telephone call originating at telephone 16 and destined to telephone 46, over data network 30. If once the call is so routed and during that call, the QoS of network 30 dynamically decreases, as a result of, e.g., dynamic network congestion which then increases packet latency through this network, to a point which no longer supports high quality voice, then the two gateways will effectuate a telephony connection through the PSTN and then transfer the call from the data network to the PSTN, over this connection. If, while the call is being carried over the PSTN, the QoS of the data network were to return to its proper level, then these peered gateways will establish a data connection between themselves through the data network and switch the call from the PSTN back to the data network over this data connection. Hence, as the QoS of the data network changes during the pendency of a telephone call, the peered gateways will switch the call back and forth between the PSTN and the data network, as needed, to provide high quality end-to-end voice connections at low transport cost.

Not only can the inventive gateway handle and cost-effectively switch voice calls between the PSTN and data network, as necessary, but also the gateway can similarly switch other types of calls, such as analog data and facsimile, that are often transmitted *on a telephonic connection between two sites.

Furthermore, certain telephone calls, such as calls to emergency numbers (e.g., "911"), provide no cost savings to a calling party and hence are best handled through the PSTN, typically the local central office. Similarly, no appreciable cost savings, if any, will arise in by-passing the telephone network for those local (e.g., intra-LATA—local access and transport area) calls that are billed, by a local telephone company, on a flat rate, rather than measured (typically in terms of time and distance), service. Thus, these calls should be handled by the PSTN regardless of the state of the data network.

Advantageously, in accordance with our inventive teachings, each gateway provides selective call routing to route, based on the called number, only those of its outgoing calls to the data network that can provide effective cost savings to the calling parties and/or their organizations. This routing is based on called number information, e.g., predefined called numbers and lists of bypass telephone numbers and exchanges, that can be programmed into the gateway during its configuration.

B. Gateway Hardware

Figure 2:
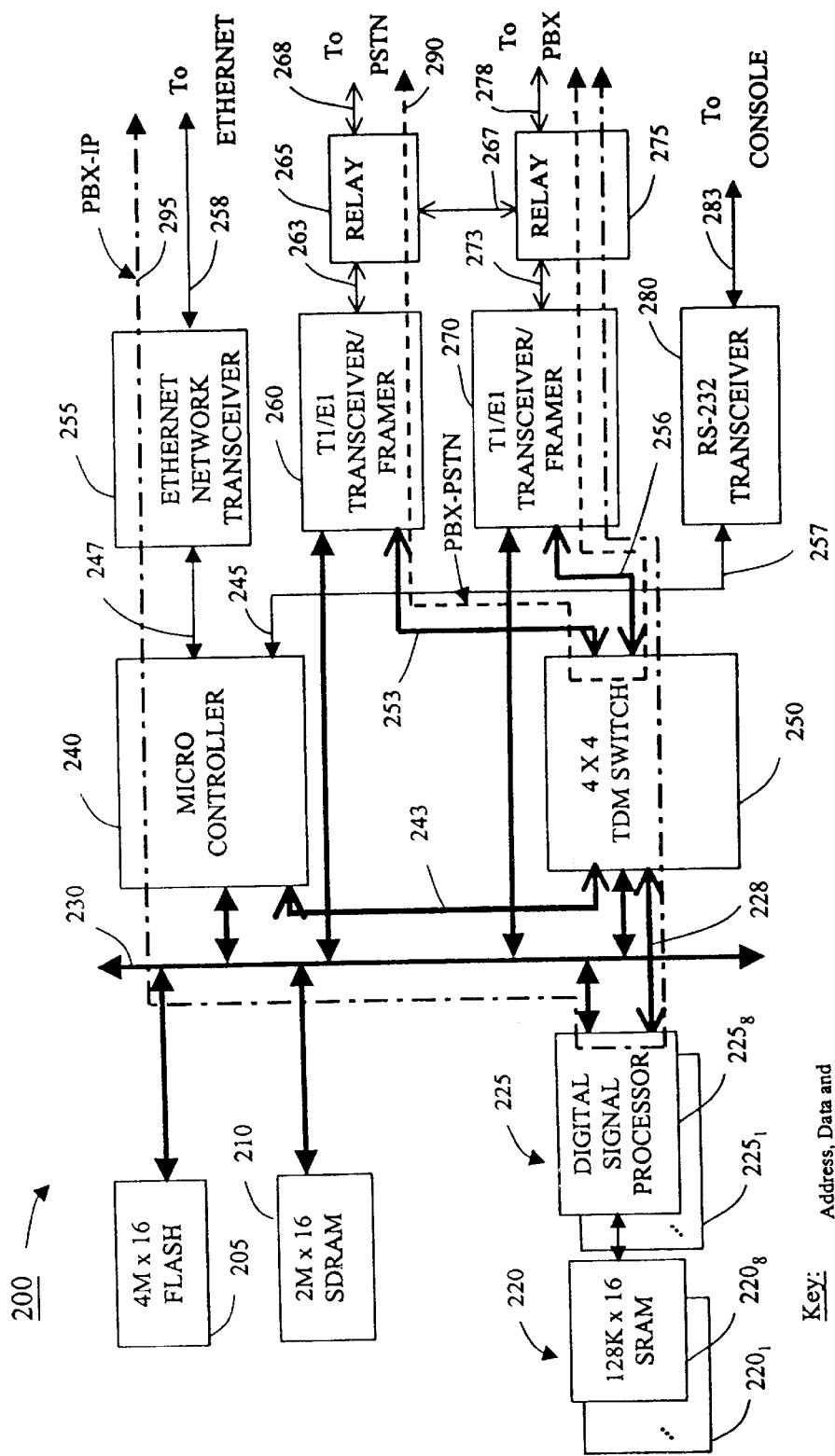
FIG. 2 depicts a hardware block diagram of the inventive gateway, e.g., gateway 200, shown in FIG. 1.

FIG. 2 depicts a hardware block diagram of the inventive gateway, e.g., gateway 200, shown in FIG. 1.

As depicted, the gateway is a microcontroller based system having flash memory 205, random access memory (RAM) 210, multiple digital signal processors (DSPs) 225, T1/E1 transceivers/framers 260 and 270, 4-by-4 port TDM (time-division multiplexed) switch 250 and microcontroller 240, all interconnected via bus 230.

The microcontroller is also connected, via leads 247, to conventional Ethernet network transceiver 255, which in turn, via leads 258, is connected to a conventional RJ-45 jack on a physical housing (both the jack and housing are not shown) of the gateway. This jack provides a plug connection to an Ethernet LAN. The microcontroller is illustratively an MPC860T RISC (reduced instruction set computing) microcontroller commercially available from Motorola Corporation of Schaumberg, Ill. This microcontroller advantageously contains an internal Ethernet interface. Hence, the Ethernet network transceiver provides a physical layer connection from the interface to the Ethernet LAN.

T1/E1 framer/transceiver 260 is connected, via leads 263, relay 265 and leads 268, via incoming/outgoing T1/E1 trunk connections, to the PSTN. T1/E1 framer/transceiver 270 is connected, via leads 273, relay 275 and leads 278, via incoming/outgoing T1/E1 trunk connections, to the PBX. Both of relays 265 and 275 are connected together via leads 267 to provide, typically in the event of a failure condition, a bypass path around the gateway between the PSTN and the PBX. Though not specifically shown, leads 263, 268, 273 and 278 simultaneously but separately carry both incoming and outgoing T1/E1 trunks to corresponding transceiver/framers. Both transceiver/framers are identical to each other and are typically implemented by a BT8370 transceiver/framer currently available from Rockwell International, Inc. Moreover, since each transceiver/framer functions in the same manner regardless of whether it is operating at a T1 or E1 transmission rate (T1 and E1 are North American and European transmission channels operating at 1.544 and 2.048 Mb/sec, respectively, and capable of carrying twenty-four or thirty, respectively, simultaneous 64 kb/sec time-division multiplexed telephony channels and associated signaling information), then, for the sake of simplicity, we will only discuss transceiver/framer 260 and only at a T1 rate. Inasmuch as leads 263, 267, 268, 273 and 278 carry TDM signals from or to their associated trunks, these leads are also denoted as "TDM lines".

Transceiver/framer 260 accepts an incoming T1 TDM telephony serial signal stream, appearing on, e.g., lead (TDM line) 263 and extracts, for each of the multiplexed time slots in that stream, payload information carried over that slot. This payload information may be digitized voice (including facsimile and digitized data) and/or signaling information; the latter being either channel associated signaling (CAS) or common channel signaling (CCS). For each slot carried by that stream, the associated payload information is then applied, via TDM bus 253, to a common input port of TDM switch 250. Similarly, though in reverse fashion, this transceiver/framer also accepts outgoing payload information, from the same port on switch 250, for each time-multiplexed slot in an outgoing serial stream and assembles that stream, including adding framing and non-payload information, into a T1 TDM signal. Since the transceiver/framer is conventional as is both CAS and CCS, we will omit further details of its operation as well as of these two forms of signaling.

During normal operation of the gateway, the microcontroller applies an appropriate control signal (not shown) to hardware drivers for each of relays 265 and 275 to move their armatures from normally-open positions to normallyclosed positions. This, in turn, connects TDM lines 268 to TDM lines 263, hence applying the incoming and outgoing T1 PSTN trunks to T1/E1 transceiver/framer 260, and connects TDM lines 278 to TDM lines 273, hence applying the incoming and outgoing T1 PBX trunks to T1/E1 transceiver/framer 270. In the event of a failure condition, as detected by microcontroller 240 or expiration of a watchdog timer (not specifically shown in FIG. 2 but contained within the microcontroller)—the latter indicating a catastrophic failure in the gateway, relays 265 and 275, which are electro-mechanical in nature, will both assume their normally-open position. In this position, TDM lines 268 will be connected, via TDM lines 267, through relays 265 and 275 directly to TDM lines 278, hence connecting the PSTN T1 trunks directly to the PBX T1 trunks and effectively bypassing the gateway.

TDM switch 250 is illustratively formed by model MT8981D 4-by-4 digital switch commercially available from Mitel Corporation. Each of the inputs to the switch can accept up to 32 separate 64 kb/sec channels multiplexed onto a 2.048 Mb/sec (E1) stream. Each of the outputs provides a serial output TDM signal at the same rate as the input. The switch, operating under the control of microcontroller 240, provides "switched" time slot connections and can write data into a desired time slot in a TDM signal appearing at one of the serial outputs from the switch, where the data can originate from either a desired time slot in any of the four serial TDM input signals applied to the switch or from the microcontroller itself. Similarly, the microcontroller can read, through the switch, the signal value appearing in any desired time slot of any of the four serial inputs.

In essence, this switch provides appropriate time-slot connections between TDM signals appearing at its inputs and outputs in order to either route a telephone call on a given TDM channel between the PSTN and the PBX, thus by-passing the private data network, or route that call to the DSP, for appropriate processing, and ultimately the microcontroller for carriage over the private data network.

Specifically, a signal on a channel in an incoming T1 trunk, such as that carried by TDM lines 268, and originating from the PSTN, can be switched, through switch 250, to a corresponding time slot on an outgoing T1 trunk, such as over TDM lines 278, to the PBX, and vice versa, in order to support carriage of that call over the PSTN between caller and called locations. Such a telephony connection (denoted as "PBX-PSTN") is represented by dashed line 290. Such a channel will be processed through both T1/E1 transceiver framers, first to extract a signal on that channel from an incoming T1 TDM trunk, by one of the transceiver/framers and then, through the other transceiver/framer, to assemble the proper outgoing T1 TDM trunk.

Alternatively, if the gateway were to route an outgoing telephony call from a calling device, such as a telephone, computer modem or facsimile machine, connected to the PBX over the private data network (to effectuate a "Voice over IP" or VoIP call) instead of the PSTN, TDM switch 250, based on control information provided by microcontroller 240, connects an incoming time slot for that call, not to a time slot via T1/E1 transceiver/framer 260 and, from there, to an outgoing T1 trunk, but rather, via TDM bus 228, to an input of a DSP then available within DSPs 225 and ultimately to microcontroller 240. Collectively, that DSP and the microcontroller convert the digitized telephony signal for that call into suitable IP packets and transmit those packets, with appropriate IP addresses, over the LAN for subsequent carriage over the data network to a peer gateway. The peer gateway-receives these IP packets, via the data network and its LAN, and, for each such call, performs the reverse operations to convert these packets back into a digitized telephony signal for that call and then routes this signal to a destination PBX for conversion back to an analog telephony signal and ultimately termination of that signal to a called telephone or other analog telephonic device, such as a computer modem or facsimile machine. Each separate called number has an associated IP address, which ultimately is known to both peered gateways—as will be described in detail later, such that the peered gateways can properly address the IP packets to their unique called destination.

DSPs 225 illustratively contain eight separate DSPs $225_1$, . . . , $225_8$ (six of which can collectively implement 24-channel T1 operation, with eight collectively implementing 30-channel E1 operation). Each DSP, which is illustratively a model TMS320C549 DSP commercially available from Texas Instruments of Dallas, Tex., handles four simultaneous channels of digitized telephony traffic as provided by the PBX. SRAM (static random access memory) 220 contains SRAMs $220_1$, . . . , $220_8$, with each separate SRAM providing temporary data storage for a corresponding and different DSP.

In particular, for a digitized signal appearing on any one such TDM channel (a single time slot), such as that incoming from the PBX to the gateway, a DSP assigned to that channel first converts a G.711 compressed telephony signal (typically between 56–64 kb/sec) for that channel and provided by the PBX into a G.723 compressed signal (typically between 5.6–6.4 kb/sec) to effectuate a 10:1 compression. Currently, the gateway relies on use of a "digital PBX," i.e., the PBX provides, for each of its outgoing channels, analog-to-digital conversion (digitization) and compression, according to a G.711 standard, and, for each of its incoming channels, G.711 decompression and digital-to-analog conversion. If a digital PBX were not used, then appropriate channel banks could be added between the PBX and the gateway to provide these functions.

Once G.723 compression is effectuated for any channel, the DSP suitably packetizes the G.723 compressed signal. Resulting G.723 packets are then applied, via bus 230, to the microcontroller. The microcontroller, upon receipt of each of these packets for any one channel, assembles these packets for that channel into proper IP packets with necessary IP headers, including originating and destination IP addresses as well as other required information, and transmits these packets, via its internal Ethernet interface and Ethernet network transceiver 255, to the LAN for subsequent-routing to a peer gateway. Such a telephony connection (denoted as "PBX-IP") carried over the private data network is represented by dot-dashed line 295. Inasmuch as G.711 and G.723 compression algorithms are well known in the art, we will omit all details of these algorithms.

To process a VoIP call appearing on the LAN and incoming from the private data network to a called directory number serviced by the PBX, microcontroller 240, upon receipt of IP packets via network transceiver 255, first extracts a destination IP address and payload packetized telephony data from each of these incoming IP packets. The microcontroller, as discussed in detail below, determines from its internal routing tables, a correspondence between that destination IP address and that called correspondence. Once this number is ascertained, the microcontroller establishes, through switch 250, a time-slot connection, via an outgoing TDM trunk, e.g., that appearing on TDM lines 273 and 278, to the PBX, to a TDM channel that will serve that called number. The microcontroller applies each telephony packet appearing in each of the IP packets to an available DSP which, in turn, de-packetizes that packet into G.723 compressed data and converts the G.723 data into G.711 compressed data. The resulting G.711 data is inserted, through the time-slot connection established through the switch, into a specific channel in an outgoing TDM signal destined to the PBX and specifically that which will be connected by the PBX to the called number. The TDM signal is then applied to transceiver/framer 270 which, in turn, assembles a proper T1 signal and thereafter, applies that signal, via TDM lines 273 and 278, to the PBX.

In those instances where the T1 trunks utilize CCS (ISDN Primary) mode signaling, microcontroller 240 instructs switch 250 to either extract D (data) channel signaling information from incoming TDM signals or insert D channel signaling information into outgoing TDM signals. In that regard, for an incoming TDM signal appearing on either TDM bus 253 or 256, switch 250 extracts this signaling information and, via TDM bus 243, routes that information to the microcontroller for use in subsequent call processing. In a reverse fashion, for an outgoing TDM signal generated by the switch and appearing on either TDM buss 253 or 256, the microcontroller generates appropriate D channel signaling information and applies that information via TDM bus 243 for proper insertion by the switch into that outgoing TDM signal for proper downstream call processing.

Flash memory 205, illustratively 4 Mbytes in size, stores program code and other information, such as call routing (translation) tables, in a non-volatile manner. The gateway includes appropriate circuitry (not shown), along with software processes, through which the contents of the flash memory can be-updated, as needed. SDRAM (synchronous dynamic random access memory) 210 is illustratively 2 Mbytes in size. Not only does the SDRAM provide temporary data storage, it also receives, during system start, a copy of the program code stored within the flash memory. This program, as noted below, is then executed out of the copy stored in the SDRAM.

C. Software and H.323 environment

1. Software overview—Operating System and Call Processing Software

FIG. 3 depicts a very high-level block diagram of gateway software 300 that executes in our inventive gateway. As shown, this software, at its highest level, constitutes conventional operating system (O/S) kernel 310 and call processing software 500.

The O/S kernel provides, among other services, process creation, scheduling, inter-process communication and event signaling. Inasmuch as details of the operating system are not relevant to the present invention, all such details will be omitted from the ensuing discussion.

Call processing software 500 is formed of a number of distinct processes and drivers, as shown in detail in FIG. 5 and discussed below, which collectively implement VoIP call processing in an H.323 environment.

2. H.323 Environment

Figure 4A:
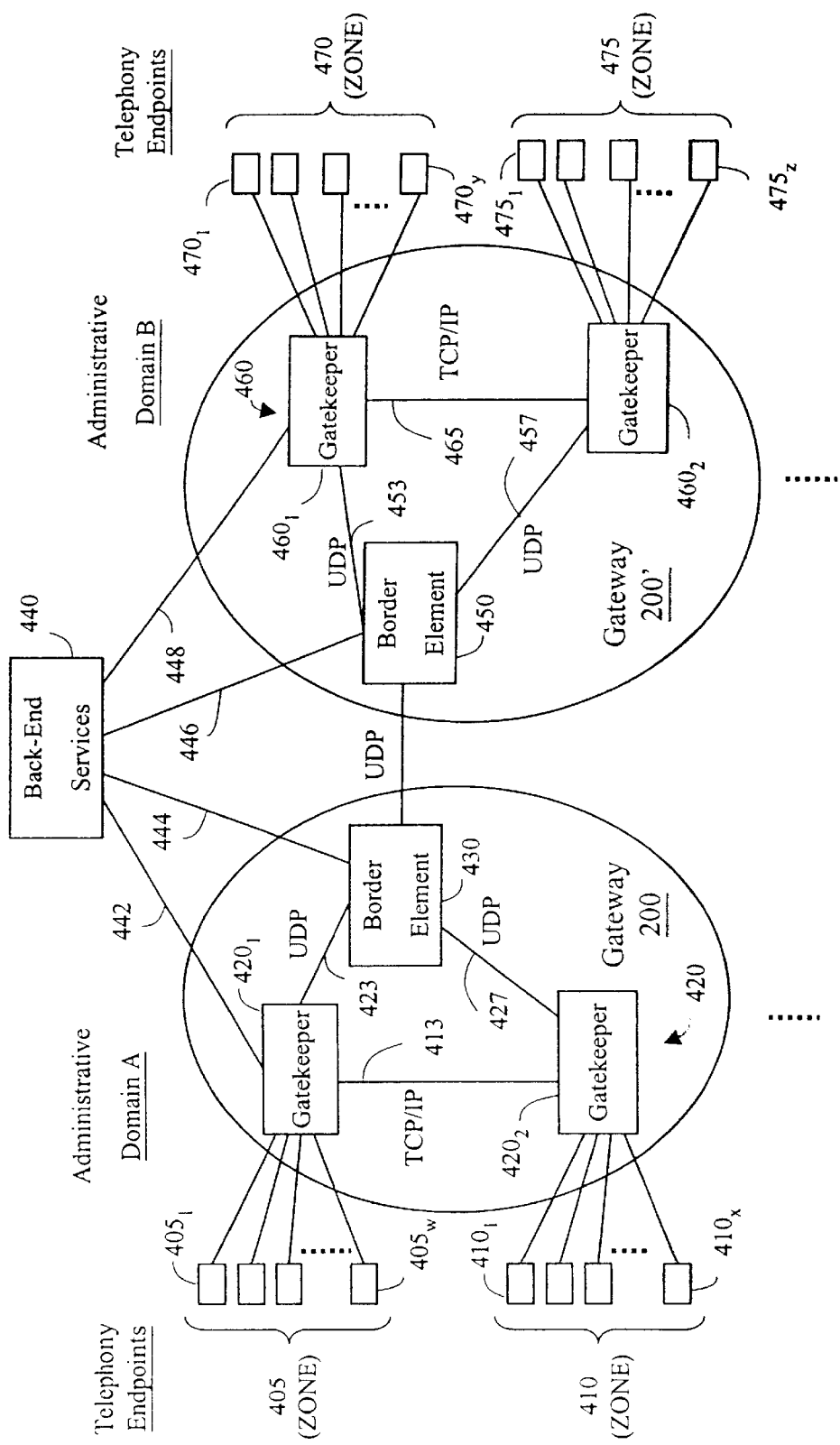
FIG. 4A depicts a block diagram of an H.323 reference model (operating environment) in which the inventive gateway operates.

FIG. 4A depicts a block diagram of an H.323 reference model (operating environment) in which the inventive gateway operates.

In general, an H.323 network is one which utilizes a packet-based network, as its transport vehicle, but which may not provide a guaranteed QoS. Such packet based networks may include LANs, enterprise area networks, metropolitan area networks, intra-networks (intranets), such as a private data network, and inter-networks (including the Internet). These networks also include dial-up connections or point-to-point connections over, e.g., the PSTN, or an ISDN connection which uses an underlying packet based transport such as PPP (point-to-point protocol). These networks may consist of a single network segment, or they may have complex topologies which incorporate many network segments interconnected by other communications links. To the extent relevant to the present invention, H.323 terminals (here specifically denoted, for the purpose of telephony communications, as H.323 "telephony endpoints") provide audio, facsimile and/or data communications capability for point-to-point communications. Interworking, over an H.323 network, between H.323 endpoints is accomplished through so-called "gateways", such as gateways 200 and 200' (also see FIG. 2), which provide, inter alia, admission control and address translation services.

An H.323 endpoint can be any telephony or network-connectable device that is compliant with the H.323 standard. An endpoint can initiate a call to another such endpoint as well as be called by another endpoint. In general, an endpoint generates and/or terminates information streams. An endpoint can be a telephone (being a "telephony endpoint") or other customer premise device (CPE), provided it contains appropriate circuitry or is interfaced to appropriate circuitry, such as a H.323 PBX, that provides H.323 compliance.

Each telephony endpoint has an alias address, in the form of a directory number—as illustratively specified in the H.225 standard, associated with it. For any one telephony endpoint, its alias represents an alternate method of addressing it and is used as a method of internetworking with that telephony endpoint through the PSTN. Gatekeepers, on the other hand and discussed below, do not possess any such alias.

An H.323 network, primarily for telephony use, as illustrated in FIG. 4A, consists of a number of zones (four of which are illustratively shown, specifically zones 405, 410, 470 and 475) and administrative domains (two of which are illustratively shown, specifically Administrative Domains A and B). For our purposes, we view a zone as a group of H.323 telephony endpoints which are controlled, for purposes of their effectuating interconnections, through a single gatekeeper. Here, for example, zone 405 contains H.323 endpoints $405_1, \ldots, 405_w$ all controlled by gatekeeper $420_1$; zone 410 contains H.323 endpoints $410_1, \ldots, 410_x$ all controlled by gatekeeper $420_2$; zone 470 contains H.323 endpoints $470_1, \ldots, 470_y$ all controlled by gatekeeper $460_1$; and zone 475 contains H.323 endpoints $475_1, \ldots, 475_z$ all controlled through gatekeeper $460_2$ (where w, x, y and z are integers). In essence, a gatekeeper is a logical H.323 entity that provides IP call routing functions; a gateway converts between circuit-switching calls and VoIP calls.

Generally speaking, an administrative domain contains a set of H.323 entities that are administered by one administrative entity, within the domain. Each H.323 entity in the domain has at least one network address that uniquely identifies that entity. Here and in the context of telephony applications, each administrative domain contains a group of zones that are isolated from other zones, with each zone being managed by a separate corresponding gatekeeper. As shown, Administrative Domains A and B contains zones 405 and 410, and 470 and 475, respectively. An administrative domain provides call routing services for its zones through gatekeeper-to-gatekeeper messages or gatekeeper-to-border element messages.

A border element is a functional element which provides a path to accommodate external, i.e., public, access into an administrative domain for purposes of call completion or any other service which involves multimedia communication with any other element located within the administrative domain. Such access into a domain occurs strictly through a border element. Hence, a border element effectively controls an external view of its domain. A border element communicates with other border elements, such as for inter-domain communication for, e.g., inter-domain call completion, through use of a protocol specified in "Annex G" to the H.225 standard. Border element-to-border element messaging provides the sole vehicle through which a border element in one domain can establish a service relationship with a border element in another domain in order to complete a call between these domains. Within any one administrative domain, a border element within that domain may communicate, using H.225 signaling, with other H.323 elements, such as gatekeepers located within that domain. A border element within any one domain is responsible for diffusing domain-wide routing information supplied to it by its associated gatekeeper, i.e., routing information that involves any endpoint (telephony endpoints and gateways) in that domain, such as registration (or de-registration) of a new gateway or telephony endpoint and/or a change in a translation table, to all other gatekeepers throughout that domain, thereby ensuring that routing tables stored at each gatekeeper in the domain and in the border element are consistent across all gatekeepers and providing redundancy across gatekeepers. Moreover, since each gatekeeper locally maintains a complete, constantly updated copy of this information, network processing speed is increased by eliminating any need to centralize this information and hence any need, with its attendant processing and network delays, to query a centralized database for any of this information.

As shown, Administrative Domains A and B contain corresponding border elements 430 and 450. As shown, border element 430 can communicate with gatekeepers 420, including gatekeepers 420$_1$ and 420$_2$; while border element 450 can also communicate with gatekeepers 460, including gatekeepers 460$_1$ and 460$_2$. Communication between H.323 elements, such as gatekeepers, located within different administrative domains only occurs through their associated border elements. Hence, communication between gatekeepers 420$_2$ and 460$_1$ would be handled by and pass through both border elements 430 and 450 and occur in accordance with the Annex G standard. Messages between border elements, such as elements 430 and 450, are typically carried over UDP. So-called "keep alive" messages are exchanged between the border elements, including "peer" border elements as described below, such that each border element will continually detect whether another border element has failed. H.225.0 messages that are exchanged between border elements, e.g., elements 430 and 450, include: information download and information update. These messages will be discussed below in their context of use.

Gatekeepers establish service relationships with border elements, in their common domain, to acquire and publish call routing information therebetween within an administrative domain. Further, a border element, e.g., border element 430, in response to a request from a gatekeeper, e.g., gatekeeper 420$_1$, in the same domain as the border element can request routing information for calls outside its zone and its domain from a border element associated with a domain containing a called telephony endpoint.

Gatekeeper-to-gatekeeper messages are represented by line 413 for messages between gatekeepers 420$_1$ and 420$_2$ and line 465 for messages between gatekeepers 460$_1$ and 460$_2$. Gatekeeper-to-border element messages are represented by lines 423 and 427 for messages between border element 430 and gatekeepers 420$_1$ and 420$_2$, respectively; and by lines 453 and 457 for messages between border element 450 and gatekeepers 460$_1$ and 460$_2$, respectively. Messages between border elements and gatekeepers are passed typically using UDP (user datagram protocol). Here too, "keep alive" messages are exchanged between each gatekeeper and its corresponding border element such that both elements will continually detect whether the other has failed. H.225.0 messages that are exchanged between gatekeepers and a border element include: service request/service confirm/service reject; descriptor ID request/descriptor ID confirm/descriptor ID reject; descriptor request/descriptor confirm/descriptor reject; and descriptor update/descriptor update acknowledge. These messages will also be discussed below in their context of use. Border element functionality, as will be discussed in conjunction with FIG. 5 below and with other successive figures, being software implemented may exist in combination within other H.323 elements, such as a gateway or even a gatekeeper.

Each gatekeeper itself is an H.323 entity on the network that principally provides address translation and controls access to the network for other H.323 devices, such as H.323 telephony endpoints and other gateways. A gatekeeper is logically separate from the telephony endpoints; however, its physical implementation may coexist with a terminal, gateway or other non-H.323 network device.

In particular, each gatekeeper provides address translation by translating between an Alias Address (phone number) of a telephony endpoint and its network transport address (IP address). This translation is effected through a translation table, which is updated using registration messages and other methods, as described below. Further, each gatekeeper provides admissions control by authorizing network access, through H.225.0 messages, based on, e.g., call authorization, network bandwidth required and available, or other criteria, and also controls bandwidth by regulating bandwidth allocated to any call transported over the data network. Each gatekeeper provides these functions for both telephony endpoints and gateways that have registered with that gatekeeper, thus effecting zone management.

H.225.0 messages that involve a gatekeeper include: gatekeeper request/gatekeeper confirm/gatekeeper reject; registration request/registration confirm/registration reject; admission request/admission confirm/admission reject; disengage request/disengage confirm/disengage reject; information request/information request response/information request acknowledge/information request nack (no acknowledge); and bandwidth request/bandwidth confirm/bandwidth reject.

Furthermore, each gatekeeper can provide various optional functions, as needed. One such function is call control signalling. Here, the gatekeeper may choose to process call signalling information that occurs between two telephony endpoints themselves and thus complete the signalling rather than handing that function off to the another element. Alternatively, the gatekeeper may direct the two telephony endpoints to connect a call signalling channel directly to each other, thus avoiding a need for that gatekeeper to handle H.225 call control signals. Another such optional function is call authorization. Specifically, through the use of the H.225 signalling, a gatekeeper may reject calls from a telephony endpoint due to an authorization failure. The reasons for such a rejection may include, e.g., restricted access to/from particular telephony endpoints or gateways, and restricted access during certain periods of time. An additional optional function is bandwidth management. Here, a gatekeeper controls a number of H.323 telephony endpoints permitted simultaneous access to the data network. Through the use of the H.225 signalling, the gatekeeper may reject calls from a telephony endpoint due to bandwidth limitations. This may occur if the gatekeeper determines that insufficient bandwidth is available on the data network to support a requested call. This function operates during an active call whenever a telephony endpoint requests additional network bandwidth. Furthermore, a gatekeeper provides desired call management functionality. This includes, e.g., maintaining a list of ongoing H.323 calls. Information contained in this list may be necessary to indicate that a called telephony endpoint is busy and/or to provide information for the bandwidth management function. Lastly, a gatekeeper can reserve network bandwidth for telephony endpoints that lack this function and can provide directory services to access and supply directory information for translation between aliases and network transport addresses.

Back-end services 440 are available, via network links, to various H.323 entities located within the domains and provide various centralized functions needed to support call completion throughout the H.323 environment. These functions include user authentication or authorization, accounting, billing, rating/tariffing and other administrative and support functions best provided on a centralized basis from a remote server or data center. Furthermore, back-end services 440 can also provide call routing information to requesting entities for those destination endpoints that can not be resolved on an inter-domain basis.

As shown, back-end services 440 can communicate with Administrative Domain A through links 442 and 444 to gatekeeper $420_1$ and border element 430, respectively, and with Administrative Domain B through links 448 and 446 to gatekeeper $460_1$ and border element 450, respectively. Back-end messages to gatekeepers $420_2$ and $460_2$ will be accommodated through inter-gateway messaging carried over links 413 and 465 from gateway $420_1$ to gateway $420_2$, and from gateway $460_1$ to $460_2$, respectively; as well as in a reverse direction.

As defined in the H.323 standard, an H.323 telephony call begins with a specific call set-up procedure and ends with a specific call termination procedure—both of which are discussed in detail below.

Inasmuch as the telephony endpoints, such as, e.g., endpoints 405, 410, 470 and 475, are to inter-network with a switched telecommunications network, e.g., the PSTN, rather than just confine their operation to an IP data network, each call involving one of these endpoints terminates at an appropriate gateway where data for that call is converted, as discussed above in the context of FIG. 2, to a proper representation for carriage over a desired network, either the PSTN or the private data network.

Our inventive gateway uses standardized call signaling protocols and packetization as defined in the H.225 standard. Inasmuch as the H.225 and H.323 standards are well-known in the art, for the sake of brevity, we will omit a detailed discussion of the specific procedures and messaging undertaken in the gateway and the endpoints that are implemented as specified in and hence compliant with these standards.

Figure 4B:
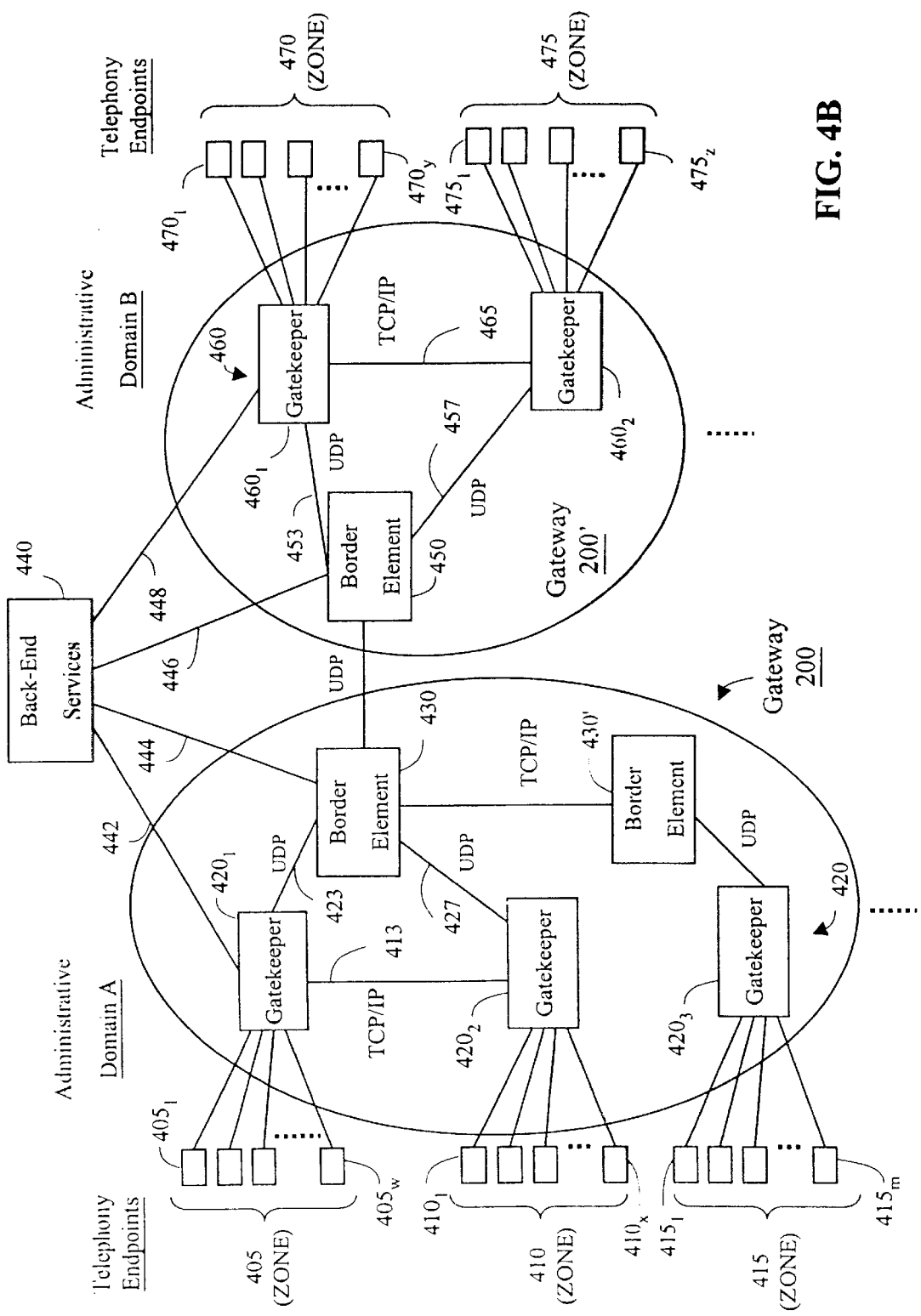
FIG. 4B depicts a variant of the reference model shown in FIG. 4A which employs peer border elements according to our present inventive teachings.

In accordance with our present inventive teachings, we have extended the H.323 reference model to incorporate peered border elements within a single administrative domain. These border elements provide increased fault tolerance and redundancy. FIG. 4B shows such an extended reference model. Since most elements in this extended reference model are identical with those shown in FIG. 4A, we will only focus on those that are additional. Inasmuch as the network topologies shown in FIGS. 4A and 4B are merely illustrative, those skilled in the art will realize that a wide variety of different topologies of differing complexities which still incorporate the concepts shown in these two figures can be utilized in any actual network implementation.

As shown in FIG. 4B, administrative domain A includes border element 430 (also included in the reference model shown in FIG. 4A) and its peer border element 430'. Though preferably two border elements can be established as "peers", more than two can be utilized as well. Since presently, two border elements are used as "peers" to simplify configuration and testing, we will limit the ensuing discussion to that particular configuration. However, it will be readily apparent to anyone skilled in the art how to extend the architecture of a domain to include an increased number of border elements all operating as "peers" of each other. Though any or all of the administrative domains can include peered border elements, we will also limit our discussion to only one such administrative domain.

Peered border elements 430 and 430' function together and behave as a single monolithic border element, i.e., one "logical" border element, but with their functionality being duplicated across both such elements. Hence, if either border element fails, the other can provide inter-domain routing and inter-zone routing within a common administrative domain. Peer border element 430' also handles communication, for gatekeeper $420_3$ for additional zone 415, i.e., zone 415 which contains telephony endpoints $415_1, \ldots, 415_m$ (where m is an integer). Peered border elements preferably have a loosely coupled distributed architecture, with no hierarchical differences. Such border elements, in a "peered" relationship, are not operated in a master/slave or active/standby basis. Transactions from gatekeepers or one border element in a domain, e.g., such as border element 430 functioning as an external border element (i.e., it provides external access into the domain), are shared with its peer border element, here 430'. As such, transaction data stored in one peered border element remains synchronized with that stored in the other such that either one border element can immediately undertake transaction processing should its peer border element fail or be taken out of service. As indicated in FIG. 4B, peered border elements 430 and 430' in a common administrative domain establish TCP/IP connections between themselves, with two connections existing: one originating at each such element and terminating at the other. Hence, each border element in a "peered" configuration has both TCP/IP server and client connections. H.225.0 messages between peer border elements, similarly to those between external border elements (such as elements 430 and 450), include information download and information update messages, as well as to establish and disconnect TCP/IP connections therebetween.

The information download message is sent by one "originating" border element to its peer, upon establishing a TCP connection with that peer. This message shares all the call routing capabilities of the originating border element with its peer. The message contains local service relationships (internal to a domain), local descriptors, external service relationships (external to a domain) and external descriptors. The local service relationships define transport addresses of each of the gatekeepers that have a service relationship with the originating border element. The local descriptors define, in accordance with the Annex G standard, routing descriptors and are obtained from either a static configuration of the same domain as the originating border element or from gatekeepers, located within this domain, that have established service relationships with the originating border element. The external service relationships define, for the originating border element, here, e.g., element 430, transport addresses of those border elements external to this domain, such as border element 450 which resides outside of administrative domain A, that have established a service relationship with the originating border element. The external descriptors define, in accordance with the H.225 standard, routing descriptors, that are obtained from either a static configuration of the H.323 environment or from border elements, located external to the domain that contains the originating border element, that have established service relationships with the originating border element. An information update message is sent from the originating border element to its peer in order to notify the latter of a change either in information affecting a gatekeeper located within the same domain or information received from a border element located external to this domain. The particular border element within an pair of "peered" border elements that originally received such information is responsible to send that information to all its peers.

For further details on the H.323 and H.225 standards including Annex G, the reader is referred to for: (a) the H.225 standard: "Series H: Audiovisual and Multimedia Systems, Infrastructure of audiovisual services—Transmission multiplexing and synchronization, Call Signaling Protocols and Media Stream Packetization for Packet-based Multimedia Communications Systems", *ITU-T Recommendation H.225.0, draft version 3*, May 1999; (b) the Annex G standard: "Annex G—Communication between Administrative Domains" (referred to herein as "H.225"), ITU, *Draft of H.225.0 Annex G for decision*, May 17–28 1999; and (c) for the H.323 standard: "Series H: Audiovisual and Multimedia Systems, Infrastructure of audiovisual services—Systems and terminal equipment for audiovisual services, Packet-based Multimedia Communications Systems", *ITU-T Recommendation H.323, version 3*, May 1999, all of which are incorporated by reference herein. The reader is also referred, for details of the control protocol used in the invention between H.323 elements, such as, e.g., gatekeepers and endpoints, to "Series H: Audiovisual and Multimedia Systems, Infrastructure of audiovisual services—Communication procedures, Control protocol for multimedia communication", *ITU-T Recommendation H.245*, July 1997—which is also incorporated by reference herein.

3. Call Processing Software 500—Constituent Processes and Other Software

With the above in mind, we will now turn to FIG. 5 which shows a detailed block diagram of call processing software 500 that forms a portion of software 300 used in our inventive gateway. As indicated in a key shown in FIG. 5, circular and rectangular blocks correspondingly designate processes, and drivers and other software modules; thick solid lines denote data paths; thick and thin dashed lines denote signaling and configuration information paths, respectively; and thin solid lines denote paths for other software interactions. We define a "process" as an independent execution entity of which the system operating system is aware. A process can contend for system resources then controlled by the operating system, such as, e.g., the processor, memory and input/output (I/O) access. A process can be divided into multiple tasks, each of which is a logical entity of which the operating system has no knowledge.

Though the inventive gateway uses an event-driven multitasking pipelined software architecture, for simplification, we have intentionally omitted nearly all details of these aspects of the architecture from the ensuing discussion. Such details are conventional in nature; hence, their use in implementing the software used in our present inventive gateway would be readily apparent to any one skilled in the art.

As shown, overall functionality of software 500 can be divided into four basic sections: data section 510 which includes, solely for purposes of illustration separate sections $510_A$ and $510_B$; call processing section 550; call switching section 580 and call signaling section 590. Data section 510 controls transmission and reception of packetized traffic, including packetized telephony, over the LAN connection to the gateway, as well as converting, for any VoIP call, between its TDM telephony representation, in G.711 compressed form, and its IP data packet representation, with G.723 compression.

Call processing section 550 manages the H.323 environment in which the gateway functions; allocates call handling resources to process a call; and routes telephony calls over either the PSTN or data network and, through interaction with voice packet handler process (VPH) 517 and TASQ process 537 within data section $510_A$, switches those calls back and forth between the PSTN and the data network, as warranted by QoS then being provided over the data network. Call signaling section 590 generates appropriate telephony signaling information for use by the PSTN or the PBX for properly routing calls, either through the PSTN or over the data network, between the gateway and the PSTN, and between the gateway and the PBX, respectively.

Though not specifically part of any of the sections, software 500 also contains command and manufacturing test library 575, buffer manager 593, timer manager 594, inter-process communication facility 595, and event log server 596.

Command and manufacturing test library 575 provides a library of commands through which a user can interact, such as through a console or personal computer, with the gateway, through either RS-232 driver 539 and a serial port provided on the gateway. Through such interaction, a user can set system configuration parameters, invoke various internal test procedures, and perform other functions provided by the gateway, such as, e.g., reading internal event logs, downloading internal operational statistics, and updating various software modules, such as DSP drivers.

Separate pools (not specifically shown) of data and control buffers are provided in the gateway for dynamic allocation and use by any requesting process. These pools are managed by buffer manager 593. The control buffer pool, which contains a number of 268-byte buffers, are used to send signaling messages between HDLC (high-level data link controller (D channel)) driver 592 and various processes, specifically, Q.921 process 572, Q.931 process 577, T1AB process 575 and call handler process 560—all of which will be discussed below. In addition, other processes can utilize these buffers for sending inter-process control communication amongst themselves. The data buffers, having a number of 256-byte buffers, are used to transport data messages between Ethernet driver 533 and VPH process 517. Each of these buffers is sufficiently large to accommodate an RTP header (12 bytes long) and 240 ensuing bytes of voice samples, which, in the absence of using G.711 compression, store approximately 30 msec of voice samples.

Timer manager 594 provides and manages various software-based timers for various requesting processes and drivers. This manager starts and stops timers, as needed. For processes, manager 594 delivers a Timer Expiry message to a process that had previously set a now expired timer.

Device drivers interact with manager 594 through a call back approach inasmuch as device drivers are incapable of receiving a message. In use, manager 594 receives a timer interrupt every 10 msec during which this manager determines if any active timer has then expired and, if so, delivers identification of that timer in an interrupt service domain.

Inter-process communication facility 595 implements an interface mailbox for each process through which that process communicates with device drivers and other processes. This mailbox consists of a doubly-linked queue head and other information to facilitate inter-process event signaling. A calling process, i.e., a process that is sending a message to, e.g., another or "called" process, sends a message to the latter by identifying a particular message buffer, and placing that identification into a mailbox of the called process. If necessary, an event is generated to "wake up" the called process upon delivery of a message. A message consists of a system message header and a variable length data field. The header specifies message type and, a unique system identification (USID) associated with the calling process. Each process and driver has an associated two-byte USID. A USID is associated with each different function, not with a given hardware device, such as a specific circuit. A USID has two single-byte components: a major device number and a minor device number. A device is assigned a major device number, with each different function provided by that device being assigned a different minor device number. Processes are viewed as "virtual" devices, with their one major device number, and each different task associated with that process having a different minor device number. Through this approach, a process can receive a message from another process as well as receive incoming data or an event from a device driver.

Event log server 596 maintains an event log table and provides an event log service. Through this service, certain commands can be used to generate events which will write an entry into, and, hence, update the event log. This log can be read by a user by issuing appropriate Telnet commands which are routed by command and manufacturing test library 575 to Telnet process 526.

Now, turning to the specific sections of software 500, we will first address data section $510_A$.

As depicted, data section $510_A$ contains, from the standpoint of processes: idle process 502, configuration manager (CM) 505, web server 514, VPH 517, HTTP (hypertext transfer protocol) server 520, FTP (file transfer protocol) server 529, Telnet server 526, SNMP (simplified network management protocol) process 538, and TCP/IP process 535. This section also includes, with respect to drivers: DSP driver 519, Ethernet driver 533 and RS-232 driver 539; and with respect to other software modules: watchdog timer module 507, database 508, web pages 511 and flash memory programming module 523.

In particular, upon power-up of the gateway, a boot program stored in flash memory 205 (see FIG. 2) copies executable program code from the flash memory into SDRAM 210 and then transfers execution to the program copy then residing in SDRAM. Copying the code and subsequently executing it from SDRAM is substantially faster than executing that code directly from the flash memory. Once this code begins executing from SDRAM, it initializes various configuration tables, boots the operating system and then passes control to the operating system. The operating system starts configuration manager 505 as a first process to be executed, with it, in turn, spawning all other processes, as needed. The configuration manager also initializes buffer manager 593, timer manager 594 and event log server 596. Once this occurs, the configuration manager then initializes all the device drivers and other software modules requiring initialization. Also, upon occurrence of a power-on reset condition, configuration manager 505 clears the event log and all statistics counters. In addition, the configuration manager also starts watchdog timer driver 507. This driver regularly and periodically strobes (resets) a hardware-implemented watchdog timer situated within the microcontroller to continually re-start its timing interval. In the event of a catastrophic failure condition which halts software execution, the watchdog timer will reach the end of its timing cycle and generate an alarm condition, as well as cause relays 265 and 275 (see FIG. 2) to assume their normally-open position and hence bypass the gateway.

The configuration manager also maintains configuration information within database 508 shown in FIG. 5. This information contains two basic portions: unit-specific information, i.e., for a specific gateway in which software 500 is executing, and H.323 domain-wide information. Unit-specific information, i.e., a so-called "profile", is separately configured for each gateway operating in the H.323 environment. Domain-wide information can be entered into any one gateway which, in turn, will distribute, using a multicast mechanism, that information to all other gateways in the same administrative domain. Domain-wide information includes, e.g., H.323 registration information of each gateway, border element and telephony endpoint in that domain. As discussed below, as each, H.323 element registers with a given gatekeeper, that gatekeeper, through an associated border element, broadcasts that registration data to every other gatekeeper in the same administrative domain such that each gatekeeper and border element in the domain knows the existence and address of every other H.323 element in the domain. The converse occurs as each H.323 element de-registers and leaves its domain. This database can be dynamically updated, to reflect current configuration status, by any of a number of different processes: web server 514, SNMP process 538, gatekeeper 700, call handler 560, Q.931 process 577 and border element 900. Database 508 also stores the routing (translation) tables. Both the profile and system-wide information, as well as the routing tables, are stored within flash memory 205 (see FIG. 2) to provide non-volatile storage across system resets and power cycles.

TCP/IP process 535, shown in FIG. 5 and which lies at a heart of data section $510_A$, implements a basic routing engine within the gateway. Specifically, this process implements a TCP/IP (transmission control protocol/internet protocol) stack with destination based IP routing. This process performs all processing of entries in this stack for IP, TCP, UDP and ARP (address resolution protocol) protocols. A conventional "sockets" interface is provided by process 535 to permit communication, at a top layer of the stack, with local IP applications, specifically: VPH 517, HTTP server 520, FTP server 529, Telnet server 526, SNMP (simplified network management protocol) 538, TASQ process 537, Gatekeeper (GK) 700, event server 555 and P.323 process 553. A common network interface, situated at a bottom layer of the stack and communicating with Ethernet driver 533, facilitates network communication with the stack through an Ethernet (LAN) connection. In particular, process 535 accepts incoming IP packets from the LAN, as supplied by Ethernet driver 533. In that regard, each of these packets, as conventionally occurs, was encapsulated, as payload data, within an Ethernet packet and is extracted therefrom by the Ethernet driver. As such, process 535 routes the IP packet to either one of the local applications or protocols for processing, based on a protocol ID and well-known port number contained within the packet. Similarly, process 535 can route IP packets generated by any one local IP application to another for processing by the latter. Since the HTTP, FTP, Telnet and SNMP processes are all conventional, we will not discuss them in any further detail.

As noted above, software updates, such as to a driver or process, can be provided, via user entered telnet commands, through FTP process 529 to the system. Any such update, in the form of replacement code, is written, through use of flash programming module 523, into flash memory 205 (see FIG. 2) and, as such, overwrites a corresponding prior version of the code.

Conventional web server 514 shown in FIG. 5, operating through HTTP server 520, provides access to pre-defined web pages 511, with user entry dialogs, through which the user can enter configuration information into the gateway. Once such information is entered, web server 514 writes this information into appropriate locations within database 508. Whenever a user, such as through a browser executing on a personal computer (PC) or workstation residing on the LAN, attempts to establish a TCP/IP connection to the gateway, HTTP server 520 starts which, in turn, instructs web server 514 to download an appropriate entry "home" page to that user. Telnet server 526 implements a server side of the Telnet protocol which permits a telnet client, executing on that PC or workstation, to communicate with the gateway. A user interface is provided, via command and manufacturing test library 575, through which, as discussed above, the user can interact with the gateway, and, e.g., update software through FTP process 529, download log entries, execute various manufacturing tests (such as T1/E1 framing, loopback, LED tests and others), and so forth. SNMP process 538 is a client SNMP process that encodes and transports network management messages, such as locally generated alarms, to a remote standardized SNMP management platform and permits configuration of the gateway through that platform.

Furthermore, TCP/IP process 535 can also route outgoing IP packets, via Ethernet driver 533, for carriage over the LAN for external processing. As discussed below, these outgoing IP packets can be locally generated VoIP packets containing near-end voice, data or facsimile information originating with a caller which, in turn, are routed by the LAN to the private data network and from there to a remote gateway for eventual conversion into TDM signals and termination at a destination PBX that serves a called directory number.

For each VoIP call transiting through the gateway, VPH process 517 bi-directionally handles voice packets associated with that call. Specifically, incoming G.711 packets, containing voice data originating in a TDM channel from a local PBX, are provided by call handler process 560, as shown in FIG. 5, to VPH process 517. This latter process provides these packets to DSP driver 519. This driver, in turn, routes these packets to an allocated channel on an assigned DSP (one of DSPs $225_1, \ldots, 225_8$) for conversion into G.723 compressed form. The resulting G.723 packets are then returned to the VPH which, in turn, encapsulates these packets with appropriate IP call routing information into IP packets. The call routing information includes destination and originating IP addresses, associated with the called and calling directory numbers and defined in the translation table stored within database 508, accessed by the call handler and supplied to VPH process 517. Thereafter, VPH process 517 supplies these IP packets to TCP/IP process 535 for routing to the LAN and, from there, to the private data network for carriage to a far-end peer gateway. The VPH processes data packets incoming from the LAN in an opposite fashion, to that described above, to provide corresponding G.711 packets, to the call handler process, for eventual conversion into a TDM channel and application to a local PBX.

DSP driver 519, through various counters and buffers, also determines packet loss statistics through conventional RTP (real-time transport protocol—which resides within the UDP) packet sequencing numbers contained in the packets and provides buffer over/under-flow information for use in determining jitter of the network connection for each current VoIP call it is then handling. For each such call, TASQ process 537 conventionally measures latency of the network connection for that call by regularly sending a "ping" to the peer gateway associated with this call and measuring round-trip transit time. The TASQ process also intermittently polls the DSP driver to obtain the packet loss statistics and buffer under/over-flows for each such call. TASQ process 537 then interpolates and, over time, filters this data, received from the DSP driver and, in conjunction with its latency determinations for that call, determines a numeric grade of the network connection then carrying that particular VoIP call. If the grade of this connection is less than a predefined threshold, then the network quality will be deemed insufficient to handle this call. The TASQ process issues an instruction to call handler 560 to switch the call from the private data network to the PSTN. Alternatively, if the call is then being carried over the PSTN, TASQ process 537 continues measuring network quality to determine whether the network quality, which may have decreased below the threshold, has later increased above the threshold necessary to support the call and thus again provide toll bypass and cost savings. To do so, TASQ process 537 regularly sends a "ping" from its gateway to its peer gateway (e.g., gateways 200 and 200' shown in FIG. 1) which collectively serve the calling and called locations for that call. If the numeric grade associated with this gateway-to-peer gateway connection (i.e., over which this call could be routed) is sufficient, based on these latency measurements, then network quality will now be deemed sufficient to support a VoIP call. In this instance, TASQ process 537 issues an instruction to the call handler to switch the call back from the PSTN to the private data network. As such, TASQ process 537 instructs the call handler to switch the call back and forth between the PSTN and private data network based on dynamic changes in QoS then available through the private data network to provide maximum use of the private data network consistent with the QoS it then provides. Inasmuch as techniques used to measure jitter, packet loss and latency and determine quality of a network connection based on these measurements, including through interpolation and filtering, are all conventional in the art, we will omit discussing them in any further detail. Moreover, since PSTN circuit-switched connections consistently provide a very high uniform level of quality, there is no need to specifically measure QoS of these connections; it can simply be assumed to be sufficiently high at all times.

DSP driver 519 also detects, through the presence of in-band facsimile or modem tones, whether a VoIP call then being established through a gateway carries facsimile or modem data and, if so, through suitable interaction with gatekeeper process 700, appropriately changes the compression it uses to handle this data. Since the details of these operations are not relevant to the present invention, they will not be discussed any further.

As such, the reader can now readily appreciate that VoIP packets flow through software 500 in the directions and along the data paths given by thick solid lines 518, 522, 531, 534 and 540 among the VPH process, the DSP driver, the DSPs, the TCP/IP process, the Ethernet driver, and the LAN and private IP data network.

Idle process 502 operates in a preemptive priority mode but at a lowest execution priority (other than an internal idle process executed within the O/S). Process 502 simply determines the status of the microcontroller, in terms of its current workload, and, to detect code corruption, compares software stored in flash memory 205 (see FIG. 2) to that then residing in and executing from SDRAM 210 and generates an error event should it detect an inconsistency.

LED driver 566, contained within section $510_B$ shown in FIG. 3B, suitably energizes, under program control, various LED indicators 569 to indicate current status information, as provided by the configuration manager, of the gateway.

TSI (time-slot interchanger) driver 585, which is the sole component within call switching section 580, provides a control interface to TDM switch 250 and, by doing so, permits call handler 560 to control operation of the switch in order to establish proper time-slot connections therethrough to connect specific time slots associated with caller and called telephony endpoints.

Call signaling section 590 contains three processes: T1AB process 575, Q.921 process 572 and Q.931 process 577; and three drivers: AB bit driver 591, HDLC (D channel) driver 592 and T1/E1 common driver 574. As noted above, section 590 generates appropriate telephony signaling information for use by the PSTN or the PBX for properly routing calls, either through the PSTN or over the data network, between the gateway and the PSTN, and between the gateway and the PBX, respectively.

As noted above, T1/E1 communication links can utilize either channel associated signaling (CAS) or common channel signaling (CCS). T1AB process 575 interacts, through AB bit driver 591, with individual signaling bits A, B provided in CAS and converts the signaling information contained in these bits into a representation usable by the call handler. Process 575, interacting with this driver, also collectively implements a reverse function of converting signaling information provided the call handler into these individual signaling bits. Process 575 and driver 591 are activated only if the T1/E1 link is operated in the CAS mode.

T1/E1 common driver 574, which is utilized with both CAS and CCS mode T1/E1 links, interacts with and controls T1/E1 transceiver/framers 260 and 270 (see FIG. 2) and implements a portion of T1/E1 framing common to both CAS and CCS. This driver detects T1/E1 alarm conditions and sends such detected conditions to call handler process 560, shown in FIG. 5 (though a linkage between these two processes is not specifically shown). HDLC (D-channel) driver 592 (shown in FIG. 5), along with Q.921 process 572 and Q.931 process 577, are all activated only if the T1/E1 links are operated in the CCS mode.

HDLC driver 592 controls operation of a corresponding serial communication circuit (SCC), for use as an HDLC, situated within the microcontroller. This driver is connected, under program control, to a different B- (64 kbits/sec) or D- (16 kbits/sec) channel within the PSTN/PBX T1/E1 link to control data transmission and reception through that particular HDLC from or to a TDM channel on that link. This driver, depending on a direction of data flow through it, either extracts Q.921 messages from information appearing on this TDM slot and applies those messages to Q.921 process 572, or operates in the reverse direction to apply Q.921 messages generated by Q.921 process 572 for carriage through that TDM time-slot. The HDLC driver is assigned to specific SCCs, acting as HDLCs, under program control as conditions warrant. These HDLCs along with a physical layer T1/E1 interface (not specifically shown in either FIG. 2) collectively implement, in hardware, layer 1 of OSI network functionality. Under an event-driven software-implemented supervisor, the microcontroller, in view of current resource requests and then available hardware resources, assigns driver 592 to a given SCC, which is then to be used as an HDLC, in order to handle a desired call through the gateway (e.g., call send or receive).

Q.931 process 577 is conventional and encodes outgoing signaling messages from CH process 560 into appropriate Q.931 message form for communicating these messages through D-channel signaling to the PSTN or PBX to control call setup and tear-down. Resulting-outgoing Q.931 messages are appropriately encapsulated in a Q.921 information frame, by Q.921 process 572, for subsequent transport over D-channel signaling to either a local central office switch or the local PBX. The processes collectively operate in a reverse direction to process incoming Q.921 information frames and decode incoming D-channel Q.931 signaling messages into appropriate signaling messages for processing by call handler 560. Q.931 process 577, along with Q.921 process 572, collectively implement, in software, well-known layers 3 and 2, respectively, of OSI network functionality.

Call processing section 550 contains gatekeeper process 700, border element process 900 (which includes a counterpart peer border element process, not specifically shown), event server 555, call handler process 560, H.323 driver 563 and P.323 process 553. As discussed above, this section manages the H.323 environment in which the gateway functions; allocates call handling resources to process a call; and routes telephony calls over either the PSTN or data network and, through interaction with VPH process 517 and TASQ process 537, switches those calls back and forth between the PSTN and the data network, as warranted by QoS then being provided over the data network. Gatekeeper process 700 and border element process 900 utilize configuration information stored in database 508, as well as write such information into the database. These two processes have been discussed above to the extent necessary for a clear understanding at this level, but will be discussed in considerably greater detail below in conjunction with lower-level block diagrams shown in FIGS. 7, 9–10 and messaging, shown in subsequent diagrams, that flows within a gateway and between peer gateways to implement inter-gateway telephony call processing.

Call handler (CH) process 560 implements all call control functions in the gateway. In particular, the call handler process appropriately routes calls over particular trunks between the PBX and either the data network or PSTN— with "trunks" in this context being viewed as a logical entity encompassing communication channels to the PBX, the PSTN or the data network. Through an internal auto-switch manager, the call handler also implements auto-switching functionality, i.e., switches a telephony call between PSTN and data network connections, in response to dynamic changes in QoS conditions on the data network. The CH also handles signaling protocols related to incoming and outgoing calls.

In particular, CH process 560, through interaction with both DSP driver 519 and TASQ process 537 as to current QoS of a data network connection, routes a telephony call over either the PSTN or through the data network, through directing an incoming TDM call from the PBX, via the TDM switch, either out to the PSTN or to VPH process 517. This latter process, as discussed above, directs G.711 packetized telephony information to a DSP, through DSP driver 519, which converts this information into suitable G.723 compressed IP packets, which, in turn, are routed, via TCP/IP process 535 and Ethernet driver 533, onto the LAN connection to the private data network. CH process 560, in response to instructions from TASQ process 537 resulting from its dynamic determinations of QoS of the private data network, switches a call back and forth between the PSTN to the IP network, consistent with changes in the QoS. Furthermore, CH process 560 implements selective call routing through which that process determines, based on predefined called number information, e.g., predefined called numbers and lists of bypass telephone numbers (BPNs) and exchanges, stored as configuration information within database 508, whether certain calls, such as emergency calls or local calls, must be routed through the PSTN and not through the private data network, and routes those calls accordingly. CH process 560 also processes, through message passing, incoming and outgoing T1/E1 signaling messages, received from either T1AB process 575 or Q.931 process 577, to establish proper call routes through the PSTN and local PBX, i.e., to perform incoming call routing for those directory numbers which the call handler effectively terminates. CH process 560 also manages T1/E1 channels, and allocates and assigns an individual DSP, via DSP driver 519, to a corresponding T1/E1 TDM channel for use in initiating a corresponding VoIP call and thereafter for performing voice processing for the duration of that call, after which CH 560 frees that DSP for subsequent re-assignment and use for another such call. CH process 560 also processes T1/E1 alarms, as discussed above, detected by T1/E1 common driver 574. Furthermore, the CH process controls, as noted above and through TSI driver 585, operation of the TDM switch within the gateway. CH process 560, operating in conjunction with H.323 protocol stack 563 through function calls, processes, in accordance with the H.323 standard, incoming H.225.0 call control messages and generates such outgoing H.225.0 messages. Inasmuch as stack 563 is implemented using a library, i.e., this stack is process-less, portal H.323 process (P.323 process) 553 provides a TCP/IP transport layer interface to the stack. Process 553 connects through a socket into TCP/IP process 535 and performs read and write operations into H.323 stack 563 in order to provide H.225.0 messages destined to CH process 560 and transport such messages generated by the CH process over the LAN and, from there, the private data network.

Event server 555 communicates with CH. process 560 and collects and stores call events and also implements a server side of the Telnet protocol on a port number other than standard telnet port 23. A telnet client or custom application executing on a user PC or workstation can communicate with this process and read the stored call events. These call events, which include, e.g., call connect and call disconnect, can be subsequently processed through that PC or workstation to generate, e.g., so-called "call detail recordings" for later use in call accounting and billing or other purposes.

Though, for simplicity, we have shown and described call processing software 550 as containing a single gateway and a single border element, this software can implement multiple different gatekeepers and multiple different border elements, each being a different instance of gatekeeper process 700 and border element process 900, respectively, depending on those portions of an actual network topology implemented through a single gateway. In addition, for large network topologies, any instance of the gatekeeper and border element can be implemented through an external computing system, such as a personal computer or workstation, that has appropriate network and software interfaces to the remainder of the gateway. Since such interfaces would be conventional and readily apparent to those skilled in art, we will omit all such details thereof.

FIG. 6 depicts table 600 which shows relative execution priorities of processes that constitute call processing software 500. As can be seen, TCP/IP process 535 and CM process 505 each possesses a highest relative execution priority (value 255). Assigning such a priority to TCP/IP process 535 minimizes VoIP call latency through the gateway. Assigning an equally high priority to CM process 505 ensures that this process will properly and regularly, through watchdog timer driver 507, reset the watchdog timer while the gateway is normally operating and thus prevent that timer from inadvertently, due to a busy processing workload, expiring and generating an erroneous catastrophic alarm condition. VPH 517 is assigned a next lower priority level (value 200) but which is sufficiently high, given that the VPH lies in the data path for VoIP packets, to substantially reduce any latency which these packets might otherwise experience through the gateway. Both gatekeeper process 700 and border element process 900 (along with its peer border element process) are each allocated relative execution priority 150 with various call control and signaling processes, specifically CH process 560, T1AB process 575, P.323 process 553, Q.931 process 577 and Q.921 process 572 all sharing a next lower execution priority value of 100. Idle process 502 is assigned a lowest execution priority (value 10), apart from an idle process internal to the O/S, with all other processes utilized within call processing software 500 sharing a higher relative execution priority value (of 50) than that of Idle process 502.

a. Gatekeeper Process 700

Figure 7:
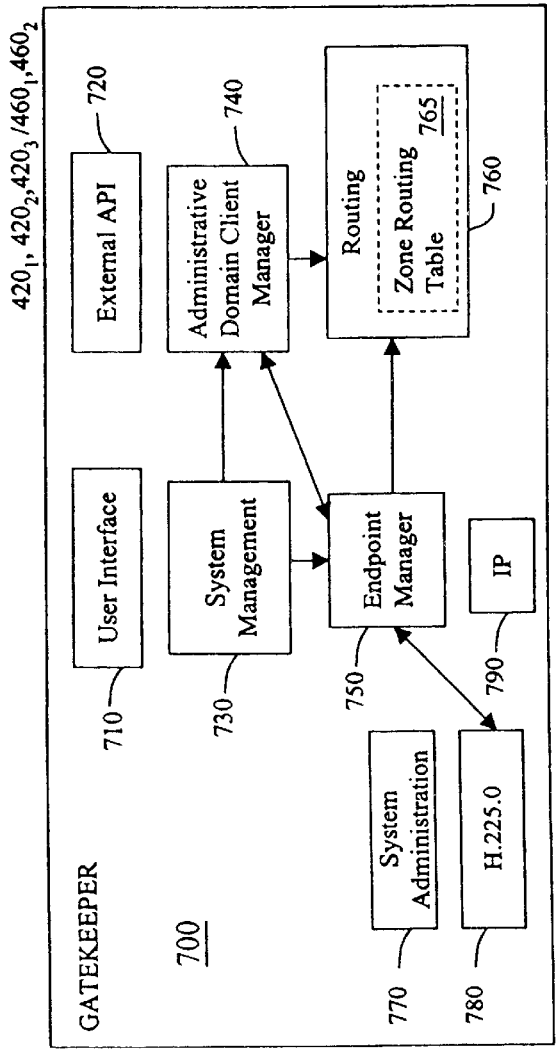
FIG. 7 depicts a block diagram of gatekeeper 700 that forms part of call processing software 500 shown in FIG. 5 and also shown as each of gatekeepers 420$_1$, 420$_2$, 420$_3$, 460$_1$ and 460$_2$ in FIG. 4B.

FIG. 7 depicts a block diagram of the software that implements gatekeeper process 700. Gatekeeper process 700 implements each of gatekeepers $420_1$, $420_2$, $420_3$, $460_1$ and $460_2$ depicted in FIG. 4B.

As depicted in FIG. 7, gatekeeper process 700 contains user interface 710, external API (application programming interface) 720, system management process 730, administrative domain client manager 740, endpoint manager process 750, routing process 760, system administration process 770, H.225.0 process 780 and IP process 790.

Block 710 implements a user interface to the entire gatekeeper for determining and diagnosing problems with the gatekeeper, as well as for user management of the gatekeeper and to obtain stored statistics from the gatekeeper. External API block 720 provides an API interface which can be used to extend functionality of the gatekeeper for its integration into a larger system, such as a call center or automatic call distributor. Routing process 760 implements endpoint routing. In particular, routing process 760 contains internal routing table 765 which specifies routing information, in terms of directory numbers, endpoint aliases and H.323 endpoint identifiers, for all H.323 endpoints in the zone which that gatekeeper manages. To reduce processing delays, routing process 760 stores, in an internal cache memory (not shown), endpoint addresses to which that process has recently routed calls. System administration process 770 implements various administrative functions, such as bandwidth and zone management, policy and admissions of entities, such as endpoints or gateways, in the zone.

Administrative domain client manager 740 implements appropriate functionality necessary for establishing service relationships between a gatekeeper and a border element in order for the gatekeeper to publish its call routing capability, through that border element (and to its peer border element), to every other gatekeeper in the same administrative domain. Manager 740 also resolves addresses that are not contained within either an internal routing table, specifically table 765, residing within a gatekeeper or an external table (as discussed below in conjunction with border element 900 shown in FIG. 9) associated with that gatekeeper, or in cache memory associated with that gatekeeper.

Endpoint manager 750 manages H.323 endpoints which includes registration and de-registration of endpoints (e.g., gateways and telephony endpoints—both of which are viewed as "endpoints" under the H.323 standard), allocating and de-allocating network bandwidth associated with a call, call routing between telephony endpoints and appropriate endpoint address translation for use by routing process 760. This translation applies to outgoing calls and entails conversion of a calling directory number into one or more IP addresses, as needed. The gatekeeper also utilizes an external table (not shown) which provides routing information for all other H.323 endpoints in the same administrative domain as the gatekeeper.

H.225.0 process 780 processes the H.225 protocol and, as such, encodes and decodes H.225.0 messages accordingly outgoing from and incoming to the gatekeeper, respectively, to or from a border element or H.323 endpoint. IP process 790 implements UDP, TCP and IP network layers of the TCP/IP protocol, and interacts, as needed, with all the other processes in the gatekeeper to provide network communications.

Lastly, system management process 730 configures the entire gatekeeper, supervises operation of the gatekeeper, and both gathers operational statistics from and manages faults for the gatekeeper. Illustratively, an SNMP client (not shown), embedded within block 730, is used to manage and communicate fault information to a requesting process.

We will now discuss the general process interactions shown in FIG. 7 with, where appropriate in this discussion, the corresponding messages shown in parenthesis.

As shown, system management process 730 communicates with both endpoint manager 750 and administrative domain client manager 740. Through interaction with the endpoint manager, system management process 730 sets a bandwidth table that endpoint manager 750 utilizes in allocating and de-allocating network bandwidth to calling endpoints (Set Bandwidth), as well as setting different IP addresses to which the gatekeeper will listen for H.323 discovery request and registration request messages. Bandwidth allocation and de-allocation include reserving available network bandwidth for a call, adding bandwidth to a call then in progress and freeing network bandwidth no longer needed for a call. System management process 730 also communicates with administrative domain manager process 740. Through interaction with manager 740, the system management process sets IP addresses of each border element in the administrative domain. Client manager 740 also communicates with routing process 760. Administrative domain client manager 740, through interaction with routing process 760, can clear all external route entries in the external routing table associated with routing process 760 (Flush Network Router), add external route entries to that table (Add Network Address), change an external address (Update Network Address) or remove an external address from routing process 760 (Delete Network Address).

Endpoint manager 750 bi-directionally communicates with administrative domain client manager 740. Through interaction with manager 750, administrative domain client manager 740 notifies (Connect) the former that a specific border element in the administrative domain has connected to another border element external to the domain in order to facilitate call routing therebetween. Also, endpoint manager 750, by interacting with manager 740, informs the latter that a new endpoint has just registered (Endpoint Register) with the gatekeeper or an existing endpoint that had so registered has just de-registered itself (Endpoint De-register).

Furthermore, endpoint manager 750 also communicates with routing process 760. Manager 750, through interacting with routing process 760, requests, for a call to be routed (Route Request), a list of destinations for that call from process 760; adds a zone address to routing table 765 (Add Zone Address); changes a zone address in this table (Update Zone Address); and removes a zone address from this table (Delete Zone Address).

Endpoint manager 750 also receives and sends, through H.225.0 process 780, standard H.225.0 messages to H.323 elements in the zone managed by gatekeeper 700 and receives such messages from these elements. These messages include those set forth in Table 1 below, some of which will be discussed in detail below in the context of messaging sequences that are used in implementing inter-gateway call routing and associated call handling procedures.

TABLE 1

STANDARD H.225.0 MESSAGES

| H.225.0 Message | Purpose |
|---|---|
| GRQ | Gatekeeper request -- sent by an endpoint to discover gatekeepers to which that endpoint can register |
| GCF | Gatekeeper confirm -- sent by a gatekeeper, which will register that endpoint, to confirm a GRQ and identify itself to the requesting endpoint |
| GRJ | Gatekeeper reject -- sent by a gatekeeper, in response to a GRQ, where the gatekeeper discovery request is rejected by a gatekeeper |
| RRQ | Registration request -- sent by an endpoint to its corresponding gatekeeper in order to register itself with that gatekeeper, serve as a basis for "keep alive" signals and transfer call routing information to that gatekeeper, i.e., what PBX stations and PSTN numbers are serviced by that endpoint |
| RCF | Registration confirm -- sent by a gatekeeper to a corresponding endpoint to confirm an RRQ |
| RRJ | Registration reject -- sent by a gatekeeper, in response to an RRQ, when the registration request is rejected |
| ARQ | Admission Request -- sent by a registered endpoint when it is answering or originating a call. This message permits the gatekeeper to screen the call to determine if it is allowed with respect to, e.g., bandwidth restrictions, security restrictions or other reasons |
| ACF | Admission Confirm -- sent by a gatekeeper, in response to an ARQ, to allow an endpoint to complete an attempted call |
| ARJ | Admission Reject -- sent by a gatekeeper, in response to an ARQ, to prohibit an endpoint from completing the call on the data network |
| DRQ | Disengage Request -- an indication sent and received by a gatekeeper, and initiated by an endpoint or gatekeeper, that a call then in progress is to be dropped |
| DCF | Disengage Confirm -- sent by a gatekeeper, in response to a DRQ, to confirm acceptance of a disengage request |
| DRJ | Disengage Reject -- sent by a gatekeeper, in response to a DRQ, if an endpoint requesting to be disengaged is not registered |
| URQ | Unregistration request -- sent by an endpoint to de-register itself from its gatekeeper |

TABLE 1-continued

STANDARD H.225.0 MESSAGES

| H.225.0 Message | Purpose |
|---|---|
| UCF | Unreqistration confirm -- sent, by a gatekeeper to confirm receipt of the URQ |
| URJ | Unregistration reject -- sent by a gatekeeper to reject a unregistration request |
| BRQ | Bandwidth Request -- sent by a registered endpoint to request additional bandwidth for use with an established call, such as, e.g., for use with a facsimile or modem call |
| BCF | Bandwidth Confirm -- sent by a gatekeeper, in response to a BRQ, and indicates maximum allowed bandwidth which a requesting endpoint can use for its call |
| BRJ | Bandwidth Reject -- sent by a gatekeeper, in response to a BRQ, if the gatekeeper is unable to identify the call for which bandwidth is being requested |
| IRQ | Information Request -- used by a gatekeeper to keep in synchronization with each endpoint in its zone. Each gatekeeper periodically sends this message to each of its registered endpoints to obtain current call status information for that endpoint |
| IRR | Information Response -- response from an endpoint to a received IRQ message, or an unsolicited status report from an endpoint to a gatekeeper regarding a specific call |

User interface 710, external API 720 and IP block 790 communicate with all the other constituent elements in gatekeeper 700. However, to simplify the drawings, the links between the former three blocks and the latter elements have all been intentionally omitted from FIG. 7.

b. Call Handler Process 560

Figure 8:
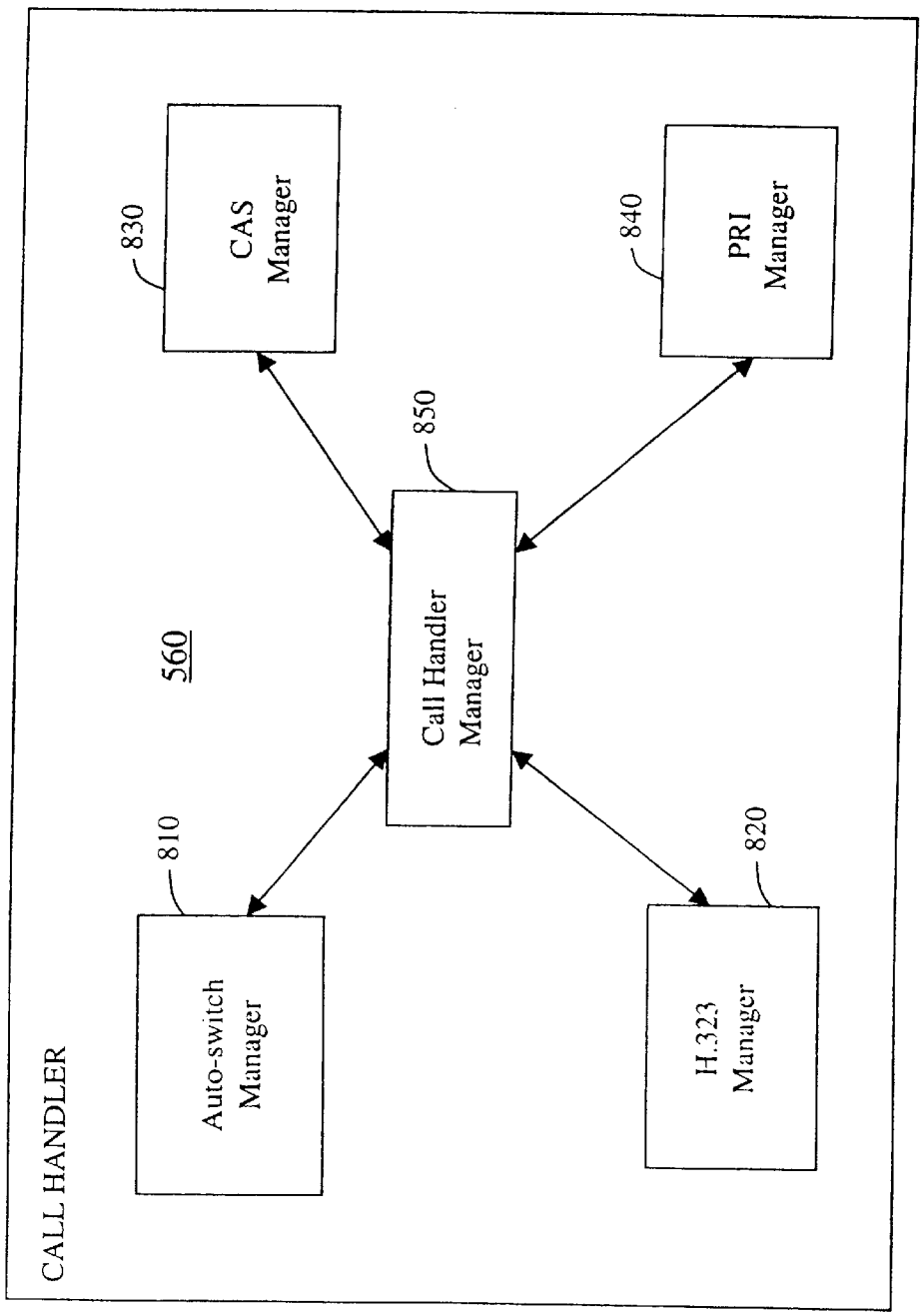
FIG. 8 depicts a block diagram of call handler process 560 that forms part of call processing software 500 shown in FIG. 5.

FIG. 8 depicts a block diagram of call handler process 560. In essence, the call handler is responsible for routing calls between trunk groups. For the purposes of the call handler, a trunk group is a logical entity. Separate such trunk groups are associated with the PBX, the PSTN—the latter two being, e.g., physical T1 (or E1) trunks, and the data network (H.323). A trunk group is associated with a physical signaling method, either CCS (pri), CAS or IP and whether that group is used for the PBX, PSTN or IP (H.323).

In particular, call handler process 560 appropriately routes calls between particular trunks between the PBX and either the data network or PSTN. Through internal auto-switch manager 810, the call handler also implements auto-switching functionality, i.e., switches a telephony call between PSTN and data network connections, in response to dynamic changes in QoS conditions on the data network. The CH also handles signaling protocols related to incoming and outgoing calls.

Call handler process 560 contains auto-switch manager 810, H.323 manager 820, CAS manager 830, PRI manager 840 and call handler manager 850.

Auto-switch manager 810 manages auto-switching by allocating auto-switch identifiers, i.e., identifying, through the CallIds and Calling and Called flags, which calls can be auto-switched, and handling relationships between active IP calls and circuit-switched calls.

H.323 manager 820 provides an interface between a trunk group and H.323 stack 563 (see FIG. 5). This manager also converts appropriate messages into call control functions.

CAS manager 830, shown in FIG. 8, provides an interface between a trunk group and a physical trunk (T1 or E1) using CAS (channel associated signaling). This manager sends call progress messages to and receives such messages from a physical channel. PRI manager 840, is similar to CAS manager 830, provides an interface between a trunk group and a physical trunk using CCS (common channel signaling) rather than CAS.

Lastly, call handler manager 850 contains a list of all the trunk groups that have been configured for use by the gateway. When a call request occurs on any of these trunk groups, the call handler manager determines which trunk group is to receive the call. This manager also routes messages, through various managers in call handler 560, between different trunk groups.

As shown, interactions occur between CAS manager 830 and Call Handler Manager 850, where the latter routes messages between the CAS manager to and from any of the other managers in call handler 560; hence, using the call handler manager as a "relay station" between any of these other managers and CAS manager 830. For simplicity, we will only consider call control messages that are passed between CAS manager 830 and call handler manager 850, even though the latter manager may have passed these messages onward and received responses from any of the other managers prior to issuing its response to manager 830. The messages pertinent to these interactions are particular to CAS.

First, a CH_SETUP message is received by CAS manager 830 indicating a call request is made on a trunk group. In response, Call Handler manager 850 issues a CALL_SETUPACK message back to CAS manager 830 to inform the latter that manager 850 has accepted the setup message and the call for which setup is requested can be routed. CAS manager also provides a CH_DISC message to manager 850 specifying that a particular call can be disconnected. CAS manager 830 also provides a CH_CALLPROC message to manager 850 indicting that an outgoing call is in progress. This particular message contains status information which originates from a switch in the PSTN and indicates that a called directory number has been received by that switch and that switch is attempting to complete the call. CAS manager 830 also provides a CH_ALERTING message to manager 850 to indicate that a call to a called directory number is ringing at that number before that call can be completed. Lastly, CAS manager 830 also provides a CH_CONNECT message to manager 850 specifying that a particular end-to-end voice path has been establish between calling and called numbers.

CAS manager 830 also provides a CH_RESTART message to manager 850 to indicate when a physical trunk has recovered from a loss of synchronization, i.e., a loss of synchronization alarm condition.

Call handler manager 850 can also send a CH_DBUPDATE message to CAS manager 830, PRI manager 840 and/or H.323 manager 820, as needed, to indicate that configuration, including routing, information stored in database 508 (see FIG. 5) has changed.

Manager 850 also receives call control messages from H.323 manager 820, CAS manager 830 and PRI manager 840. Here too, manager 850 acts as a "relay station" in relaying call control messages among any of these latter three managers. These messages, which are functionally very similar to those employed with CAS manager 830, include: a peerRcvSetup message which indicates that a call request is being made, a peerRcvProg message which indicates that a specific call is in progress, a peerRcvAlert message which indicates that alerting is occurring at a called destination, peerRcvConnect which indicates that a specific call has been connected and an end-to-end voice path has been established between calling and called numbers, a peerRcvFacility message which indicates that a facility message has been received, a peerRcvRelease message indicating that a specific call is being ended, and a peerRcvRelComp message indicating that call teardown for a specific call is now complete.

In addition, call handler manager 850 provides an initiate message to auto-switch manager 810 to initiate an auto-switch process in a specific direction and for a particular call specified in the message.

As noted above, call handler 560, through call handler manager 850, is also responsible for determining a destination of all call requests and choosing an appropriate network over which to route each call. In particular, each trunk group has a set of directory numbers associated with it. These numbers can be bypass directory numbers (BPNs); local directory numbers, including just exchange prefixes or area codes, as necessary; or so-called "leaky area directory numbers" (which are toll calls that terminate at the PSTN rather than a PBX and transit through the data network to reduce or eliminate a toll charge for each such call). These numbers are defined during configuration. A trunk group can respond to any type of number for which it is responsible to route calls. When a route is requested to a called directory number, one or more trunk groups are searched to locate a match to that directory number (or just an exchange, if that is configured as a BPN). If a match is found, then that call is routed over that trunk group to that called directory number. However, there are various limitations. Specifically, for calls originating on the data network, only PBX trunk groups are searched for a matching directory number. For calls originating from the PBX, those trunk groups associated with the PSTN are first searched followed by the IP (H.323) trunk groups. Lastly, for calls originating from the PSTN, manager 850 determines whether each such call is an auto-switch call, i.e., a call being auto-switched, and if it is, providing that call to auto-switch manager 810 for subsequent handling. Lastly, if that call is not an auto-switch call, then manager 850 searches the PBX trunk groups for a matching directory number, and then routes the call accordingly.

c. Border Element Process 900

Figure 9:
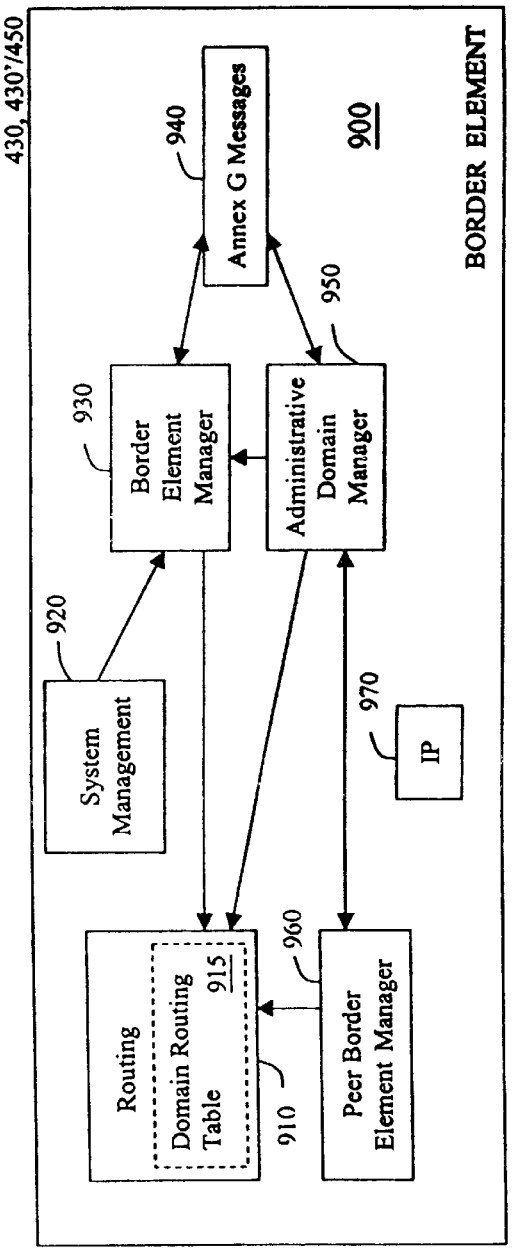
FIG. 9 depicts a block diagram of border element 900 that forms part of call processing software 500 shown in FIG. 5.

FIG. 9 depicts a block diagram of the software that implements border element process 900. Border element process 900, through separate instances executing in separate gateways, implements each of border elements 430 and 450 depicted in FIG. 4B. In addition, a separate instance of this process implements peer border element 430'.

As depicted in FIG. 9, border element process 900 contains routing process 910, system management process 920, border element manager 930, Annex G messages process 940, administrative domain manager 950, peer border element manager 960, and IP process 970.

Routing process 910 contains internal domain routing table 915 which also specifies routing information, in terms of directory numbers, endpoint alias and H.323 endpoint identification, for all directory numbers serviced by the administrative domain in which the border element resides. This table is used to resolve endpoint address requests incoming from other border elements.

Administrative domain manager 950 manages gatekeepers that have requested service relationships with border element 900. Manager 950 provides companion (server-side) functionality to administrative domain client process 740 (see FIG. 7) executing in the gatekeeper. In that regard, manager 950, shown in FIG. 9, updates and provides routing services, through routing process 910, for and between gatekeepers registered in the administrative domain. To route to a called directory number, a calling telephony endpoint requests a gatekeeper to furnish routing information for a called telephony endpoint. If the gatekeeper can locate the called endpoint in its internal routing table (e.g., table 765 in gatekeeper 700 shown in FIG. 7) or its external routing table, the gatekeeper then returns routing information to the calling endpoint. The external table holds a static database containing routing information for all endpoints in the same zone as the gatekeeper and is modified, by the gatekeeper, with information gathered during registration procedures. The internal database contains such information for all endpoints in the same administrative domain. If, however, that gatekeeper can not locate the called endpoint in either of these two tables, it issues a request to its associated border element to resolve the called endpoint address. This request is processed by administrative domain manager 950 which issues a request to all other border elements that have established a current service relationship with the associated border element. If any of the other border elements, through their internal routing tables, can resolve that endpoint address, that border element will return the requested endpoint address to the associated border element.

Border element manager 930 implements appropriate functionality necessary to establish service relationships with other border elements, i.e., such that border elements registered in the H.323 environment, can pass information amongst themselves. Peer border element manager 960 manages relationships themselves that exist between peer border elements which includes establishing and terminating such relationships. As discussed in detail above, peer border elements are formed, for purposes of increased fault tolerance and redundancy, of a plurality, e.g., a pair, of border elements in the same administrative domain, as illustrated in FIG. 4B, and which collectively function as a single "logical" border element.

Annex G message process 940 implements a protocol section of the Annex G standard for communications between border elements. IP process 970, similar to IP process 790 shown in FIG. 7, implements UDP, TCP and IP network layers of the TCP/IP protocol, and interacts, as needed, with all the other processes in the border element to provide network communications.

We will now discuss the general process interactions shown in FIG. 9 with, where appropriate in the discussion, the corresponding messages shown in parenthesis.

As shown, system management process 920 communicates with border element manager 930. Through interacting with manager 930, management process 920 can add a new administrative domain for use in external call routing (outside of the domain in which border element 900 resides) (Add Service) such that service relationships can be established, via manager 930, with that new border element, or remove an administrative domain and terminate such relationships, via manager 930, with the domain being removed. Both border element manager 930 and administrative domain manager 950 communicate with Annex G messages process 940 in order to send and receive Annex G messages to and from other border elements, respectively.

Administrative domain manager 950 communicates with border element manager 930. The purpose of doing so is to inform manager 930 that a gatekeeper, located within the same domain as border element 900, has issued a request to the border element to route a call outside this domain (Route Request). Once this occurs, border element manager 930 communicates with routing process 910 (Route Call) in order to obtain, from a border element in another domain, routing information, including a directory number, for routing that call external to the domain.

In addition, administrative domain manager 950 also communicates with peer border element manager 960 to undertake operations to change information stored in a routing table in a peer border element(s). These operations include adding descriptors (Descriptor Add) resulting from a new endpoint that has just registered itself with a gatekeeper, located in the same administrative domain as border element 900, and which has downloaded all its descriptors to the gatekeeper.

The gatekeeper, in turn, supplies those descriptors to the border element to update routing information stored within corresponding routing tables residing at that border element and its peers. Also, these operations include deleting descriptors (Descriptor Delete) associated with an endpoint as a result of that endpoint having de-registered itself with its gatekeeper. Further, these operations include a border element notifying its peer(s) that a zone has just connected (Zone Connect) to or disconnected from (Zone Disconnect) that border element such that the peer border element can update its routing information.

Administrative domain manager 950 also communicates with routing process 910. Through this communication, manager 950 instructs routing process 910 to add (Add Network Address) an address into routing table 915, change an address stored in this table (Update Network Address) or delete an address residing in this table (Delete Network Address).

Also, peer border element manager 960 communicates with routing process 910 in order to update routing information stored in routing table 915 based on information which this manager has received from its peer border element(s). Such updating includes adding an address into the routing table (Add Network Address), changing an address stored in this table (Update Network Address), and removing an address residing in this table (Delete Network Address).

Since IP block 970 communicates with all the other constituent elements in border element 900, then, to simplify the drawings, the links between block 970 and all the latter elements have all been intentionally omitted from FIG. 9.

Figure 10:
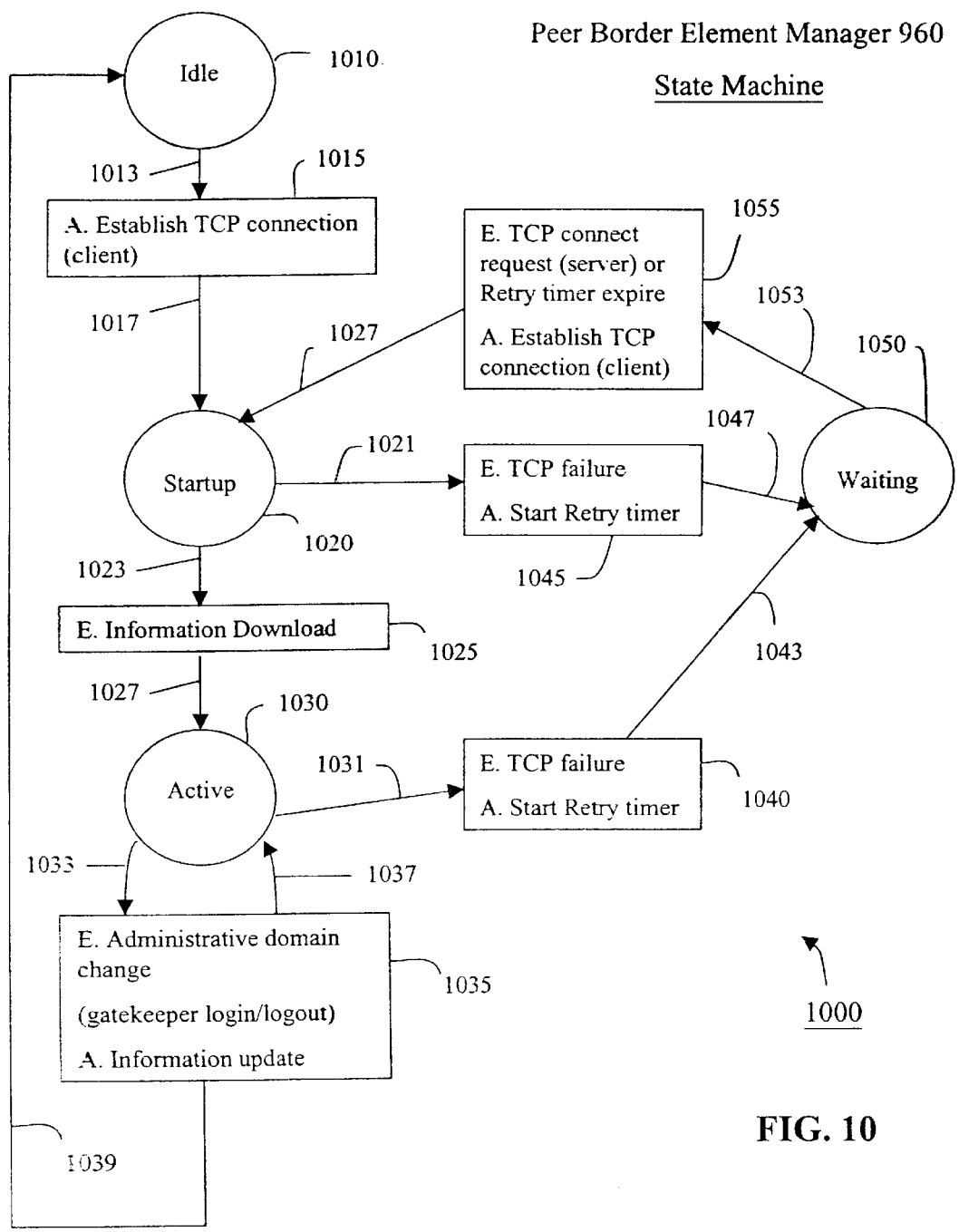
FIG. 10 depicts a state diagram for peer border element manager 960 shown in FIG. 9.

FIG. 10 depicts a state diagram (i.e., for state machine 1000) for peer border element manager 960 shown in FIG. 9. To readily distinguish, in this diagram, events from actions, events and actions are preceded by "E" and "A", respectively. For simplicity, this diagram assumes that only one border element is used, in an administrative domain, as a peer border element. Should more than one peer border element exist in any such administrative domain, then state machine 1000 is replicated, as needed, to interact with each different peer border element in that domain.

In the absence of having to exchange information with any peer border element, peer border element manager 960 remains in idle state 1010. When manager 960 receives a message from administrative domain manager 950 to modify routing information stored in its peer border element, manager 960 then transitions, as represented by line 1013, its state and attempts to establish, as shown in block 1015, a client TCP connection with its peer border element, and specifically with an administrative domain manager situated therein. Once this attempt starts, manager 960 transitions, as represented by line 1017, to startup state 1020. If the connection could not be established, i.e., a TCP failure event occurred, then manager 960 transitions its state, as represented by line 1021, to block 1045. At this point, the manager starts a retry timer and then transitions, as represented by line 1047, into waiting state 1050. While in this state, either one of two events will happen: either the peer border element will issue a TCP server-side connect request or the retry timer will expire. Once either event occurs, manager 960 transitions, as indicated by line 1053, to block 1055 through which manager 960 will once again attempt to establish a client TCP connection with the peer border element. Once this attempt starts, manager 960 transitions, as represented by line 1027, back to startup state 1020, and so forth.

Alternatively, if a TCP connection is successfully established between the border element and its peer, then peer border element manager 960 transitions, as represented by line 1023, to block 1025 through which manager 960 triggers an event to cause routing information stored in the border element to be downloaded to its peer border element. Once this download starts, peer border element manager 960 transitions, as represented by line 1027, to active state 1030. During this state, information stored in the peer border element is updated, as indicated in block 1035, in response to update requests issued by administrative domain manager 950. As represented by lines 1033 and 1037, manager 960 remains in active state 1030 until such time as all necessary updates have occurred or a TCP failure event occurs. Should the TCP connection fail prior to completion of all the updates, then, as indicated in block 1040, manager 960 starts the retry timer. Once that occurs, manager 960 transitions its state, as represented by line 1043, to waiting state 1050, to attempt re-establishing the TCP connection with the peer border element, and so forth. Alternatively, once all the updates have occurred, manager 960 transitions, as indicated by line 1039, back to idle state 1010, and so forth.

D. Inter- and Intra-gateway Call Routing and Associated Operations

We will now direct our attention to interactions, including messaging, that occur both between peered gateways as well as within a gateway for routing telephone calls, in accordance with our inventive teachings, for two H.323 telephony endpoints, back and forth between the data network and the PSTN, as well as for performing associated operations, such as call teardown, and H.323 endpoint registration and de-registration.

1. Overview

First, however, we will provide overview information, though noted above, which should aid in understanding these interactions in their proper context.

Generally speaking, in an H.323 environment, each gatekeeper, within a domain, passes call control and call routing information, involving endpoints within its zone, to an external border element located within that domain. A gatekeeper, using its own routing tables, can resolve destination addresses for all endpoints within its administrative domain. Hence, if the calling gatekeeper then possesses, within its routing tables, requisite routing information in the form of a descriptor, for a telephony endpoint then being called, that gateway is able to route the call itself and does not need to obtain routing information from a called gatekeeper. If, however, that calling gatekeeper does not possess the routing information needed to route that call, i.e., it can not resolve a destination address for that call since the called endpoint resides in a different administrative domain as the gatekeeper, then that gatekeeper will request that information from its external border element. That element, in turn, will issue a request to a called domain, via an external border element in that domain, for the requisite routing information. That information, accessed from an external border element in a domain containing the called telephony endpoint, will then be passed back to the calling gatekeeper which will then route the call accordingly. Hence, a gatekeeper first attempts to complete a call within its own zone, and thereafter within its administrative domain and finally, in the absence of suitable destination information within that zone or domain, on an inter-domain basis.

Prior to handling any telephony traffic, a gateway, typically shortly after its initialization, must register itself with a gatekeeper as a condition of handling such traffic destined to or from it. This registration procedure will be discussed in further detail below in conjunction with FIGS. 24 and 28. Once the gateway registers itself, each gatekeeper executing therein must establish a service relationship with its border element such that the gatekeepers and border elements can interact in order to pass control and routing messages therebetween. The manner through which such relationships is established will be discussed below in conjunction with FIG. 21. Through our inventive peered border elements, a gatekeeper can register with one of the peered border elements, which, in turn, will pass registration messages to its peer in order to effectuate gatekeeper registration across both peered elements. Thereafter, each active telephony endpoint that exists within the same zone as a gatekeeper will register its presence, one at a time, with that particular gatekeeper—in much the same manner as a gateway registers itself with a border element. As each such endpoint registers itself with a gatekeeper, that gatekeeper provides the registration information, in the form of a descriptor, to its border element. That element, in turn, publishes the descriptor to every other gatekeeper in the administrative domain. The process through which information is disseminated by the border element will be discussed below in conjunction with FIG. 22. With this published information, gatekeepers can route calls to any telephony endpoint within its administrative domain without requesting routing information from its border element. As each gatekeeper registers with a border element, and to that extent that gatekeeper contains stored descriptors, that gatekeeper will share those descriptors with the border element for subsequent publication to all other gatekeepers throughout the domain which, in turn, will update their routing tables with these descriptors. Hence, border elements build administrative domain call routing information by accumulating the call routing capabilities of each and every zone it then handles.

In a converse fashion, within an administrative domain, gateways and gatekeepers can terminate their service relationship with each other, and telephony endpoints and gatekeepers can likewise do so between themselves. This can arise through a failure of an H.323 element which after being detected, by a functioning element, forces all service relationships involving that former element to be severed such that the former element is effectively removed from the domain. Alternatively, an element can also request, as in a case of being taken out of service for maintenance, that all of its established service relationships be terminated. De-registration procedures will be discussed below in conjunction with FIGS. 28 and 29. Hence, call routing information in a domain stored in any active gatekeeper in that domain dynamically changes as gateways and telephony endpoints register and de-register themselves and is supplied to and disseminated by border elements, that have service relationships with those gatekeepers, throughout the domain.

A call descriptor identifies call routing capabilities for zones and administrative domains. Descriptors have at least one template. A template contains a profile for either one H.323 endpoint or a range of different endpoints. One attribute of the template is a routing information field which indicates whether the endpoint can be contacted directly or must be resolved dynamically. For each endpoint, its template identifies, inter alia, its directory number, alias(es) and its IP address on the private data network. These aliases may include, e.g., H.323-IDs, url-IDs, transport IDs, and/or e-mail-IDs.

In accordance with our invention and as noted above, auto-switching between the private data (IP) network and the PSTN occurs in response to dynamic changes in the quality of a connection over the private data network. Auto-switching begins in a gateway. A gateway, through TASQ process 537 (see FIG. 5), determines network quality through dynamic measurements of latency, packet loss and error rate (jitter). Should either gateway involved in a call determine that network quality has either increased or decreased to necessitate an auto-switch either to the data network from the PSTN or the opposite, that gateway (hereinafter, for simplicity of reference, the "calling gateway") will initiate an information exchange, using, in accordance with our inventive teachings, certain call-specific data embedded, as "nonstandard Data" within specific H.323 message, with its peer gateway (hereinafter, the "called" gateway).

If the call is to transition from the data network to the PSTN, the called gateway will select an available directory number from a pool of directory numbers that has been assigned to it (so-called "pooled directory numbers" or PDN) during its configuration and convey that specific number to the calling gateway. Once the calling gateway receives the particular PDN, it originates a circuit-switched call over its PSTN trunk connection to that PDN. The called gateway, sensing an incoming call on its PDN, will determine whether this number corresponds to the particular PDN on which that gateway is now expecting a call. If it is a different PDN number from that which it is expected, that gateway sends a message to the calling gateway over the network connection and waits for a gateway to claim this call. If this call is on the correct PDN, then the called gateway switches the call, through suitable instructions given to its 4-by-4 TDM switch 250 (see FIG. 5) to switch the call from its network connection to the now established circuit-switched connection through the PSTN. Once this occurs, the data network connection for this call is torn down by both gateways as if the call were completed. Auto-switching also occurs in reverse, from the PSTN back to the data network, when network quality sufficiently improves. We will discuss below and in conjunction with FIGS. 16–18 the call processing and inter-process and inter-gateway messaging which collectively implement auto-switching.

Furthermore and as noted above, in accordance with our present invention, we embed certain call-specific information within specific H.323 message conveyed between gateways on opposite sides of a call to effectuate auto-switching of that call between the PSTN and the data network. By virtue of this information, the gateways on calling and called sides form the same association for-each call routed therebetween and with a common though unique identifier (CallId) used for that call. This identifier distinguishes that call from any other then being handled by either gateway such that the gateways, acting in unison, can switch this particular call between these networks, as needed, without affecting any other calls.

Specifically, we embed, through call independent signaling, a Calling Flag within a conventional "nonstandard Data" field in an H.323 SETUP message, and a Called Flag; a CallId and a selected PDN all within a conventional "nonstandard Data" field in an H.323 CALL PROCEEDING message. In that regard, the contents of the Calling Flag, which are generated by a calling side, contain information, for a given call being established, which indicates whether the call, from a perspective of a calling gateway, can be auto-switched. In response to this SETUP message, the called side generates a CallId number which uniquely identifies that call and then passes that ID back to the calling side, along with the Called Flag and PDN. The Called Flag specifies whether the call, from a perspective of the called gateway, can be auto-switched. The calling side then saves this information for later use in properly auto-switching the call between the data network and the PSTN, should a need to auto-switch then occur. By virtue of exchanging this information, the calling and called sides form the same association, using a common CallId, for each call routed therebetween so as to readily distinguish that call from any other then being handled by a gateway on either side and indicate to each other that the call can be auto-switched should a need later arise to auto-switch that call. In that regard, only those calls for which both the calling and called gateways have indicated as being capable of being auto-switched are eligible to be auto-switched in response to dynamic QoS changes of a network connection between these gateways. Any call for which either the calling or called gateway has indicated, in the Calling and Called Flags, can not be auto-switched will remain on the PSTN regardless of such QoS changes.

Though we have illustratively described above various call-specific information as being embedded in an H.323 CALL PROCEEDING message and will continue to describe it as such in the ensuing description of FIGS. 13–18, the same information can alternatively be embedded within an H.323 CONNECT message. This information would be embedded in the latter message in much the same fashion as it would be in the former message but with appropriate changes, readily apparent to those skilled in the art, to corresponding call processing operations shown in these figures and discussed below.

2. Basic VoIP Call Processing

Figure 11:
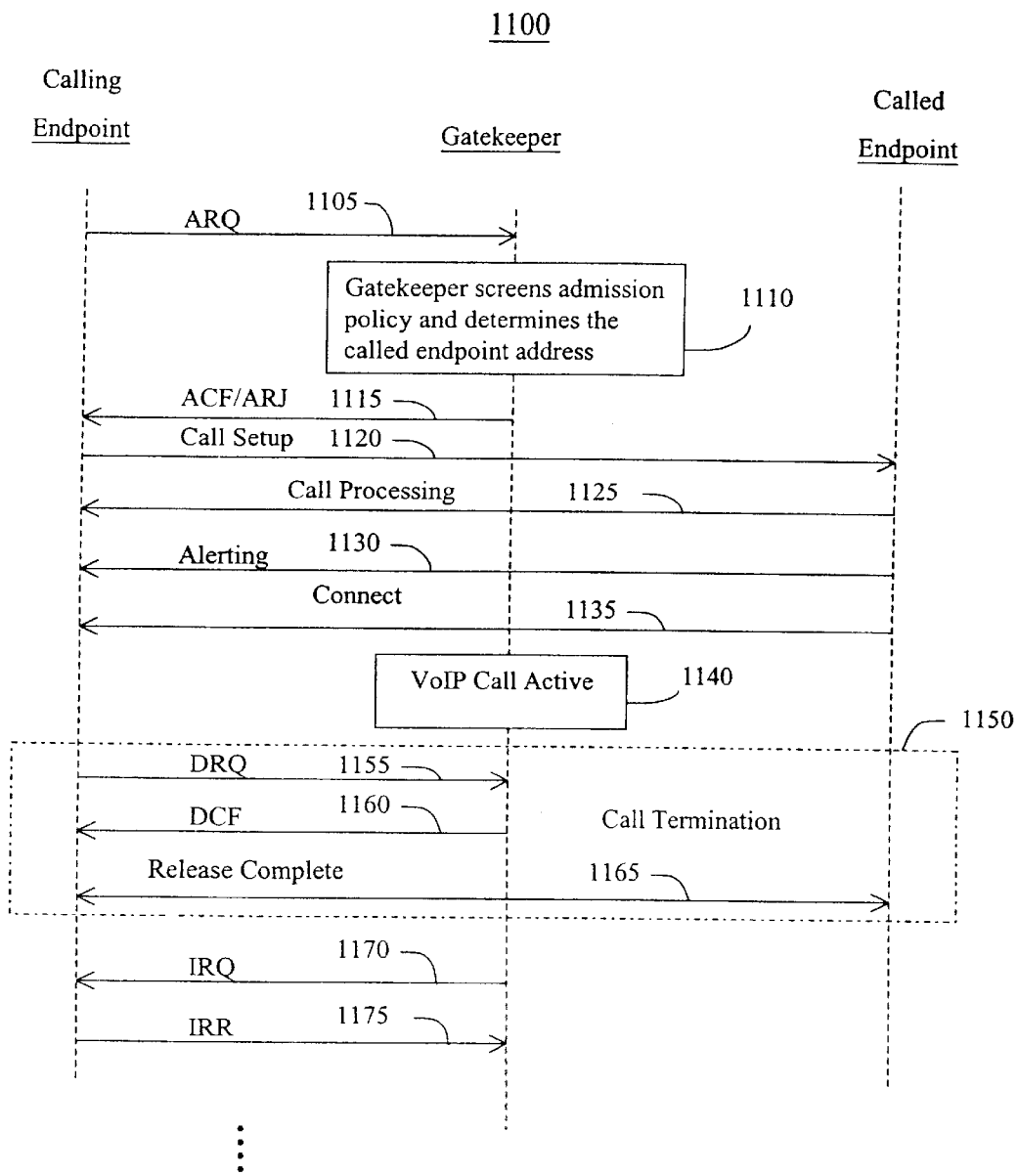
FIG. 11 depicts highly-simplified operational sequence 1100 for processing, in accordance with our present invention, a VoIP call between two H.323 telephony endpoints.

FIG. 11 depicts highly-simplified operational sequence 1100 for processing, in accordance with our present invention, a VoIP call between two H.323 telephony endpoints.

As shown, to institute a VoIP call, a calling telephony endpoint, that has already registered itself with a gatekeeper, first issues, as represented by line 1105, an H.225.0 ADMISSION REQUEST (ARQ) message to that gatekeeper. In response to this message, the gatekeeper screens, as indicated by block 1110, its admission policy to determine whether the call now being attempted is allowed, i.e., whether the calling telephony endpoint has requisite permissions to make the call or whether sufficient network bandwidth is then available to support the call. If the call is permitted and sufficient bandwidth is available, the gatekeeper then responds, as represented by line 1115, with an H.225.0 ADMISSION CONFIRM (ACF) message; otherwise, the call is rejected with the gatekeeper responding with an H.225.0 ADMISSION REJECT (ARJ) message. The ACF message informs the endpoint that it is permitted to complete its intended call via the network connection. The ARJ message prohibits the endpoint from completing this intended call over the data network.

If the call is permitted, then, as represented by line 1120, the gatekeeper servicing the calling telephony endpoint and in response to a request from that endpoint will "set up" the call by obtaining appropriate routing information, either from accessing its own routing tables if the call is intra-domain or from a suitable external border element if the call is inter-domain, needed to form a packet connection through the private data network between the calling and called endpoints. Thereafter, as represented by line 1125, the endpoints will undertake appropriate call processing through which the gatekeeper servicing each endpoint involved in the call will allocate and assign appropriate resources to support the call, such as a DSP, and will commence voice processing for that call and will attempt to establish a packet connection between these endpoints. Once the connection has sufficiently progressed, the called endpoint will alert, as represented by line 1130, the calling endpoint to its presence. Then, the called endpoint will issue an H.225.0 CONNECT message, as represented by line 1135, to the calling endpoint to complete the connection. Once the connection has been fully established, as indicated by block 1140, the VoIP call is active and packetized traffic in the form of packets bearing G.723 compressed digitized speech (or facsimile or analog data) can transit over the packet connection between the calling and called parties for the duration of the call.

At the conclusion of the call, one of the telephony endpoints, here illustratively the calling endpoint, will terminate the connection, effectively going "on-hook". To do so and indicated in Call Termination block 1150, that endpoint will issue, as represented by line 1155, an H.225.0 DISENGAGE REQUEST (DRQ) message. This message indicates that the call is to be dropped. Such a message can be issued by either an endpoint, as shown here, or by a gatekeeper. Once this message has been received and accepted by its recipient, here the gatekeeper, the recipient issues an H.255.0 DISENGAGE CONFIRM (DCF) message. In response to transmission and reception of the DCF message, both endpoints issue H.225.0 RELEASE COMPLETE messages to each other, thus terminating the network connection therebetween.

Regardless of whether a call then exists or not between a gatekeeper and each of its telephony endpoints, that gatekeeper will periodically send, as represented by line 1170, an H.225.0 INFORMATION REQUEST (IRQ) message to all gateways and endpoints that are registered to that gatekeeper. The reason for doing so is that gateway-gatekeeper communications utilize UDP, which is not designed to be a reliable protocol. Each of the gateways and endpoints will respond, as represented by line 1175 with an H.225.0 INFORMATION RESPONSE (IRR) message, containing a list of its then active calls for these endpoints. The gatekeeper will compare this list to a list it locally maintains and correct any discrepancies therebetween; thereby, maintaining in synchronization with its gateway(s). Alternatively, a gatekeeper, in response to certain events, may issue an IRQ message to determine status of a specific call then being handled by a gateway. Such an event may include an H.225.0 GATEKEEPER REQUEST (GRQ) message being issued by a registered gateway or an H.225.0 REGISTRATION REQUEST (RRQ) message. Should such a GRQ or RRQ request message occur, this could indicate an occurrence of a fatal event, such as a system reset or loss of power, or a non-fatal event (such as a gateway issuing an RRQ message for some benign reason). Under these conditions, the gatekeeper does not assume that calls, which were supposedly active, are either in progress or not; hence, it updates its own information based on the responses it then receives from its registered gateway(s).

Figure 12:
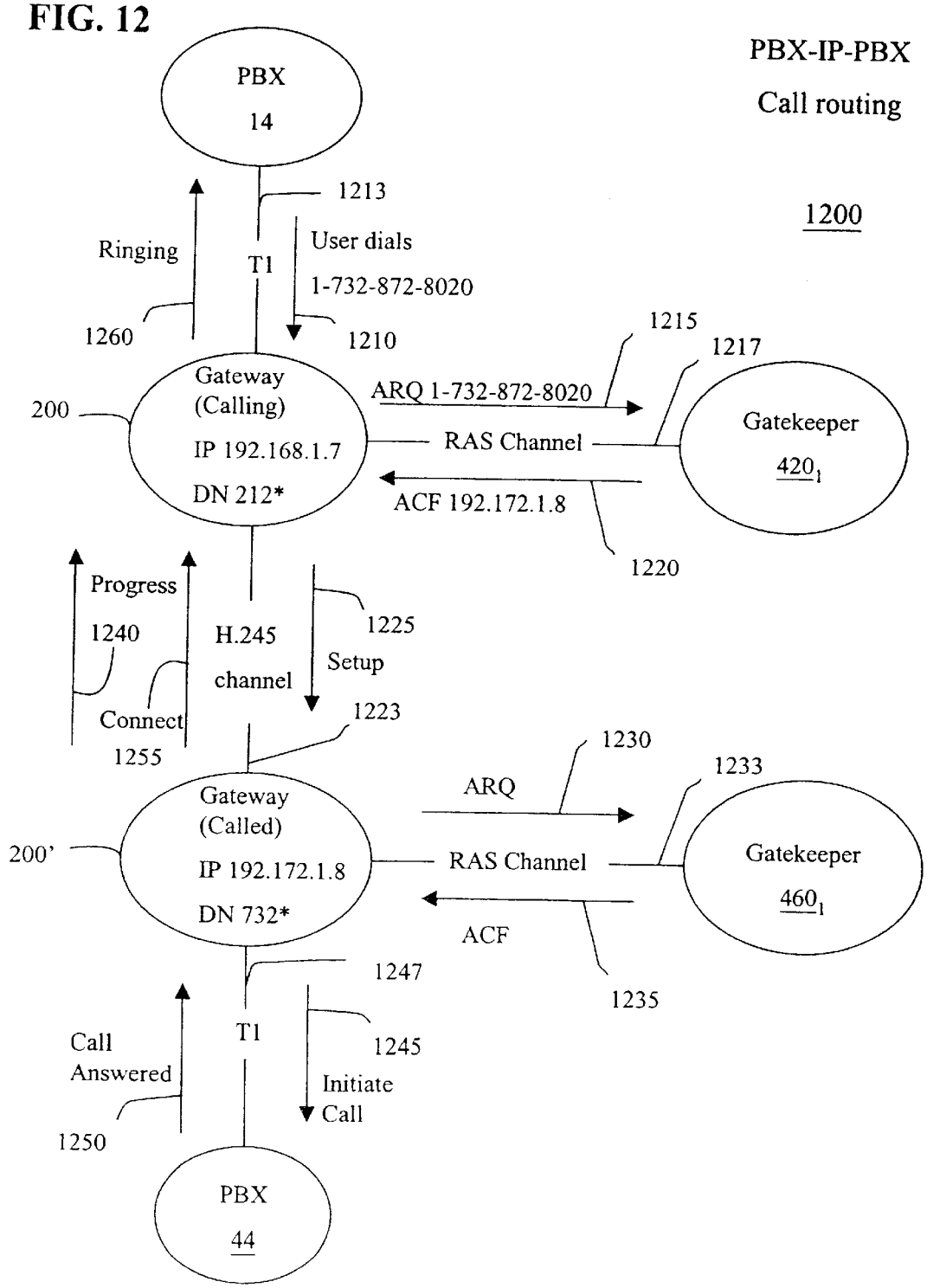
FIG. 12 depicts basic inter-process operations 1200 for routing a telephone call over a data network connection (PBX-IP-PBX) between two peered gateways, e.g., gateways 200 and 200' shown in FIG. 1, located in two different zones.

FIG. 12 depicts basic inter-process operations 1200 for routing a telephone call over a data network connection (PBX-IP-PBX) between two gateways in two different zones.

As shown, assume that a user stationed at a telephony endpoint (not shown in FIG. 12) connected to PBX 14, dials "1-732-872-8020" as a called number. This number is sent, as represented by line 1210 over T1 trunk 1213 and as signaling information, to gateway 200 ("calling gateway") that serves this endpoint. This signaling information is conveyed through DTMF (dual-tone multi-frequency) tones, pulses or ISDN D-channel information, as appropriate, over an incoming trunk in T1 trunks 1213. Gateway 200, in turn, sends, as represented by line 1215 and over RAS channel 1217, an H.225.0 ARQ message to a gatekeeper, e.g., gatekeeper $420_1$, servicing this endpoint. This ARQ message specifies the dialed number as well as an amount of network bandwidth the telephony endpoint desires to use for this call. Based on whether this endpoint is to carry, e.g., voice, or data from a computer modem or a facsimile machine, the bandwidth required will vary accordingly. Generally speaking, a RAS channel is an unreliable channel which is used to convey H.225.0 registration, admissions, bandwidth change, and status messages between two H.323 entities. Upon processing the ARQ message, gatekeeper $420_1$, assuming the call is permitted, determines whether it can resolve the called number into a network address. If, as here, it can resolve this number—from its stored descriptors, it returns, as represented by line 1220, an H.225.0 ACF message containing an IP address of the called gateway. In response to this ACF message, the calling gateway sends, as represented by line 1225 and via H.245 channel 1223, a Q.931 setup message to the called gateway, here gateway 200'.

In response to the Q.931 setup message, called gateway 200' sends, as represented by line 1230, an H.225.0 ARQ message to a gatekeeper, here illustrative gatekeeper $460_1$, that serves the called endpoint. This message requests this gatekeeper to provide authorization to accept an incoming call. If such authorization is granted, gatekeeper $460_1$ returns, as represented by line 1235 and over RAS channel 1233, an H.225.0 ACF message back to gateway 200'. In response to this confirmation message, called gateway 200' sends, as represented by line 1240, a Q.931 progress message back to the calling gateway to indicate that equipment at the call destination is in process of setting up the call. In addition, called gateway 200' initiates a call, as represented by line 1245 over an outgoing trunk in T1 trunks 1247, to PBX 44 using DTMF, dialing pulses or ISDN, depending on its capability and configuration. Once this call is completed through PBX 44 to the destination endpoint with "answer supervision" being returned, PBX 44 then issues, as represented by line 1250, an appropriate call answered message back to the called gateway. This gateway, in turn, issues, as represented by line 1255 and via the H.245 channel, a Q.931 connect message to the calling gateway. In response to this message, the calling gateway establishes a voice path, via an incoming trunk in T1 trunks 1213, through PBX 14, to the calling endpoint and, as represented by line 1260, issues a ringing signal on this path to indicate the called endpoint is ringing. Once this occurs and the called party answers, a voice path is established, via a networked data connection, between the calling and called endpoints.

3. Inter-process Messaging and Interactions

We will now discuss inter-gateway messaging in further detail for various different call scenarios.

In the following scenarios shown in FIGS. 13–18, both the calling and called sides are assumed to be situated behind a corresponding PBX, consistent with that shown, e.g., with respect to PBXs 14 and 44 shown in FIG. 1. For ready elucidation, the reader should also simultaneously refer to FIG. 1 throughout the ensuing discussion of FIGS. 13–18.

Figure 13:
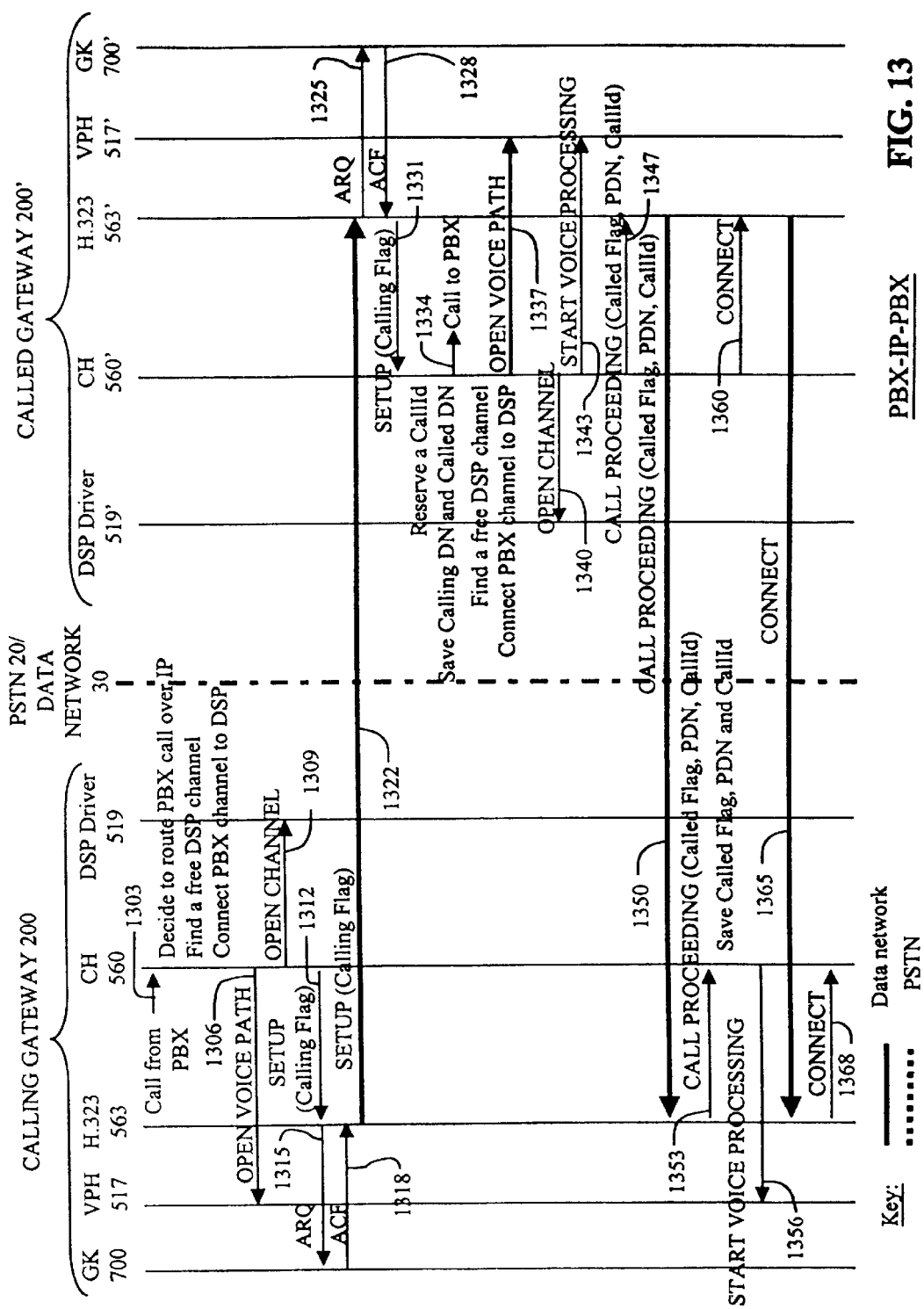
FIG. 13 depicts typical inter-process control messaging that, in accordance with our invention, occurs both between and within peered gateways, e.g., gateways 200 and 200' shown in FIG. 1, for routing a telephone call over a data network connecting these gateways.

In these figures, both the calling and called parties are assumed to be H.323 telephony endpoints, such as telephones 16 and 46. In each of these figures, each message carried over the data network or PSTN is shown as a heavy solid or heavy dotted line, respectively, with an arrowhead indicating direction of that message. Furthermore, for ease of reference and understanding, primed notation, such as for gatekeeper processes 700 and 700' shown in FIG. 13, is used throughout FIGS. 13–25 to indicate identical, though separate, instances of processes executing in corresponding peer gateways 200 and 200'. Furthermore, to simplify understanding, we will discuss various scenarios where calling gateway 200 initiates auto-switching of a call between the data network and the PSTN and in a reverse direction, even though such action can be initiated by either of the peered gateways handling that call. Since the same operations would occur in the either of these gateways, we will omit discussions of auto-switching being initiated by the called gateway.

a. PBX-IP-PBX Call

FIG. 13 depicts typical inter-process control messaging, that would occur both between and within peered gateways 200 and 200', for routing a telephone call over data network 30 (PBX-IP-PBX) that connects these gateways.

First, as represented by line 1303, PBX 14 directs an outgoing call to gateway 200, i.e., a user stationed at telephony endpoint (here, telephone) 16 dials a called number and that number with appropriate signaling information is applied to the gateway and therein to call handler (CH) 560. In response, the call handler determines whether adequate network bandwidth exists to support the call and the caller has proper security clearance to make the call. If both conditions are met, the CH allocates an available DSP channel and connects PBX 14, through TDM switch 250 (and through interaction with TSI driver 585 shown in FIG. 5), to this DSP channel. Once this connection is established, call handler 560 issues, as represented by line 1306 shown in FIG. 13, an OPEN VOICE PATH command to voice packet handler (VPH) 517 which, in turn, opens a packetized voice path for this call through the allocated DSP channel. Thereafter, CH 560 issues, as represented by line 1309, an OPEN CHANNEL command to the DSP driver to open that DSP channel. Next, the CH forms the Calling Flag and provides, as represented by line 1312, that flag within a SETUP message to H.323 process 563. Process 563 then embeds the Calling Flag within an H.225.0 admission request (ARQ) message and sends, as represented by line 1315, that message to gatekeeper 700. This admission request message, as indicated in FIG. 12, contains the called directory number.

If the gatekeeper accepts the admission request, gatekeeper 700 determines appropriate routing information, such as through interaction with an external border element (not shown) in gateway 200', and then responds, as represented by line 1318, with an H.225.0 admission confirm (ACF) message which contains routing information (e.g., a destination network address) for that call. Once appropriate routing information is obtained for this call, either from within the administrative domain or via another such domain, H.323 process 563 sends, as represented by line 1322, an H.225.0 SETUP message containing the calling flag to called gateway 200'. Within the called gateway, H.323 process 563' processes this setup message, and in doing so, issues, as represented by line 1325, an H.225.0 ARQ message to gatekeeper process 700'. If this gatekeeper can accept the call, i.e., sufficient network bandwidth is then available for the gatekeeper to handle this call and the called number has appropriate security clearances to receive the call, gatekeeper 700' responds, as represented by line 1328, with an H.225.0 admission confirm message. Gatekeeper 700' then issues, as represented by line 1331, a SETUP message containing the calling flag. In response to this message, CH 560' forms a unique CallId value for this call and saves the calling and called directory numbers for this calls. Thereafter, CH 560' initiates, as represented by line 1334, a call to destination PBX 44. Once this occurs, CH 560' allocates an available DSP channel and connects, via a TDM connection, PBX 44 to this DSP channel. Once this connection is established, call handler 560' issues, as represented by line 1337, an OPEN VOICE PATH command to VPH 517' which, in turn, opens a packetized voice path for this call through the allocated DSP channel. Thereafter, CH 560 issues, as represented by line 1340, an OPEN CHANNEL command to DSP driver 519' to open that DSP channel. Once this channel is open, CH 560' instructs VPH 517', through issuance, as represented by line 1343, of a START VOICE PROCESSING message, to commence voice processing over this channel.

Once voice processing has commenced at gateway 200', CH 560' selects one of its available pooled directory numbers and forms the Called Flag for this call. Thereafter, CH 560' issues, as represented by line 1347, to H.323 process 563', an H.225.0 CALL PROCEEDING message which contains the Called Flag, the selected PDN and the CallId for this call. H.363 process 563' then transmits, as represented by line 1350, this message to calling gateway 200. This message is received by H.323 process 563 which, in turn, as represented by line 1353, passes this message to CH 560. This CH then saves the Called Flag, PDN and CallId for this call for later use during auto-switching.

Once this information is saved, CH 560 then issues, as represented by line 1356, a START VOICE PROCESSING message to VPH 517, to commence voice processing over the DSP channel in this gateway allocated to this call. After H.323 process 563' in gateway 200' issues the CALL PROCEEDING message, CH 560' issues, as represented by line 1360, an H.225.0 CONNECT message to H.323 process 563'. This process then transmits, as represented by line 1365, this connect message to calling gateway 200. In response to receipt of this message by H.323 process 563, this process passes, as represented by line 1368, the H.225.0 CONNECT message to CH 560 to complete the connection over the data network between the calling and called parties, after which packetized voice traffic for this call transits over this connection.

b. PBX-PSTN-PBX Call with CONNECT Message Delivered to Calling Side

Figure 14:
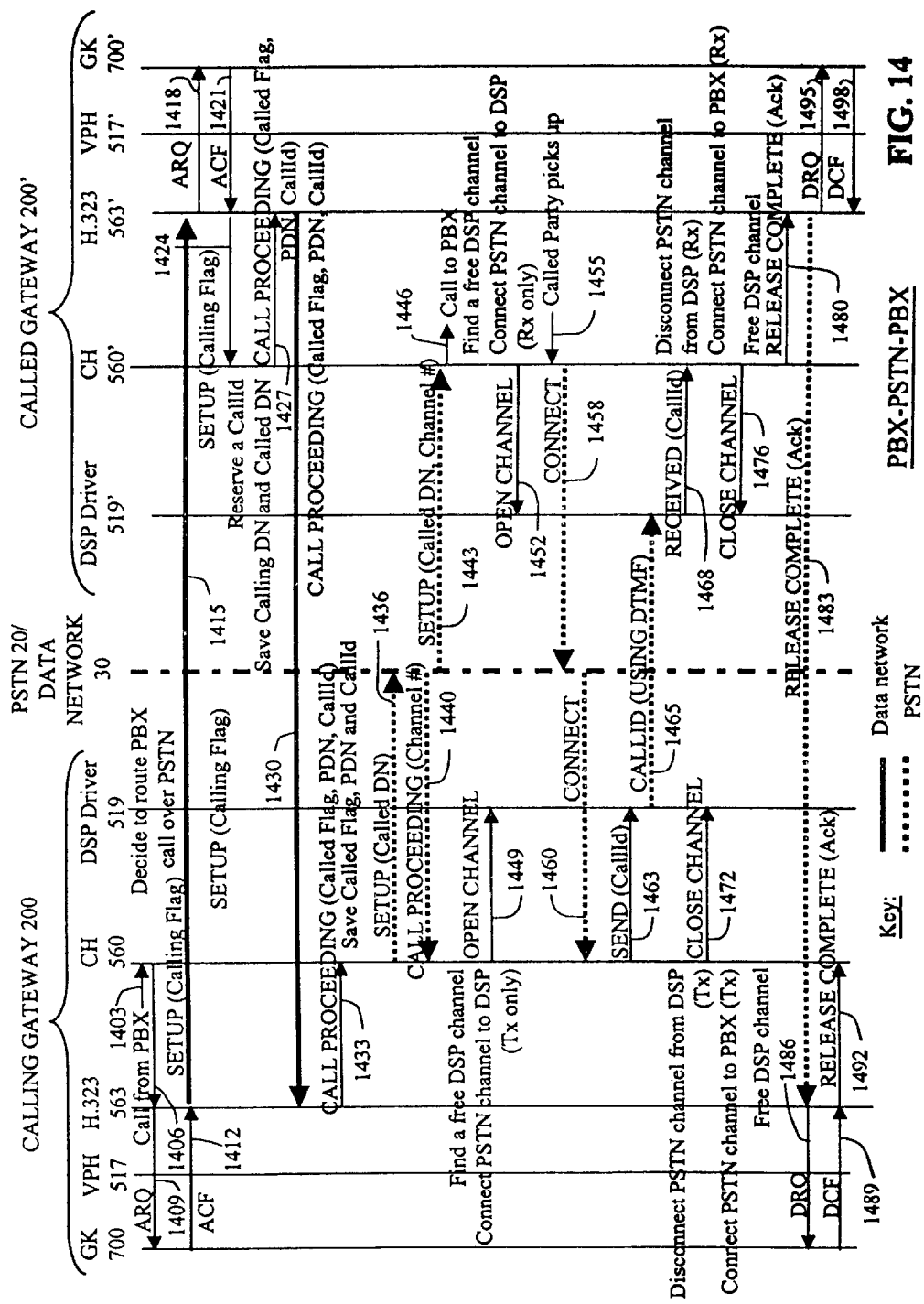
FIG. 14 depicts typical inter-process control messaging that, in accordance with our invention, occurs both between and within peered gateways, such as gateways 200 and 200' shown in FIG. 1, for routing a telephone call over a PSTN connection between these gateways.

FIG. 14 depicts typical inter-process control messaging, that would occur both between and within peered gateways 200 and 200', for routing a telephone call over a PSTN connection (PBX-PSTN-PBX) between these gateways.

First, as represented by line 1403, PBX 14 directs an outgoing call to gateway 200, i.e., a user stationed at telephone 16 dials a called number and that number is passed with appropriate signaling information to the gateway and therein to call handler (CH) 560. In response, the call handler determines whether adequate network bandwidth exists to support the call and the caller has proper security clearance to make the call. If adequate bandwidth does not exist, e.g., the network is then too congested to fully support the call, but the caller has appropriate permissions to make the call, then CH 560 will route the call over the PSTN.

Generally speaking, through the remainder of this scenario, the calling and called gateways exchange appropriate H.323 call signaling information such that should network conditions later warrant auto-switching the call from the PSTN to the data network, both sides will possess sufficient information to do so. This information is exchanged using a call independent signaling procedure as defined in the H.323 standard to convey such signaling information through H.323 SETUP, CALL PROCEEDING and RELEASE COMPLETE messages. In essence, the SETUP and CALL PROCEEDING messages are sent to establish a PSTN connection to a called directory number with call information, specifically a CallId, then being sent using in-band DTMF signaling over the PSTN connection, between the calling and the called gateways, that transports the call. The RELEASE COMPLETE message contains an acknowledgement field that informs the calling gateway that the called gateway has received the in-band signaled call information and the CallId matches that originally sent to the calling gateway and has now been associated with the current PSTN call. Hence, the acknowledgement signifies that both the calling and called gateways possess and have processed requisite call information to later auto-switch this call to the data network.

Specifically and returning to FIG. 14, once the call handler determines that the call is to be routed over the PSTN, CH 560 forms the Calling Flag for this call and then embeds this flag within a SETUP message. This SETUP message is provided, as represented by line 1406, to H.323 process 563 which, in turn, generates an H.225.0 admission request message containing the called number and then passes, as represented by line 1409, that message to gatekeeper 700. If the gatekeeper accepts the admission request, it issues, as represented by line 1412, an H.225.0 admission confirm message to H.323 process 563. In response, H.323 process 563 sends, as represented by line 1415, an H.225.0 SETUP message containing the calling flag, over the data network, to called gateway 200'. Within the called gateway, H.323 process 563' processes this setup message, and in doing so, issues, as represented by line 1418, an H.225.0 ARQ message to gatekeeper process 700'. If this gatekeeper can accept the call, i.e., a called endpoint has appropriate security clearances to receive the call, gatekeeper 700' responds, as represented by line 1421, with an H.225.0 admission confirm message to H.323 process 563'. In response to the admission confirm message, H.323 process 563' passes, as represented by line 1424, the SETUP message it received containing the Calling Flag to CH 560'.

By virtue of receiving the SETUP message, CH 560' establishes a CallId for this particular call and selects an available PDN for possible later use in auto-switching this call and saves the calling and called directory numbers for this call. Thereafter, this CH issues, as represented by line 1427, to H.323 process 563' a CALL PROCEEDING message containing the Called Flag, the selected PDN and the CallId. H.323 process 563' sends, as represented by line 1430, an H.225.0 CALL PROCEEDING message containing the Called Flag, the PDN and the CallId, over the data network, to calling gateway 200. Within the calling gateway, H.323 process 563 applies, as represented by line 1433, the CALL PROCEEDING message to CH 560. This CH saves the call information it just received in this message for subsequent use during auto-switching. Thereafter, CH 560 issues, as represented by line 1436, a conventional Q.931 SETUP message to the PSTN containing the called directory number in order to establish a circuit-switched PSTN connection to this directory number. In response to the Q.931 SETUP message and to signify that the call is being established through the PSTN, a local central office switch that serves the calling gateway responds, as represented by line 1440, with a Q.931 CALL PROCEEDING message to the calling gateway and specifically to CH 560 therein. This message specifies which T1 channel on an incoming trunk (to the PSTN) will carry this call. In addition, the PSTN issues, as represented by line 1443, a Q.931 SETUP message, to called-gateway 200', containing the called directory number and an identification of a T1 channel on an outgoing trunk (to the called gateway) which carries this call. Since-this call is uni-directional, i.e., from the calling to the called gateway, only one T1 channel is needed at each end.

In response to receiving the Q.931 SETUP message, CH 560' establishes, as represented by line 1446, a call to local PBX 44. In addition, CH 560' allocates an available DSP channel and connects, via a TDM connection, the T1 channel (for receive only) from PBX 44 to this DSP channel. Once this connection is established, call handler 560' issues, as represented by line 1452, an OPEN CHANNEL command to DSP driver 519'. Subsequently, after a called party picks up the telephone with suitable signaling (e.g., answer supervision) being returned, as represented by line 1455, CH 560' issues, as represented by line 1458, a Q.931 CONNECT message to the PSTN. The PSTN routes, as represented by line 1460, this message to the calling gateway. In response to this message, CH 560 issues, as represented by line 1463, a SEND message, containing the CallId for this call, to DSP driver 519. This driver converts this message into in-band DTMF signaling and sends this message, as a CALLID message, over the PSTN connection to called gateway 200'. Upon receipt of this CALLID message, DSP driver 519' extracts the in-band signaled CallId from this message and issues, as represented by line 1468, a RECEIVED message containing the CallId to CH 560'. In response to the RECEIVED message, CH 560' disconnects the PSTN channel from the DSP channel (receive side—since that is the only side that has been utilized here) and connects the former channel to the receive (PBX) side of the PSTN channel. Once this occurs, the called gateway has completed its PSTN connection. Hence, CH 563' issues, as represented by line 1476, a CLOSE CHANNEL message to DSP driver 519' to close this DSP channel then in use. CH 560' also frees this DSP channel for subsequent re-allocation and re-use. In addition, CH 560' also issues to H.323 process 563', as represented by line 1480, a RELEASE COMPLETE message containing an acknowledgement. This acknowledgement signifies that the CallId was properly received by the called gateway and that this gateway correctly associated it with the PSTN call. In response to this message, H.323 process 563' issues, as represented by line 1495, an H.225.0 disengage request message to gatekeeper 700' to drop the call as far as the gatekeeper is concerned. Once this gatekeeper has effectively removed ("dropped") this call, the gatekeeper issues, as represented by line 1498, an H.225.0 disengage confirm message back to H.323 process 563'. In addition, H.323 process 563' also issues, as represented by line 1483, the RELEASE COMPLETE message through the PSTN connection to the calling gateway. In response to receipt of this message, H.323 process 563 issues, as represented by line 1486, an H.225.0 disengage request message to gatekeeper 700 to drop the call as far as the gatekeeper is concerned. Once this gatekeeper has effectively dropped this call, the gatekeeper issues, as represented by line 1489, an H.225.0 disengage confirm message back to H.323 process 563, which, in turn, issues, as represented by line 1492, an H.323 RELEASE COMPLETE message to CH 560.

c. PBX-IP-PBX Call but without Connect Message Delivered to Calling Side

Figure 15:
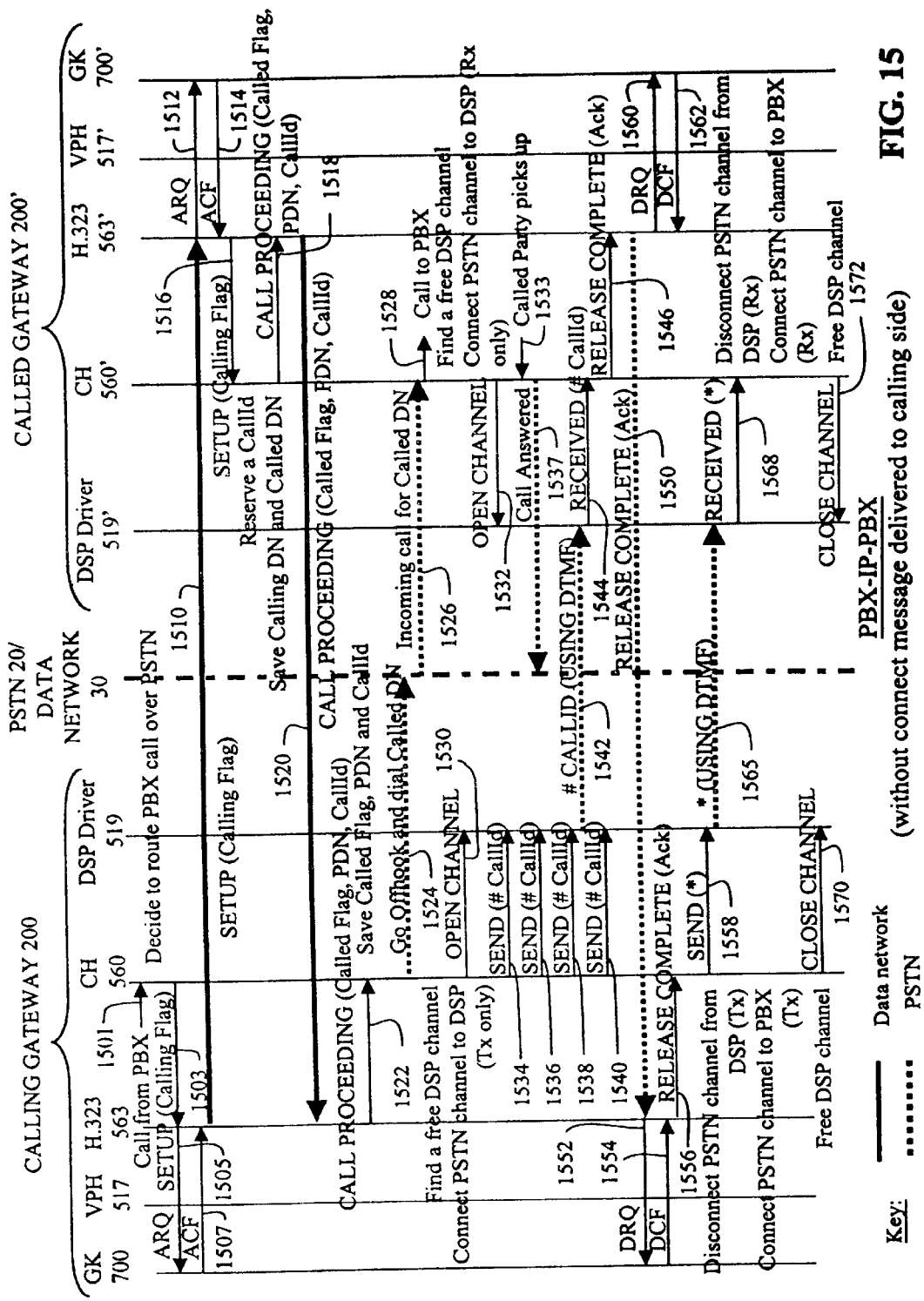
FIG. 15 depicts typical inter-process control messaging that, in accordance with our invention, occurs both between and within peered gateways, e.g., gateways 200 and 200' shown in FIG. 1, for routing a telephone call over the data network but in the absence of a CONNECT message being delivered to a calling side.

FIG. 15 depicts typical inter-process control messaging, that would occur both between and within peered gateways 200 and 200', for routing a telephone call over the data network, but in the absence of a CONNECT message being delivered to a calling side. This messaging is quite similar to that shown in FIG. 14 but for the process through which the CallId is communicated between the two gateways. Here, however, rather than sending the CallId once, it is sent continuously once a PSTN connection is established until such time as reception of the CallId is acknowledged by the called gateway through an acknowledgment provided in an H.323 RELEASE COMPLETE message issued by that gateway.

First, as represented by line 1501, PBX 14 directs an outgoing call to gateway 200, i.e., a user stationed at telephone 16 dials a called number and that number is passed with appropriate signaling information to the gateway and therein to CH 560. In response, the call handler determines whether adequate network bandwidth exists to support the call and the caller has proper security clearance to make the call. If, as is the case with the scenario shown in FIG. 14 and discussed above, adequate bandwidth does not exist or the network is then too congested to support the call, but the caller has appropriate permissions to make the call, then CH 560 will route the call over the PSTN.

In the same fashion discussed above in conjunction with FIG. 14, through the remainder of this present scenario, calling and called gateways 200 and 200' exchange appropriate H.323 call signaling information, using a call independent signaling procedure provided in the H.323 standard, for subsequent use during auto-switching. This information is exchanged through H.323 SETUP, CALL PROCEEDING and RELEASE COMPLETE messages.

With reference to the particular scenario shown in FIG. 15, once the call handler determines that the call is to be routed over the PSTN, CH 560 forms the Calling Flag for this call and then embeds this flag within a SETUP message. This SETUP message is provided, as represented by line 1503, to H.323 process 563 which, in turn, generates an H.225.0 admission request message containing the called number and then passes, as represented by line 1505, that message to gatekeeper 700. If the gatekeeper accepts the admission request, it issues, as represented by line 1507, an H.225.0 admission confirm message to H.323 process 563. In response, H.323 process 563 sends, as represented by line 1510, an H.225.0 SETUP message containing the calling flag, over the data network, to called gateway 200'. Within the called gateway, H.323 process 563' processes this setup message, and in doing so, issues, as represented by line 1512, an H.225.0 admission request (ARQ) message to gatekeeper process 700'. If this gatekeeper can accept the call, i.e., a called endpoint has appropriate security clearances to receive the call, gatekeeper 700' responds, as represented by line 1514, with an H.225.0 admission confirm (ACF) message to H.323 process 563'. In response to the admission confirm message, H.323 process 563' passes, as represented by line 1516, the SETUP message it received containing the Calling Flag to CH 560'.

By virtue of receiving the SETUP message, CH 560' establishes a CallId for this particular call and selects an available PDN for possible later use in auto-switching this call and saves the calling and called directory numbers for this call. Thereafter, this CH issues, as represented by line 1518, to H.323 process 563' a CALL PROCEEDING message containing the Called Flag, the selected PDN and the CallId. H.323 process 563' sends, as represented by line 1520, an H.225.0 CALL PROCEEDING message containing the Called Flag, the PDN and the CallId, over the data network, to calling gateway 200. Within the calling gateway, H.323 process 563 applies, as represented by line 1522, the CALL PROCEEDING message to CH 560. This CH saves the call information it just received in this message for subsequent use during auto-switching.

Thereafter, CH 560 seizes an available PSTN channel (i.e., goes "off-hook") and sends, as represented by line 1524, an appropriate signaling message to the PSTN to dial the called directory number. The PSTN, in turn, sends, as represented by line 1526, an appropriate signaling message to the called gateway signifying the presence of an incoming call to the called directory number. In response to this message, CH 560' establishes, as represented by line 1528, a PSTN call through local PBX 44 to the called number. CH 560 also locates a free DSP channel and connects the PSTN channel to that DSP channel, though only to a transmit side. In addition, CH 560' allocates an available DSP channel and connects, via a TDM connection, the T1 channel (for receive only) from PBX 44 to this DSP channel. Once this connection is established, call handler 560' issues, as represented by line 1532, an OPEN CHANNEL command to DSP driver 519'.

At approximately the same time as the called gateway is opening its PSTN channel, the calling gateway, repeatedly sends, as represented by, e.g., lines 1534, 1536, 1538, and 1540, SEND messages each containing the CallId preceded by a "#" sign. Each such SEND message is received by DSP driver 519 which, in turn, converts the "#CALLID" information into a DTMF signaling message and then transmits this DTMF message in-band to the PSTN. For simplicity if illustration, only one of the latter instances of this message, i.e., that represented by line 1542, is shown.

Only four successive SEND message are shown, but as many as needed, each with its concomitant DTMF signaled "#CALLID" information will be sent until the CallId is received by the called gateway. Eventually, during the course of these SEND messages and after a called party picks up the telephone with suitable signaling (e.g., answer supervision) being returned, as represented by line 1533, CH 560' issues, as represented by line 1537, a Call Answered message to the PSTN. Once a PSTN channel is established between the called and calling gateways, eventually one of the DTMF signaled messages, here represented by line 1542, will be received by called gateway 200'. In response to receiving this CallId message, DSP driver 519' converts the DTMF-signaled message to a RECEIVED message containing #CallId and sends, as represented by line 1544, the latter message to CH 560'. This call handler then acknowledges receipt of the CallId by issuing, as represented by line 1546, a RELEASE COMPLETE message containing an acknowledgement to H.323 process 563'. This acknowledgement signifies that the CallId was properly received by the called gateway, matches the CallId originally established for this call and that this gateway correctly associated this CallId with this PSTN call. In response to this message, H.323 process 563' issues, as represented by line 1560, an H.225.0 disengage request message to gatekeeper 700' to drop the PSTN call as far as the gatekeeper is concerned. Once this gatekeeper has dropped this call, the gatekeeper issues, as represented by line 1562, an H.225.0 disengage confirm message back to H.323 process 563'. In addition, H.323 process 563' also issues, as represented by line 1550, the RELEASE COMPLETE message through the PSTN connection to the calling gateway. In response to receipt of this message, H.323 process 563 issues, as represented by line 1552, an H.225.0 disengage request message to gatekeeper 700 to drop the call as far as that gatekeeper is concerned. Once this gatekeeper has dropped this call, gatekeeper 700 issues, as represented by line 1556, an H.225.0 disengage confirm message back to H.323 process 563. Then, process 563 forwards, as represented by line 1556, the RELEASE COMPLETE message, containing the acknowledgement, it received from the called gateway to CH 560.

At this point, the calling gateway sends an "*" to the called gateway in response to which both gateways connect the PSTN channel to the calling and called parties.

Specifically, after CH 560 receives the RELEASE COMPLETE message, the call handler disconnects a transmit side of the PSTN channel from the DSP channel and connects the transmit side of the former channel to the PBX channel. In addition, CH 560' issues, as represented by line 1558, a SEND message containing "*" to DSP driver 519. In response to this SEND(*) message, DSP driver 519' converts the message into DTMF in-band signaling and sends, as represented by line 1565, the message using such in-band signaling to called gateway 200'. Thereafter, CH 560 frees the DSP channel it had just used and issues, as represented by line 1570, a CLOSE CHANNEL message to DSP driver 519 to close this DSP channel such that it can be re-allocated and used again later.

In response to receiving this DTMF-signaled message containing an "*", DSP driver 519' converts the DTMF-signaled message to a RECEIVED message containing and sends, as represented by line 1568, the latter message to CH 560'. In response, CH 560' disconnects the PSTN channel from the receive side of the DSP channel and connects the former channel to a receive side for the PBX channel. Thereafter, the CH 560' frees the DSP channel it had just used and issues, as represented by line 1572, a CLOSE CHANNEL message to DSP driver 519' to close this DSP channel such that it can re-allocated and used again later.

d. IP to PSTN Switchover Using Pooled Directory Number

Figure 16:
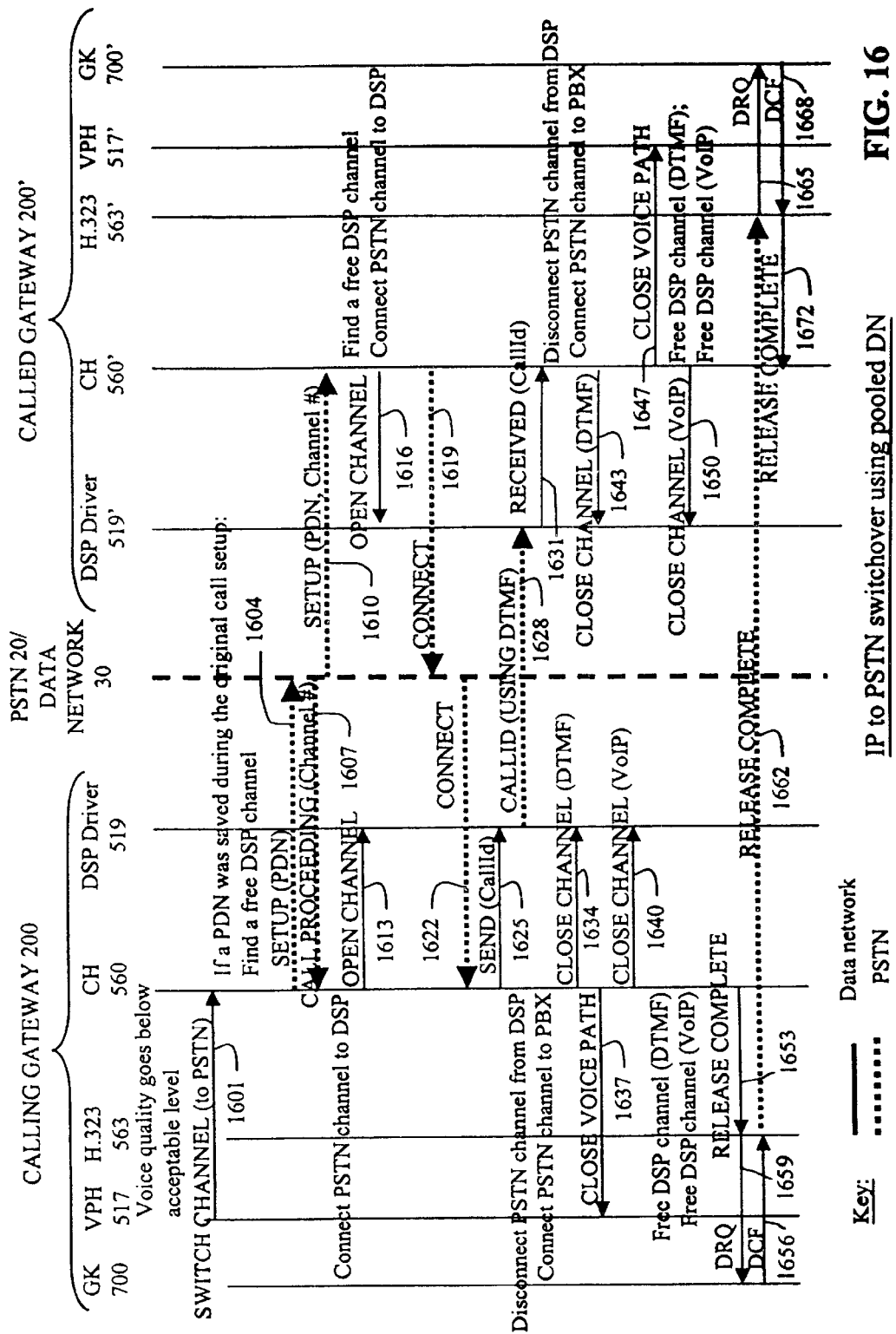
FIG. 16 depicts typical inter-process control messaging that, in accordance with our invention, occurs both between and within peered gateways, such as gateways 200 and 200' shown in FIG. 1, for switching a telephone call from being routed over a data network connection that spans these gateways to a PSTN connection between these two gateways, and specifically where the latter connection was established through use of a pooled directory number.

FIG. 16 depicts typical inter-process control messaging, that would occur both between and within peered gateways 200 and 200', for switching a telephone call from being routed over a data network connection that spans these gateways to a PSTN connection between these two gateways, and specifically where the latter connection was established through use of a pooled directory number.

As shown, assume that QoS, as determined by TASQ process 537 (see FIG. 5 and discussed above) executing in calling gateway 200, of a data network connection then carrying the call decreased below an acceptable level (i.e., where the numeric grade of the QoS decreased below its predefined threshold, as previously discussed). Accordingly as shown in FIG. 16, VPH 517 issues, as represented by line 1601, a SWITCH CHANNEL message and specifically such a message specifying a switch for that call to the PSTN. CH 560, if it saved a PDN during setup of this call, then allocates a free DSP channel, should one then be available. Once having done this, CH 560 then issues, as represented by line 1604, a conventional Q.931 SETUP message, containing the PDN as the called number, to the PSTN to establish a circuit-switched call to that number. The local central office in the PSTN which serves gateway 200 then issues, as represented by line 1607, a conventional Q.931 CALL PROCEEDING message with an identification of a T1 channel in an incoming trunk (from gateway 200) that will carry that call to the PDN. The local central office serving called gateway 200' issues, as represented by line 1610, a Q.931 setup message, to this gateway, specifying the called PDN as well as a T1 channel on an outgoing trunk (to the gateway) on which this call will appear.

CH 560', as a result of receiving the Q.931 SETUP message, then allocates a free DSP channel, should one then be available and connects, via the TDM switch in the called gateway, the PSTN channel for this call to that DSP channel. Once this occurs, CH 560' issues, as represented by line 1616, an OPEN CHANNEL message to DSP driver 519' to open this just allocated DSP channel. Thereafter, CH 560' issues, as represented by line 1619, a conventional Q.931 CONNECT message to the PSTN to indicate that the called endpoint is connected to the PSTN channel. In response, the PSTN issues, as represented by line 1622, a Q.931 CONNECT message to calling gateway 200. Within this gateway and in response to receipt of this CONNECT message, CH 560 issues, as represented by line 1625, a SEND message, containing the CallId of the present call being switched to the PSTN, to DSP driver 519. This message causes the driver to send, as represented by line 1628, the CallId of this call to called gateway 200' using in-band DTMF signaling.

Upon receipt of the CallId information, DSP driver 519' issues, as represented by line 1631, a RECEIVED message containing the CallId. This message is sent to CH 560' which, in turn, disconnects the PSTN channel from the DSP and connects that channel to the PBX. Thereafter, CH 560' issues, as represented by line 1643, a CLOSE CHANNEL (DTMF) message to close the DSP channel used to receive and process DTMF signaling. Next, CH 560' also issues, as represented by line 1647, a CLOSE VOICE PATH message to VPH 517'. This message causes the VPH to close the voice path previously established in gateway 200' over this DSP channel. CH 560' then issues, as represented by line 1650, a CLOSE CHANNEL (VoIP) message to DSP driver 519' which causes the driver to free the two DSP channels, one used for DTMF and the other then used to process the VoIP call.

Also, after DSP driver 519 has sent the CallId information using in-band signaling, CH 560 located in calling gateway 200, disconnects the PSTN channel from the DSP and connects it to the PBX. Thereafter, CH 560 issues, as represented by line 1634, a CLOSE CHANNEL (DTMF) message to close the DSP channel used to receive and process DTMF signaling. Next, CH 560 also issues, as represented by line 1637, a CLOSE VOICE PATH message to VPH 517. This message causes the VPH to close the voice path previously established in gateway 200 over this DSP channel. CH 560 then issues, as represented by line 1640, a CLOSE CHANNEL (VoIP) message to DSP driver 519 which causes the driver to free the two DSP channels, one used for DTMF and the other then used to process the VoIP call.

Once these operations have occurred, CH 560 issues, as represented by line 1653, an H.225.0 RELEASE COMPLETE message to H.323 process 563. H.323 process 563, upon receiving this message, issues, as represented by line 1659, a disengage request message (DRQ) to gatekeeper 700. The gatekeeper having extinguished its end of the data call issues, as represented by line 1656, a disengage confirm message to H.323 process 563. In response to this message, H.323 process 563 sends, as represented by line 1662, the RELEASE COMPLETE message over the PSTN connection, to called gateway 200'. H.323 process 563', upon receiving this message, issues, as represented by line 1665, a disengage request message to gatekeeper 700'. Gatekeeper 700' having extinguished its end the data call then issues, as represented by line 1668, a disengage confirm message to H.323 process 563' which, in turn, issues, as represented by line 1672, a RELEASE COMPLETE message to CH 560'.

e. IP to PSTN Switchover Using Called Directory Number

Figure 17:
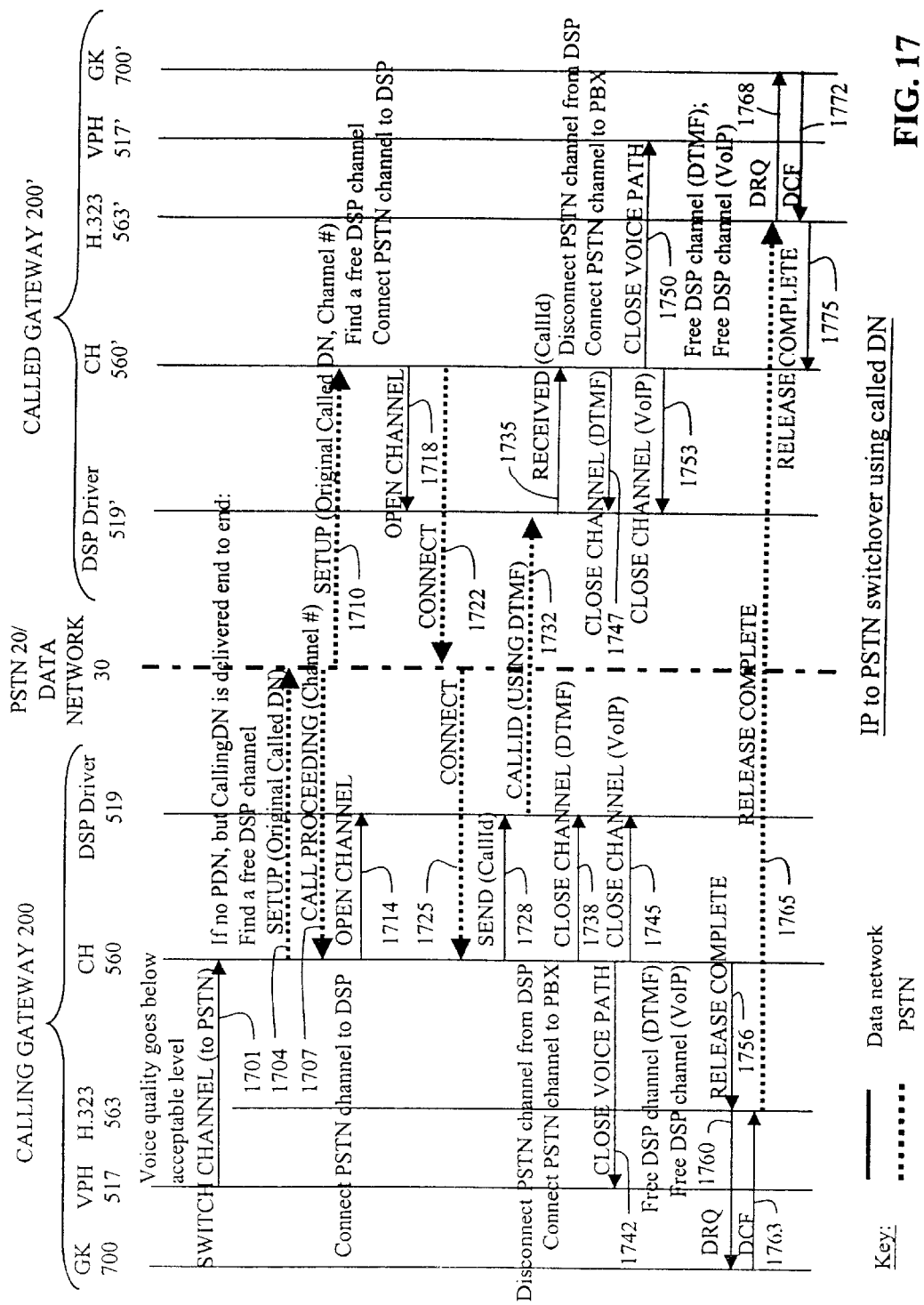
FIG. 17 depicts typical inter-process control messaging that, in accordance with our invention, occurs both between and within peered gateways, e.g., gateways 200 and 200' shown in FIG. 1, for switching a telephone call from being routed over a data network connection that spans these gateways to a PSTN connection between these two gateways, and specifically where the latter connection was established through use of a called directory number.

FIG. 17 depicts typical inter-process control messaging, that would occur both between and within peered gateways 200 and 200', for switching a telephone call from being routed over a data network connection that spans these gateways to a PSTN connection between these two gateways, and specifically where the latter connection was established through use of a called directory number, rather than as shown in FIG. 16 with a PDN. As can be seen by comparing FIGS. 16 and 17, the overall control scenario shown in both figures is quite similar; however, the scenario depicted in FIG. 17 occurs where the called side has not previously delivered a PDN for use in auto-switching that call to the PSTN.

As shown, assume that QoS, again as determined by TASQ process 537 (see FIG. 5 and discussed above) executing in calling gateway 200, of a data network connection then carrying the call decreased below an acceptable level. Accordingly as shown in FIG. 17, VPH 517 issues, as represented by line 1701, a SWITCH CHANNEL message and specifically such a message specifying a switch for that call to the PSTN. If a PDN has not been delivered for this call, then CH 560 will determine, from its routing information, if a calling directory number has been delivered for this call. If CH 560 possesses this information, then CH 560 allocates a free DSP channel, should one then be available. Once having done this, CH 560 then accesses from its routing information the called number associated with this calling number. Thereafter, CH 560, issues, as represented by line 1704, a conventional Q.931 SETUP message containing the original called number to establish a circuit-switched call to that number. The local central office in the PSTN which serves gateway 200 then issues, as represented by line 1707, a conventional Q.931 CALL PROCEEDING message with an identification of a T1 channel in an incoming trunk (from gateway 200) that will carry that call to the called directory number. The local central office serving called gateway 200' issues, as represented by line 1710, a Q.931 setup message, to this gateway, specifying the original called directory number as well as a T1 channel on an outgoing trunk (to the gateway) on which this call will appear.

CH 560', as a result of receiving the Q.931 SETUP message, then allocates a free DSP channel, should one then be available and connects, via the TDM switch in the called gateway, the PSTN channel for this call to that DSP channel. Once this occurs, CH 560' issues, as represented by line 1718, an OPEN CHANNEL message to DSP driver 519' to open this just allocated DSP channel. Thereafter, CH 560' issues, as represented by line 1722, a conventional Q.931 CONNECT message to the PSTN to indicate that the called endpoint is connected to the PSTN channel. In response, the PSTN issues, as represented by line 1725, a Q.931 CONNECT message to calling gateway 200. Within this gateway and in response to receipt of this CONNECT message, CH 560 issues, as represented by line 1728, a SEND message, containing the CallId of the present call being switched to the PSTN, to DSP driver 519. This message causes the driver to send, as represented by line 1732 and over the PSTN channel, the CallId of this call to the called gateway using in-band DTMF signaling.

Upon receipt of the CallId information, DSP driver 519' issues, as represented by line 1735, a RECEIVED message containing the CallId. This message is sent to CH 560' which, in turn, disconnects the PSTN channel from the DSP and connects that channel to the PBX. Thereafter, CH 560' issues, as represented by line 1747, a CLOSE CHANNEL (DTMF) message to close the DSP channel used to receive and process DTMF signaling. Next, CH 560' also issues, as represented by line 1750, a CLOSE VOICE PATH message to VPH 517'. This message causes the VPH to close the voice path previously established in gateway 200' over this DSP channel. CH 560' then issues, as represented by line 1753, a CLOSE CHANNEL (VoIP) message to DSP driver 519' which causes the driver to free the two DSP channels, one used for DTMF and the other then used to process the VoIP call.

Also, after DSP driver 519 has sent the CallId information using in-band signaling, CH 560 located in calling gateway 200, disconnects the PSTN channel from the DSP and connects it to the PBX. Thereafter, CH 560 issues, as represented by line 1738, a CLOSE CHANNEL (DTMF) message to close the DSP channel used to receive and process DTMF signaling. Next, CH 560 also issues, as represented by line 1742, a CLOSE VOICE PATH message to VPH 517. This message causes the VPH to close the voice path previously established in gateway 200 over this DSP channel. CH 560 then issues, as represented by line 1745, a CLOSE CHANNEL (VoIP) message to DSP driver 519 which causes the driver to free the two DSP channels, one used for DTMF and the other then used to process the VoIP call.

Once these operations have occurred, CH 560 issues, as represented by line 1756, an H.225.0 RELEASE COMPLETE message to H.323 process 563. H.323 process 563, upon receiving this message, issues, as represented by line 1760, a disengage request message to gatekeeper 700. The gatekeeper having extinguished its end of the data call issues, as represented by line 1763, a disengage confirm message to H.323 process 563. In response to this message, H.323 process 563 sends, as represented by line 1765, the RELEASE COMPLETE message over the PSTN connection, to called gateway 200'. H.323 process 563', upon receiving this message, issues, as represented by line 1768, a disengage request message to gatekeeper 700'. Gatekeeper 700' having extinguished its end the data call then issues, as represented by line 1772, a disengage confirm message to H.323 process 563' which, in turn, issues, as represented by line 1775, a RELEASE COMPLETE message to CH 560'.

f. PSTN to IP Switchover

Figure 18:
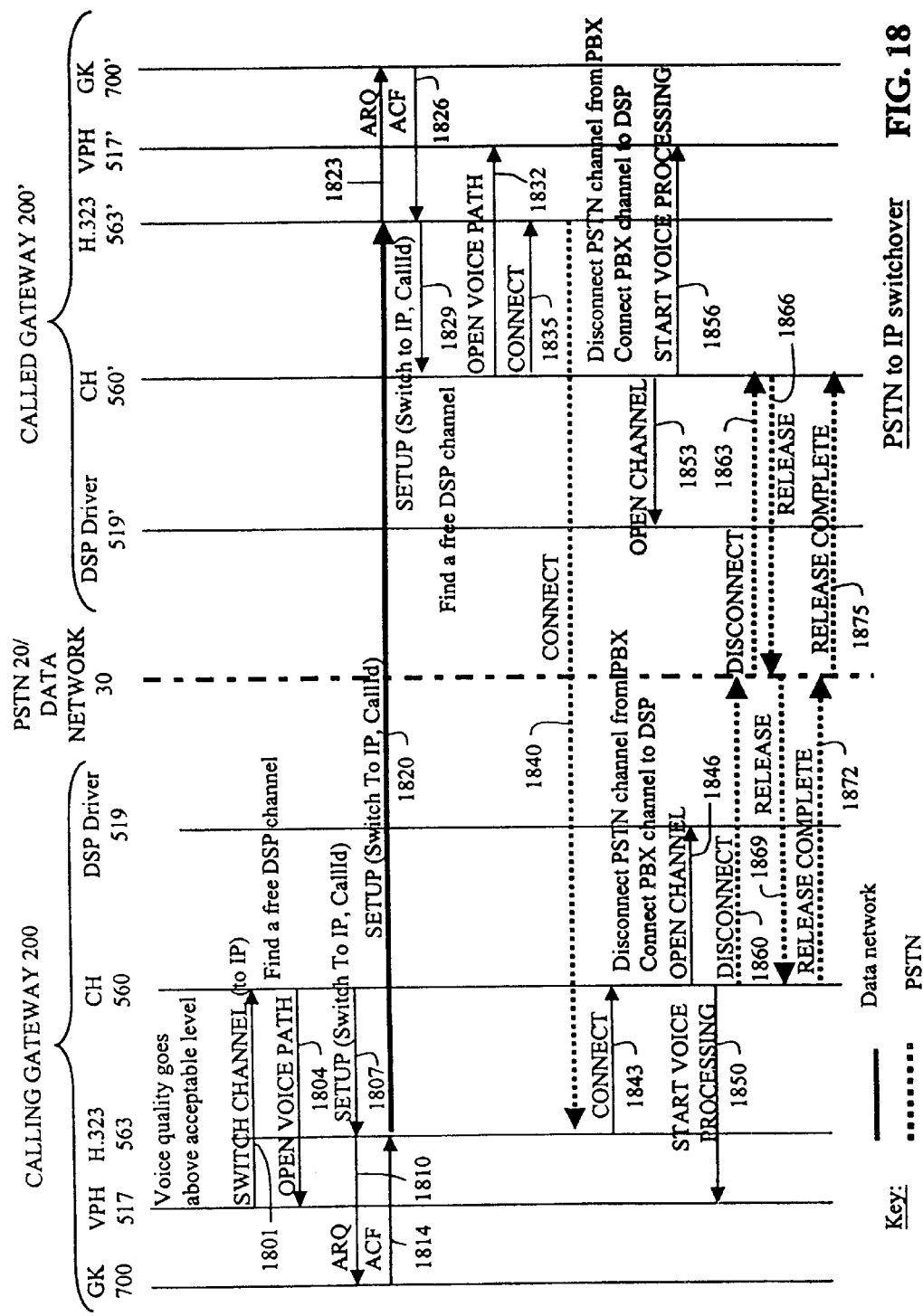
FIG. 18 depicts typical inter-process control messaging that, in accordance with our invention, occurs both between and within peered gateways, e.g., 200 and 200' shown in FIG. 1, for switching a telephone call from being routed over a PSTN connection that spans these gateways to a data network connection between these two gateways.

FIG. 18 depicts typical inter-process control messaging, that would occur both between and within peered gateways 200 and 200', for switching a telephone call from being routed over a PSTN connection that spans these gateways to a data network connection between these two gateways. This scenario constitutes a "reverse" auto-switching situation inasmuch as the call is being switched from the PSTN connection to the data network and not the other way. Here, call information is carried within an H.323 SETUP message to indicate to a far end gateway that this call is not originating for a new end-to-end connection but rather a switchover of an existing call is to occur. The CallId is used to properly match the PSTN and data network calls. Auto-switching in this direction does not utilize a PDN or an ability of the PSTN to deliver a calling directory number to the called end. Moreover, the manner in which the call was switched from the data network to the PSTN, i.e., through use of, e.g., a PDN or automatic number identification (ANI), is immaterial for auto-switching that occurs from the PSTN to the data network.

As shown, assume that QoS, again as determined by TASQ process 537 (see FIG. 5 and discussed above) executing in calling gateway 200, of a data network connection between the calling and called gateways increases above an acceptable level. Accordingly as shown in FIG. 18, VPH 517 issues, as represented by line 1801, a SWITCH CHANNEL message and specifically such a message specifying a switch for that call to the data network. In response, CH 560 allocates an available DSP channel and also issues, as represented by line 1804, an OPEN VOICE PATH message to VPH 517. Thereafter, CH 560 issues a SETUP message containing both a CallId for this call (which was previously generated during the original routing of this call, such as over the data network before that call was switched to the PSTN and is now being switched back to the data network) as well as an instruction to switch this call ("switching instruction") to the data network.

This. SETUP message is provided, as represented by line 1807 to H.323 process 563 which, in turn, generates an H.225.0 admission request message containing the CallId and the switching instruction, and then passes, as represented by line 1810, that message to gatekeeper 700. If the gatekeeper accepts the admission request—i.e., by virtue of, e.g., the calling endpoint having permission to utilize the data network and sufficient network bandwidth then being available to support the call, gatekeeper 700 issues, as represented by line 1814, an H.225.0 admission confirm message to H.323 process 563. In response, H.323 process 563 sends, as represented by line 1820, an H.225.0 SETUP message containing the CallId and the switching instruction, over the data network, to called gateway 200'. Within the called gateway, H.323 process 563' processes this setup message, and in doing so, issues, as represented by line 1823, an H.225.0 ARQ message to gatekeeper process 700'. If this gatekeeper can accept the call, i.e., a called endpoint has appropriate security clearances to receive the call and sufficient bandwidth exists at this end to handle the call, gatekeeper 700' responds, as represented by line 1826, with an H.225.0 admission confirm message to H.323 process 563'. In response to the admission confirm message, H.323 process 563' passes, as represented by line 1829, the SETUP message it received to CH 560'. This call handler then allocates a free DSP channel for voice processing that will occur with this call. Once this DSP channel is assigned, CH 560' issues, as represented by line 1832, an OPEN VOICE PATH command to VPH 517' which, in turn, opens a packetized voice path for this call through the allocated DSP channel. Thereafter, CH 560 issues, as represented by line 1835, a CONNECT message to H.323 process 563'. This process sends, as represented by line 1840, this CONNECT message to the calling gateway. Also, once CH 560' issues the CONNECT message, this CH then disconnects the PBX channel from the PSTN channel, which previously carried the call, and connects the former channel to the allocated DSP channel. Once this connection has been made with the called gateway, CH 560' issues, as represented by line 1853, an OPEN CHANNEL message to DSP driver 519' to open this DSP channel. CH 560' also issues, as represented by line 1856, a START VOICE PROCESSING message to VPH 517' instructing it to commence voice processing of signals occurring over this DSP channel for a duration of this data network call. Similarly, within calling gateway 200, in response to the CONNECT message forwarded, as represented by line 1843, to CH 560, this call handler disconnects the PBX channel from the PSTN channel, which previously carried the call, and connects the former channel to the allocated DSP channel. Thereafter, CH 560 issues, as represented by line 1846, an OPEN CHANNEL message to DSP driver 519 to open this DSP channel, followed by a START VOICE PROCESSING message, as represented by line 1850, to VPH 517 to instruct it to commence voice processing of signals occurring over the DSP channel for the duration of this data network call. CH 560' also issues, as represented by line 1856, a START VOICE PROCESSING message to VPH 517' instructing it to commence voice processing of signals occurring over its DSP channel for this data network call and for a duration of this call. Thereafter, CH 560 issues, as represented by line 1860, a DISCONNECT message over the PSTN channel to the data network to disconnect the PSTN connection for this call. The PSTN then issues, as represented by line 1863, a DISCONNECT message to called gateway 200' which, in turn, instructs CH 560' to disconnect its current PSTN connection for this call. To signify that the called gateway has in fact released the PSTN channel that previously carried this call, CH 560' issues, as represented by line 1866, a Q.931 RELEASE message to the PSTN. The PSTN then issues, as represented by line 1869, a Q.931 RELEASE message to the calling gateway. Once CH 560 releases its PSTN connection for this call, that call handler issues, as represented by line 1872, a Q.931 RELEASE COMPLETE message to the PSTN which, in turn, issues a corresponding Q.931 RELEASE COMPLETE message to the called gateway and to CH 560' therein to fully acknowledge release of its PSTN connection for this call.

Figure 19:
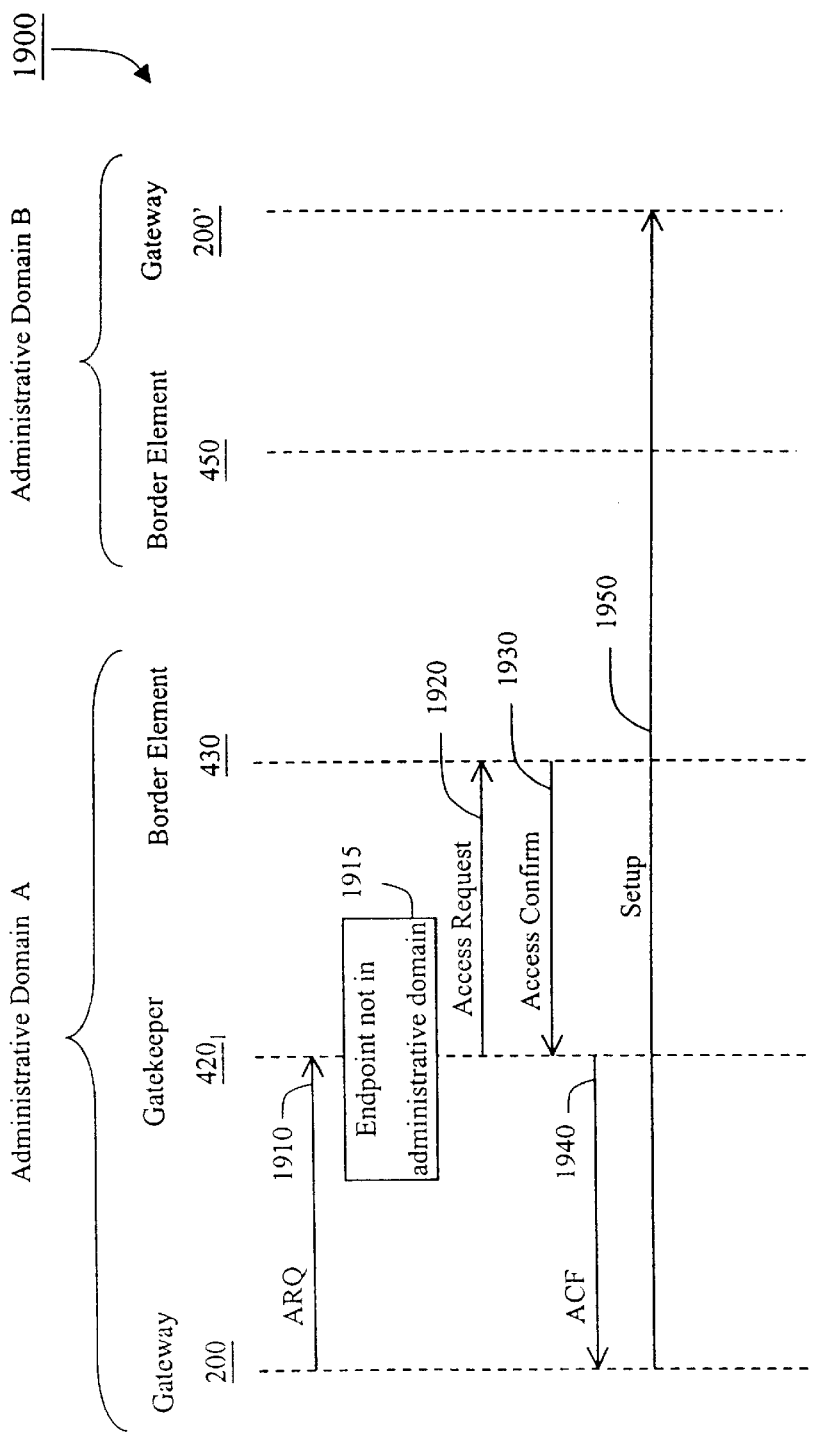
FIG. 19 depicts a sequence of inter- and intra-gateway operations 1900 that occurs, in accordance with our invention, for routing a telephone call over data network 30 (as depicted in FIG. 1) between two administrative domains in an H.323 environment, e.g., that shown in FIG. 4B, where the routing information for the called endpoint has been cached within and is supplied by the border element within the same domain as the calling endpoint ("simple call routing")

4. Inter-domain Call Routing Sequence a. Routing Information Resides in Same Administrative Domain as Calling Endpoint FIG. 19 depicts a sequence of inter- and intra-gateway operations 1900 that would occur for routing a telephone call over the data network between two administrative domains in an H.323 environment, e.g., that shown in FIG. 4B, where the routing information for the called endpoint has been cached within and is supplied by a border element within the same domain as the calling endpoint ("simple call routing"). As noted above, routing information is supplied in the form of a corresponding descriptor as each endpoint registers with a gatekeeper. Once a new endpoint registers with a gatekeeper, that gatekeeper supplies the descriptor of that new endpoint to a border element in same administrative domain as the gatekeeper for publication to all other such gatekeepers in the same domain. In addition, an external border element in one domain can request, from an external border element in another domain, all descriptors for that other domain for internal storage at the former border element. In addition and as noted above, an external border element also caches, for subsequent use, in its local storage descriptors of inter-domain calls that have been recently routed through that border element.

Figure 20:
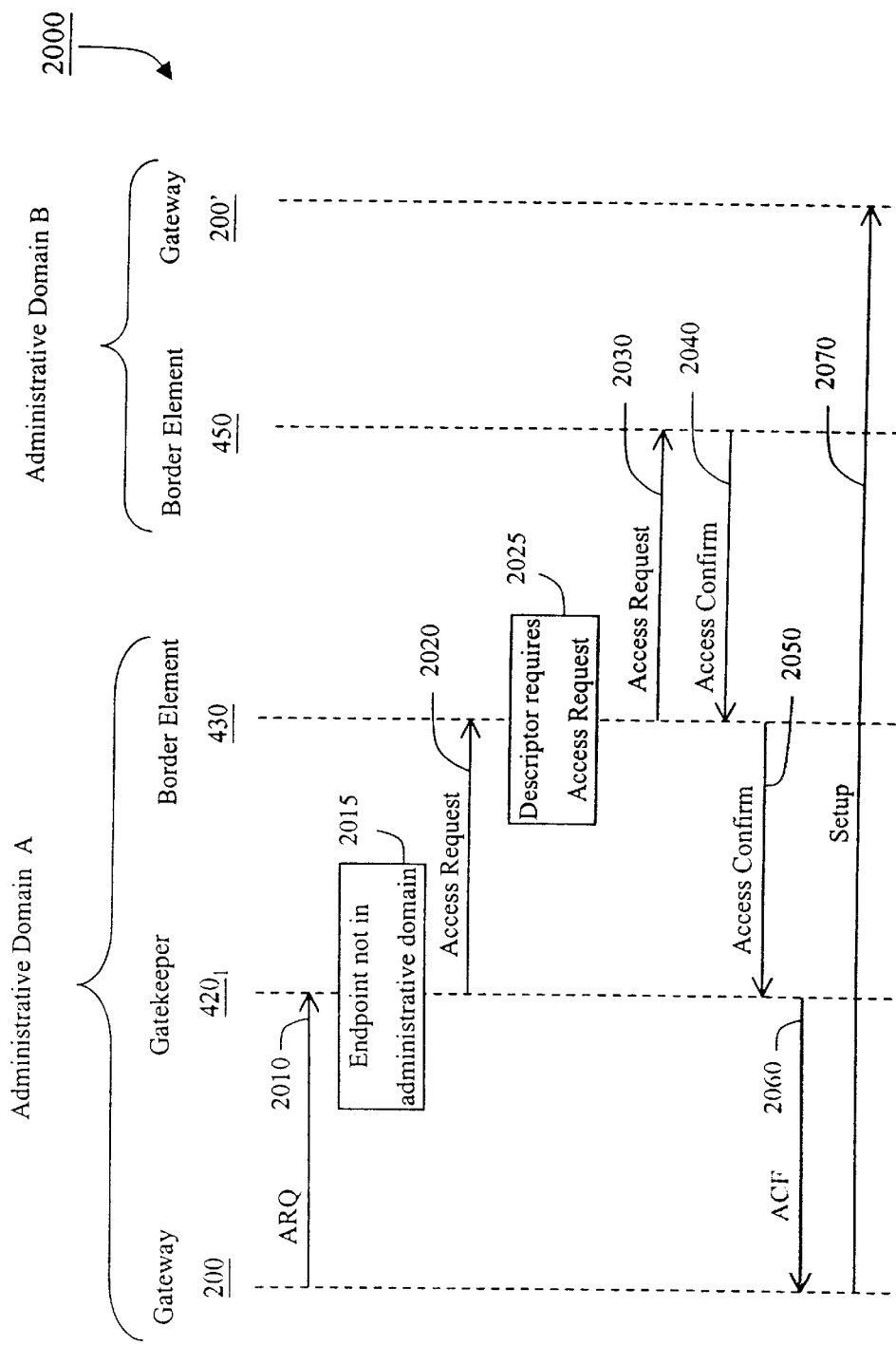
FIG. 20 depicts sequence 2000 of inter- and intra-gateway operations that occurs, in accordance with our present invention, for routing a telephone call over data network 30 (as depicted in FIG. 1) between two administrative domains in an H.323 environment, similar to that shown in FIG. 19, but where the routing information for the called endpoint does not reside in the same domain as the calling endpoint ("complex call routing")

Here, assume that a call is being initiated through a calling directory number associated with a telephony endpoint (not shown) serviced through Administrative Domain A to a called directory number associated with a telephony endpoint (also not shown) serviced through Administrative Domain B. First, calling gateway 200 within this domain, sends, as represented by line 1910, an H.225.0 admission request (ARQ) message to gatekeeper 420₁ that services the calling endpoint. The gatekeeper then determines, as indicated in block 1915, whether, in the context of routing the call, the called endpoint lies in the same administrative domain, i.e., Domain A, as the calling endpoint. If not, as is the case here, gatekeeper 420₁ issues, as represented by line 1920, an Access Request, containing, e.g., a called directory number for this call, to-border element 430 in order to resolve this number into a destination network address for the called endpoint. Since in this scenario, border element 430 possesses the requisite routing information, this border element returns, as represented by line 1930, an Access Confirm message containing the resolved destination address, i.e., the network address. Gatekeeper 420₁, in response to receiving this address, issues, as represented by line 1940, an H.225.0 Admission Confirm (ACF) message containing the destination address back to calling gateway 200 which then proceeds, as represented by line 1950, to interact with called gateway 200' to establish the call over the data network.

b. Routing Information Resides in Different Administrative Domain as Calling Endpoint FIG. 20 depicts a sequence of inter- and intra-gateway operations 2000, similar to those shown in FIG. 19, that would occur for routing a telephone call over the data network between two administrative domains, but where the routing information for the called endpoint does not then reside in a border element in the same administrative domain as the calling endpoint.

Here, too, assume that a call is being initiated through a calling directory number associated with a telephony endpoint (not shown) serviced through Administrative Domain A to a called directory number associated with a telephony endpoint (also not shown) serviced through Administrative Domain B. First, calling gateway 200 within this domain, sends, as represented by line 2010, an H.225.0 admission request (ARQ) message to gatekeeper 420₁ that services the calling endpoint. The gatekeeper then determines, as indicated in block 2015, whether, in the context of routing the call, the called endpoint lies in the same administrative domain, i.e., Domain A, as the calling endpoint. If not, as is the case here, gatekeeper 420₁ issues, as represented by line 2020, an Access Request, containing, e.g., a called directory number for this call, to border element 430 in order to resolve this number into a destination network address for the called endpoint. Since in this scenario, border element 430 does not then possess the requisite routing information, i.e., it does not possess a corresponding descriptor for the called endpoint, this element concludes, as indicated by block 2025, that it requires a descriptor for this endpoint. Consequently, border element 430 issues, as represented by line 2030, an Access Request to an external border element, e.g., border element 450, in the called administrative domain to resolve the called directory number. In response, border element 450 returns, as represented by line 2040, an Access Confirm message containing the resolved destination address, i.e., the network address to border element 430 which, in turn, updates its own routing table with this descriptor and also, as represented by line 2050, sends this Access Confirm message to gatekeeper 420₁. Gatekeeper 420₁, in response to receiving this address, issues, as represented by line 2060, an H.225.0 Admission Request Confirm (ACF) message containing the destination address back to calling gateway 200 which then proceeds, as represented by line 2070, to interact with called gateway 2001 to establish the call over the data network.

c. Intra-gatekeeper Operations

FIG. 26 depicts inter-process interactions 2600 that occur within a gatekeeper, such as gatekeeper 700, to route a VoIP call being made by a gateway, here gateway 200, registered with that gatekeeper.

As shown, in response to an incoming H.225.0 admission request (ARQ) message, as represented by line 2620, from local H.323 process 563 (not shown) executing within gateway 200, endpoint manager 750, sends, as represented by line 2610, an ARQ message to H.323 endpoint $405_1$. As noted above, manager 750 manages H.323 endpoints which includes registration and de-registration of endpoints, allocating and de-allocating network bandwidth associated with a call, call routing between endpoints and appropriate endpoint address translation for use by routing process 760. Hence, once the endpoint manager, within the gatekeeper, receives the ARQ message—which includes the called directory number, that manager determines which particular endpoint, here, e.g., endpoint $405_1$, is requesting this call and then forwards, as represented by line 2620, the ARQ message to it. In response to the ARQ message, endpoint $405_1$ issues, as represented by line 2630, a Route Request message to routing process 760 to request destination routing information to the called directory number. In response to this message, routing process 760 examines its associated routing tables to determine whether those tables contain an entry for the called directory number. If routing information is found, process 760 returns, as represented by line 2640, a Route OK message containing all possible telephony endpoints that are qualified to accept the call. Once this occurs, endpoint $405_1$ issues, as represented by line 2650, a Reserve Bandwidth command to the endpoint manager to reserve an amount of bandwidth as required for this call. Depending on the specific type of communication to be carried over this call, i.e., voice, modem data or facsimile, bandwidth requirements will vary accordingly. Given that available bandwidth is a finite resource, limits are placed on which telephony endpoints can use it and how much of that bandwidth each can use at any specific time. If the requested bandwidth can be allocated for this call, then it is suitably reserved by endpoint manager 750 which, in turn, returns a Bandwidth Reserved message, as represented by line 2660, to the requesting endpoint. In response, the endpoint then issues, as represented by line 2670, an H.323 admission confirm (ACF) message to the endpoint manager signifying that the call can be completed over the reserved bandwidth. The endpoint manager, in turn, passes the ACF message to gateway 200 that made the call request and specifically through local H.323 process 563 (not shown) executing within that gateway.

5. Service Establishment Sequence

Figure 21:
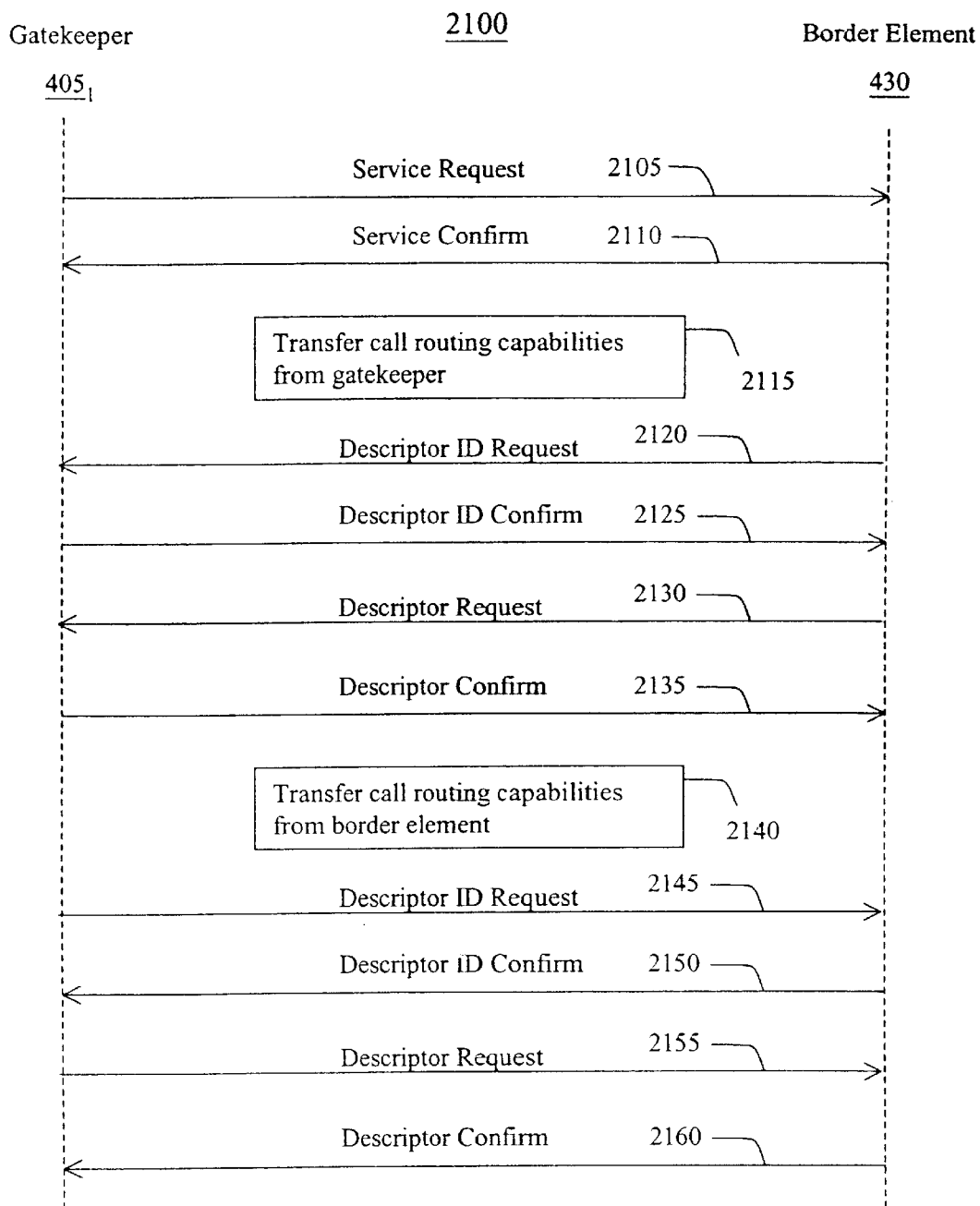
FIG. 21 depicts inter-process messaging that occurs between a gatekeeper and a border element, in the same administrative domain, for establishing a service relationship therebetween.

FIG. 21 depicts inter-process operational sequence 2100 that occurs between a gatekeeper, e.g., gatekeeper $405_1$, and a border element, e.g., border element 430, in the same administrative domain, for establishing a service relationship therebetween. This typically occurs upon power-up of a gatekeeper or whenever a gatekeeper, previously taken out of service, is then returned to active service.

First, requesting gatekeeper $405_1$ issues, as represented by line 2105, a Service Request message to border element 430. In response, the border element replies, as represented by line 2110 and assuming it can provide requested service, with a Service Confirm message back to the requesting gatekeeper. Thereafter, as indicated by block 2115, gatekeeper $405_1$ downloads all its own zone-based call routing capabilities to the border element, thereby updating the border element with the routing information for the zone handled by the gatekeeper. To do so, the border element issues, as represented by line 2120, a Descriptor ID Request message to the gatekeeper in order to obtain an identifier for each descriptor then stored in the gatekeeper. In response, the gatekeeper provides, as represented by line 2125, a Descriptor ID Confirm message that contains a list of identifiers (Descriptor IDs) for all descriptors then stored within the gatekeeper. Once this information has been received, the border element separately requests and, in response, obtains each descriptor identified in the list. Specifically, for each descriptor requested, border element 430 issues, as represented by line 2130, a Descriptor Request specifying a corresponding Descriptor ID for that descriptor. In response, the gatekeeper downloads, as represented by line 2135, the requested descriptor to the border element. The operations represented by lines 2130 and 2135 are iteratively repeated for each successive descriptor requested-by the border element.

Once gatekeeper $405_1$ has downloaded all its descriptors to border element 430, the gatekeeper requests, as indicated by block 2140, administrative zone-based routing information from the border element, i.e., descriptors, associated with all other zones, other than that for gatekeeper $405_1$, in the same administrative domain as the border element. Hence, once this information has been stored in gatekeeper $405_1$, this gatekeeper will possess descriptors for all the endpoints in its domain. Specifically, to do so, the gatekeeper issues, as represented by line 2145, a zone-based Descriptor ID Request message to the border element in order to obtain an identifier for each descriptor then stored in the border element. In response, the border element provides, as represented by line 2150, a Descriptor ID Confirm message that contains a list of identifiers for each and every descriptor, other than those provided by gatekeeper $405_1$, then stored within that border element. Once this information has been received, the gatekeeper separately requests and, in response, obtains each descriptor identified in the list. Specifically, for each descriptor requested, gatekeeper $405_1$ issues, as represented by line 2155, a Descriptor Request specifying a corresponding Descriptor ID for that descriptor. In response, the border element downloads, as represented by line 2160, the requested descriptor to the border element. The operations represented by lines 2155 and 2160 are iteratively repeated for each successive descriptor requested by the gatekeeper. Once all the border element provides all its requested routing information to the gatekeeper, a service relationship exists between the two and sequence 2100 ends.

6. Information Transfer Sequence

Figure 22:
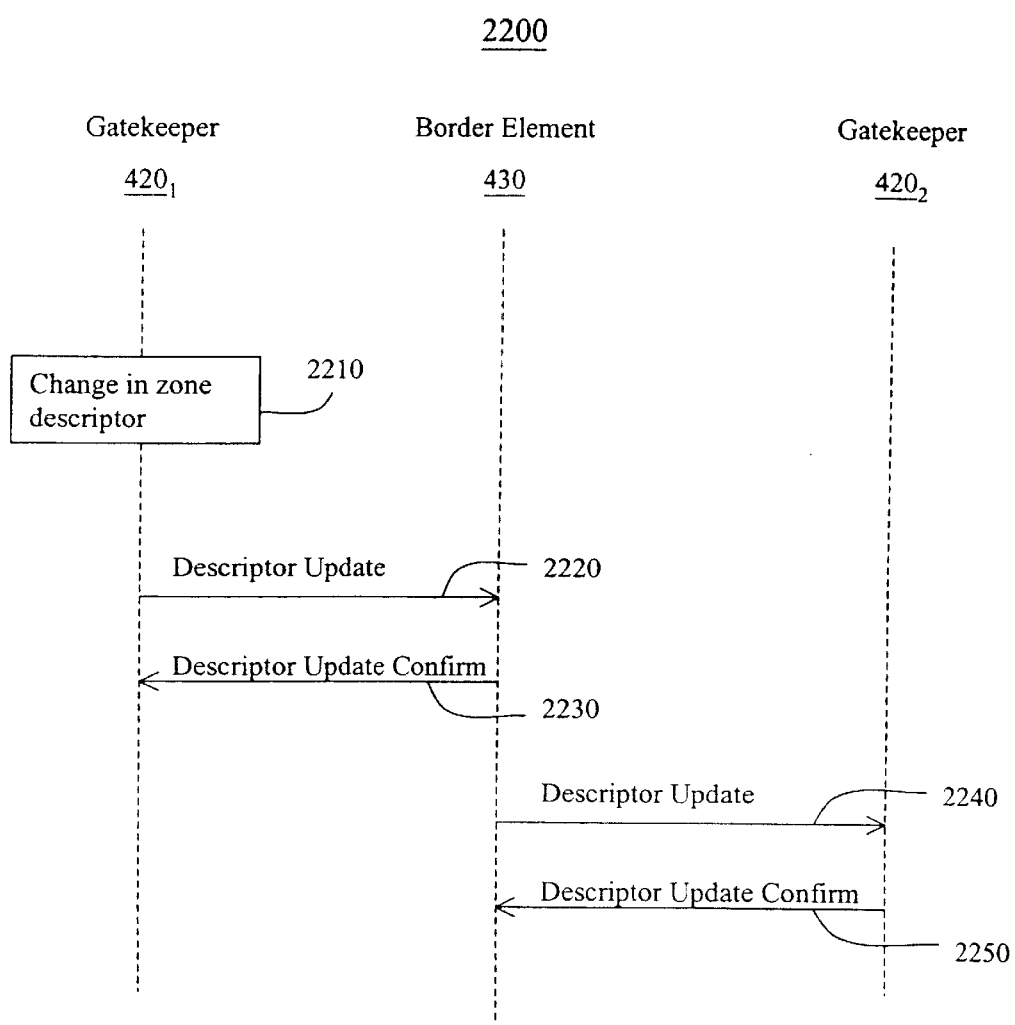
FIG. 22 depicts inter-process sequence 2200 that occurs to transfer routing information from one gatekeeper to another in the same administrative domain.

FIG. 22 depicts inter-process sequence 2200 that occurs to transfer routing information from one gatekeeper to another in the same administrative domain. As noted above, routing information stored in a gatekeeper changes as gateways and telephony endpoints serviced through that gatekeeper register and de-register themselves with that gatekeeper. As each such element registers and de-registers with its corresponding gatekeeper in an administrative domain, that gatekeeper sends associated routing changes, i.e., descriptor updates, to an associated border element which then distributes the routing changes to all other gatekeepers in that same domain (including gatekeepers that have established service relationships with peer border elements in that domain).

As shown in FIG. 22, assume a change, as indicated in block 2210, in a descriptor in a zone serviced by gatekeeper $420_1$ occurs, regardless of whether it occurs through registration or de-registration of a gateway or telephony endpoint. Thereafter, as represented by line 2220, gatekeeper $420_1$ issues a Descriptor Update message containing an instruction to update existing descriptor(s) along with appropriate descriptor change(s). These changes include deleting or updating an existing descriptor(s), or adding a new descriptor(s). Once this message is received and processed by border element 430, that element issues, as represented by line 2230, a Descriptor Update Confirm message back to gatekeeper $420_1$ to acknowledge that the particular descriptor(s) has been updated.

Then, border element 430 issues, as represented by line 2240, a Descriptor Update message to distribute this descriptor change(s) to a next successive gatekeeper in the domain, here gatekeeper $420_2$. Once this message is received and processed by that next gatekeeper, that gatekeeper issues, as represented by line 2250, a Descriptor Update Confirm message back to border element 430 to acknowledge that the particular descriptor(s) has been updated. Operations 2240 and 2250 are iteratively repeated for every gatekeeper in the administrative domain other than that, e.g., gatekeeper $420_1$, which provided the descriptor changes to border element 430.

Whether the descriptors being updated reside in the border element or in a gatekeeper, the Descriptor Update message communicated to either element contains a sequence of descriptor changes that encompasses all the descriptor changes then needed to be made.

7. Call Teardown a. Inter-gatekeeper Operations

Figure 23:
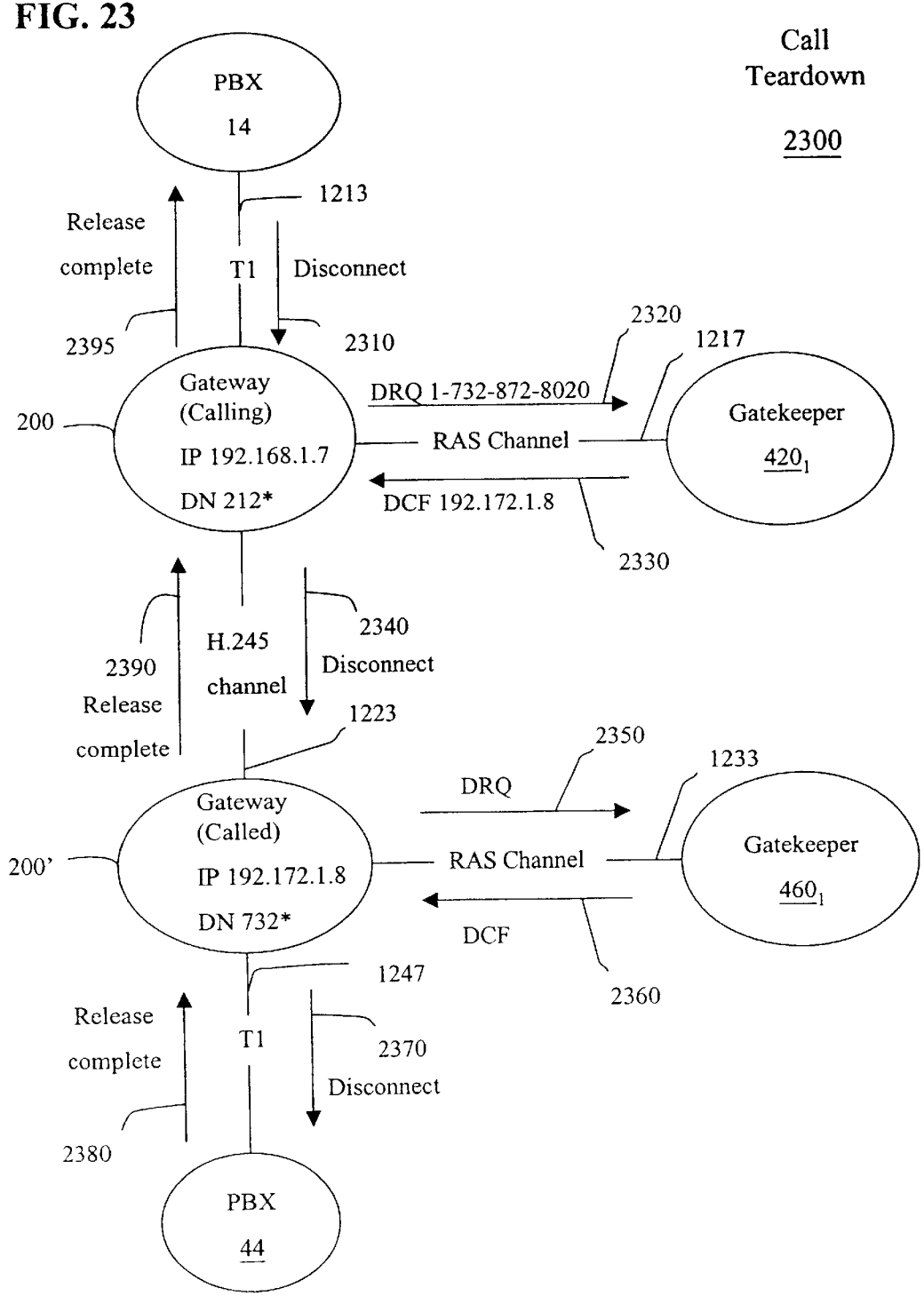
FIG. 23 depicts inter-process interactions 2300 that occur between two gatekeepers for tearing down a VoIP call.

FIG. 23 depicts inter-process interactions 2300 that occur between two gatekeepers, here illustratively gatekeepers $420_1$ and $460_1$, for tearing down a call then carried over the data network (VoIP call).

Specifically, assume that a data call has been established between corresponding telephony endpoints connected to calling and called gateways 200 and 200', respectively, and that a user stationed at a calling endpoint serviced by PBX 14 then hangs up his(her) telephone. As a result, this PBX sends, as represented by line 2310, a Q.931 Disconnect message, containing the calling directory number (here, e.g., "1-732-872-8020") to gateway 200. This signaling information is conveyed through DTMF (dual-tone multifrequency) tones, pulses or ISDN D-channel information, as appropriate, over an incoming trunk in T1 trunks 1213. Gateway 200, in turn, sends, as represented by line 2320 and over RAS channel 1217, an H.225.0 disengage request (DRQ) message to a gatekeeper, e.g., gatekeeper $420_1$, servicing this endpoint. This DRQ message specifies the dialed number for which this data connection is being torn down by the gateway. In response to the DRQ message, gatekeeper $420_1$, returns, as represented by line 2330, an H.225.0 disengage confirm (DCF) message containing an IP address of the called gateway, since this call is terminated at that gateway. This gatekeeper, as well as peer gatekeeper $460_1$, identifies this call through an association previously established between routing information for this call and a unique CallId that was established during setup of this call and reserved for use by this call throughout its entire duration. In response to this DCF message, the calling gateway sends, as represented by line 2340 and via H.245 channel 1223, a Q.931 Disconnect message, containing the CallId, to the called gateway, here gateway 200'.

In response to the Disconnect message, called gateway 200' sends, as represented by line 2350, an H.225.0 DRQ message to a gatekeeper, here illustrative gatekeeper $460_1$, that serves the called endpoint. This message requests this gatekeeper to disconnect the data connection then carrying this call. In response, gatekeeper $460_1$ returns, as represented by line 2360 and over RAS channel 1233, sends an H.225.0 DCF message back to gateway 200'. In response to this confirmation message, called gateway $460_1$ sends, as represented by line 2370, a Q.931 Disconnect message over an outgoing trunk in T1 trunks 1247, to PBX 44 using DTMF, dialing pulses or ISDN, depending on its capability and configuration to disconnect the T1 channel connection to the PBX. Once this PBX releases and frees this channel, PBX 44 then issues, as represented by line 2380, an appropriate Release Complete message back to the called gateway. This gateway, in turn, issues, as represented by line 2390 and via the H.245 channel, a Release Complete message to the calling gateway. In response to this message, the calling gateway issues, as represented by line 2395, a Q.931 Release Complete message, via an incoming trunk in T1 trunks 1213, to PBX 14 to indicate that the connection to the PBX has been completely released for this call. The calling gateway, here gateway 200, then frees the PBX channel it had been using for this call.

b. Intra-gatekeeper Operations

FIG. 27 depicts inter-process interactions 2700 that occur within a gatekeeper, here gatekeeper 700 (not specifically shown in FIG. 27), to tear down the VoIP call to an endpoint, here, e.g., endpoint $405_1$ served by that gatekeeper.

As shown, in response to an incoming H.323 disengage request (DRQ) message, as represented by line 2710, from local H.323 process 563 (not shown) executing within gateway 200, endpoint manager 750, sends, as represented by line 2720, the DRQ message to H.323 endpoint $405_1$. This message indicates that the endpoint desires to release resources it had been using for an active VoIP call. As noted above, manager 750 manages H.323 endpoints which includes, inter alia, registration and de-registration of endpoints, allocating and de-allocating network bandwidth associated with a call. In response to the DRQ message, the endpoint manager identifies which particular endpoint, here endpoint $405_1$, is handling this call and forwards, as represented by line 2720, the DRQ message to that endpoint. In response, endpoint $405_1$ identifies the call instance for this call and issues, as represented by line 2730, an instruction to free the bandwidth which had been allocated to that endpoint for this call. Once the manager frees this bandwidth for allocation to other calls, the manager sends, as represented by line 2740, a Bandwidth Freed message to the endpoint signifying that the bandwidth has been freed. In response, the endpoint issues, as represented by line 2750, an H.323 Disengage Confirm (DCF) message to manager 750 which, in turn and as represented by line 2760, passes the H.323 DCF message to gateway 200 that issued the request to terminate the call and specifically through local H.323 process 563 (not shown) executing within that gateway.

8. Registration

As discussed above, a gateway must register with a gatekeeper in order for calls to be placed through that gateway. Typically, a gateway registers upon its power-up or being reset, or upon its being returned to service.

Registration serves multiple purposes. First, it establishes service relationships between telephony endpoints and gateways and, for registered endpoints, starts a keep-alive operation during which each endpoint is continuously polled by an Information Request (IRQ) message issued by the gatekeeper for current call routing information. If a registered endpoint in any zone fails to respond, the gatekeeper responsible for that zone de-registers that endpoint and purges its stored call routing information for that endpoint.

Endpoints also register with gatekeepers in accordance with the H.323 standard in order for each such endpoint to supply its routing descriptor to its servicing gatekeeper and thereby originate and terminate calls over the data network. From a standpoint of establishing routing information under H.323, actual telephony endpoints and gateways are registered in the same exact manner and are collectively viewed as "endpoints" with a routing descriptor created and published for each by a corresponding gatekeeper, and the same underlying operations being performed to register either. Consequently, we will treat both as being "endpoints" for purposes of registration and later, in the context of discussing FIGS. 25 and 29, de-registration.

As discussed above, corresponding routing information, i.e., routing descriptors, for an endpoint (whether it is a terminal or a gateway) provided by a gatekeeper to its external border element is also provided by that border element to its peer border element for use in dynamically updating its routing information such that peered border elements maintain identical routing information.

Since routing information obtained during registration of an H.323 entity is not published by a border element beyond its own administrative domain and hence has no impact on routing information stored in any other domain, we will only discuss those operations that occur within the domain into which that entity, e.g., here, e.g., gateway 200, is registering.

a. Inter-gatekeeper Operations

Figure 24:
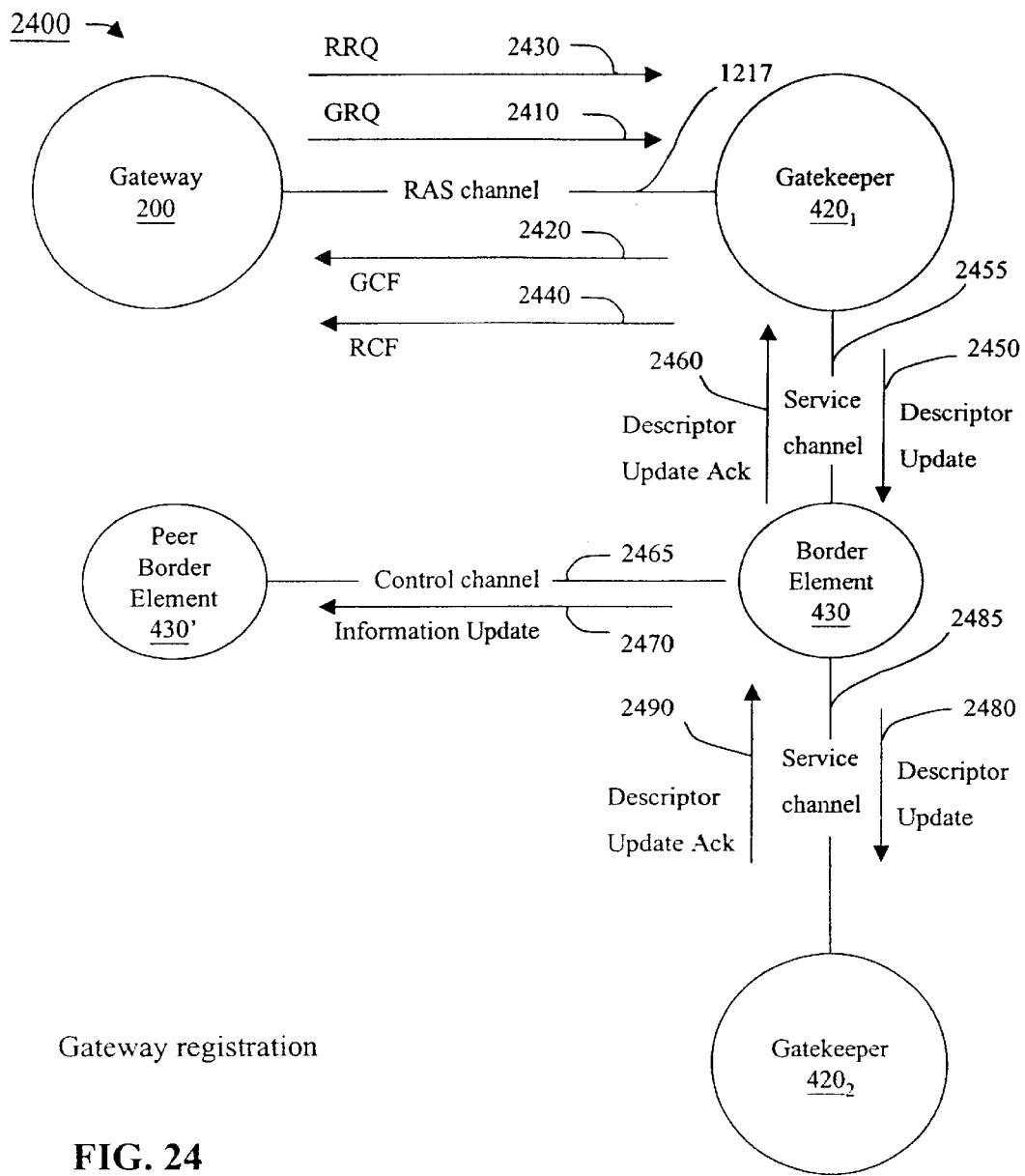
FIG. 24 depicts inter-process interactions 2400 that occur, in accordance with our invention, in the course of registering a gateway with a gatekeeper.

FIG. 24 depicts inter-process interactions 2400 that occur, in accordance with our invention, in the course of registering a gateway, e.g., gateway 200, with a gatekeeper, e.g., gatekeeper $420_1$.

First, gateway 200 issues, as represented by line 2410 and over-RAS channel 1217, an H.323 Gatekeeper Request (GRQ) message over a gatekeeper multicast address. This message is used to identify all gatekeepers in a zone. In response to this message, a gatekeeper, e.g., gatekeeper $420_1$, replies, as represented by line 2420 with an H.323 Gatekeeper Confirm (GCF) message to indicate that it can provide service to the requesting gateway. Thereafter, gateway 200 sends, as represented by line 2430, an H.323 Registration Request (RRQ) message, including its routing information, to this gatekeeper to specify that this gateway seeks to be serviced by this gatekeeper. If gatekeeper $420_1$ is able to service gateway 200 and hence permits that gateway to register, gatekeeper $420_1$ issues, as represented by line 2440, an H.323 Registration Confirm (RCF) message over RAS channel 1217 to the gateway. If registration is denied for any reason, the gatekeeper sends an H.323 Registration Reject message (RRJ—not shown) back to the gatekeeper which, in turn, terminates the registration process.

Should gatekeeper $420_1$ confirm the registration request, that gatekeeper issues, as represented by line 2450 and over service channel 2455, a Descriptor Update message to its associated border element, here element 430. This message contains the routing information just supplied by the registering gateway. In response, border element 430 sends, as represented by line 2460, a Descriptor Update Acknowledgement message over this service channel and back to gatekeeper $420_1$, to confirm receipt of this routing information. Furthermore, border element 430 issues, as represented by line 2470 and over control channel 2465, an Information Update message to its peer border element, here element 430'. This update-message contains the routing information supplied by the registering gateway and is used by the peer border element to update its routing information. Hence, both peered border elements maintain the same routing information across their entire and common administrative domain.

Thereafter, border element 430 publishes the updated routing information, i.e., routing descriptor, it just obtained from gatekeeper $420_1$ to every other gatekeeper in its administrative domain. To do so, border element 430 issues, as represented by line 2480 and over service channel 2485, a Descriptor Update message to a next successive gatekeeper, here gatekeeper $420_2$, in its administrative domain. This update contains the routing descriptor provided by and for newly registered gateway 200. Once gatekeeper $420_2$ receives this update, it responds with a Descriptor Update Acknowledge message, as represented by line 2490 over service channel 2485, back to border element 430. Gatekeeper $420_2$ then updates its own routing information accordingly. If more than one other gatekeeper exists in the administrative domain, then border element 430 issues a separate Descriptor Update message to that element and receives therefrom a separate Descriptor Update Acknowledgement message from that element, prior to proceeding to providing the new routing descriptor to the next element, and so forth.

b. Intra-gatekeeper Operations

FIG. 28 depicts inter-process interactions 2800 that occur within a gatekeeper for registering a new gateway with that gatekeeper. As noted above, H.323, from a standpoint of registering an endpoint, in the sense of a telephony endpoint and a gateway, collectively views both as being "endpoints" and hence makes no distinction in registering one over the other in terms of the underlying operations that register these entities.

As shown, endpoint 2805, here, e.g., registering gateway 200, issues, as represented by line 2810, the H.323 Registration Request (RRQ) message to the gatekeeper. In response, endpoint manager 750, through querying its routing information, determines whether routing information is presently stored for new endpoint 2805. If not, the gatekeeper creates, as represented by line 2820, a new endpoint entry, for gateway 200, in its routing tables for this new endpoint and readies that entry for use. Once this occurs, endpoint manager 750 forwards, as represented by line 2830, the RRQ message to this new endpoint (i.e., to gateway 200). In response to the RRQ message, this new endpoint extracts its routing information, i.e., a routing descriptor, from this message, and issues, as indicated by line 2840, an Add Zone address message, containing this routing descriptor, to Routing process 760. In response, this process updates its routing tables to insert routing information contained in this descriptor into its zone routing tables. Thereafter, endpoint 2805 issues, as represented by line 2850, an Endpoint Register command, including its routing descriptor, to administrative domain manager 740 which, in turn, publishes the routing descriptor to all other gatekeepers in the administrative domain. Finally, endpoint manager 750 confirms the registration by issuing, as represented by line 2860, an H.323 Registration Confirm (RCF) message back to the.gateway.

9. De-registration

As noted above, routing information obtained during registration of an H.323 entity is not published by a border element beyond its own administrative domain and hence, from the standpoint of its publication, has no impact on any other domain. The converse is also true during de-registration, in that changes in routing information occasioned during de-registration are not published beyond an administrative domain in which that entity is de-registering. Hence, we confine our discussion of the operations that occur during de-registration to the administrative domain in which an entity, here, e.g., gateway 200, is de-registering.

a. Inter-gatekeeper Operations

Figure 25:
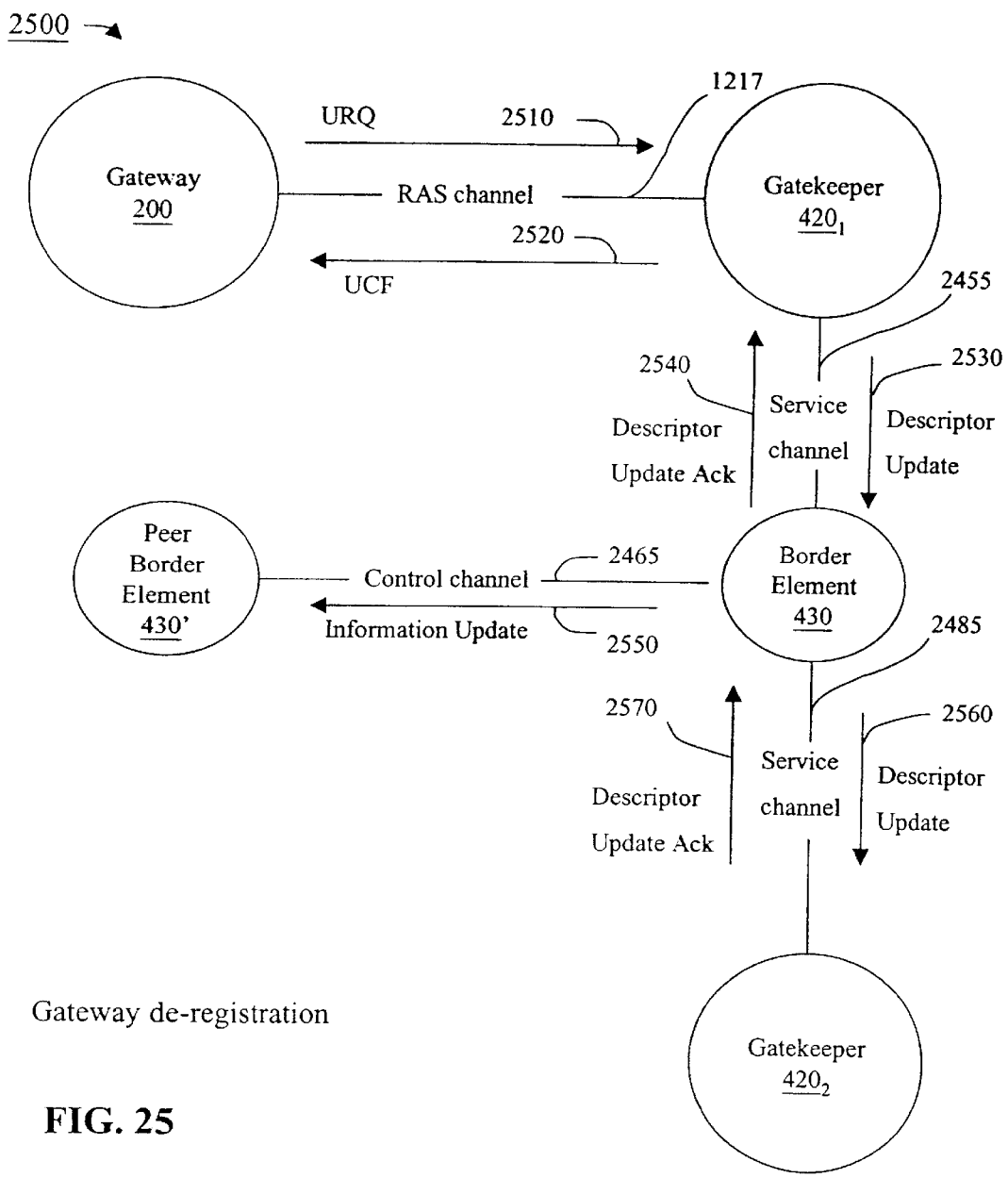
FIG. 25 depicts inter-process interactions 2500 that occur, in accordance with our invention, in the course of de-registering a gateway from a gatekeeper.

FIG. 25 depicts inter-process interactions 2500 that occur, in accordance with our invention, in the course of de-registering a gateway, e.g., gateway 200, from a gatekeeper.

First, gateway 200 issues, as represented by line 2510 and over RAS channel 1217, an H.323 Gatekeeper Unregistration Request (URQ) message. This message indicates that this gateway no longer requires service from its servicing gatekeeper. In response to this message, a gatekeeper, e.g., gatekeeper $420_1$, replies, as represented by line 2520 with an H.323 Unregistration Confirm (UCF) message indicating that the gateway will no longer be provided with such service.

Gatekeeper $420_1$ then issues, as represented by line 2530 and over service channel 2455, a Descriptor Update message to its associated border element, here element 430. This message contains the routing information that is to be removed for gateway 200 from the routing tables by both the border elements and the other gatekeepers in the administrative domain. In response, border element 430 sends, as represented by line 2540, a Descriptor Update Acknowledgement message over this service channel and back to gatekeeper $420_1$, to confirm receipt of this routing information. Furthermore, border element 430 issues, as represented by line 2550 and over control channel 2465, an Information Update message to its peer border element, here element 430'. This update message contains the routing information supplied by the registering gateway and is to be deleted by the peer border from its routing information as well.

Thereafter, border element 430 publishes the deleted routing information, i.e., routing descriptor, it just obtained from gatekeeper $420_1$ to every other gatekeeper in its administrative domain. To do so, border element 430 issues, as represented by line 2560 and over service channel 2485, a Descriptor Update message to a next successive gatekeeper, here gatekeeper $420_2$, in its administrative domain. This update contains the routing descriptor associated with gateway 200 that has been de-registered. Once gatekeeper $420_2$ receives this update, it responds with a Descriptor Update Acknowledge message, as represented by line 2570 over service channel 2485, back to border element 430. Gatekeeper $420_2$ then updates its own routing information accordingly. If more than one other gatekeeper exists in the administrative domain, then border element 430 issues a separate Descriptor Update message to that element and receives therefrom a separate Descriptor Update Acknowledgement message from that element, prior to deleting the routing descriptor from the next element, and so forth.

b. Intra-gatekeeper Operations

FIG. 29 depicts inter-process interactions 2900 that occur within a gatekeeper for de-registering a gateway, e.g., gateway 200, from that gatekeeper. As noted above, H.323, from a standpoint of de-registering a telephony endpoint, in the sense of a telephony endpoint and a gateway, collectively views both as being "endpoints" and hence makes no distinction in registering one over the other in terms of the underlying operations that de-register these entities.

As shown, endpoint 2805, here, e.g., de-registering gateway 200, issues, as represented by line 2910, the H.323 Unregistration Request (URQ) message to the gatekeeper. In response, endpoint manager 750, through querying its routing information, locates the endpoint in its routing tables and forwards, as represented by line 2920, the URQ message to this existing endpoint (i.e., to gateway 200). In response to the URQ message, the endpoint issues, as indicated by line 2930, a Delete Zone Address message containing its routing descriptor, to Routing process 760. Thereafter, this process updates its routing tables by deleting the routing information contained in this descriptor from its zone routing tables. Thereafter, endpoint 2805 issues, as represented by line 2940, an Endpoint Unregister command, including its routing descriptor, to administrative domain manager 740 which, in turn, publishes the routing descriptor to all other gatekeepers in the administrative domain such that routing information in this descriptor can be deleted from all other routing tables maintained throughout the domain. Endpoint manager 750 then confirms the de-registration by issuing, as represented by line 2950, an H.323 Unregistration Confirm (UCF) message back to the gateway. Finally, endpoint manager 750 removes, as represented by line 2960, the endpoint.

Though we have described our inventive gateway as functioning with digital PBXs that rely on T1/E1 connections, the interfaces to the gateway can be readily modified by anyone skilled in the art to accommodate a wide range of different telephone subscriber line types and speeds, including analog plain old telephone (POTs) connections, DSL (digital subscriber line)—including ADSL (asymmetric DSL), and ISDN (integrated service digital network) connections.

Moreover, though we have described border elements as dynamically constructing their internal call routing tables based on on-going registration and deregistration of gateways and telephony endpoints in their corresponding administrative domains, these routing tables could alternatively be statically configured for each border element to simplify processing by eliminating or reducing a need for each border element to update its routing tables as a gateway(s) and/or other border element(s) establishes a service relationship with it and/or in response to an endpoint registering or de-registering with a gatekeeper in its domain, thus potentially expediting call routing through that former border element by eliminating latency associated with such updates.

Although a single, though rather detailed, embodiment which incorporates the teachings of the present invention has been shown and described in considerable detail herein, those skilled in the art can readily devise many other embodiments that still utilize these teachings.

We claim:

1. A protocol for use with a telephony gateway which routes a telephone call through either a public switched telephone network (PSTN) or a data network to a peer telephony gateway, the protocol comprising:

a plurality of H.323 messages which collectively convey call-specific data for the call then being routed between the telephony gateway and the peer gateway, wherein the data is carried through call independent signaling features of the messages and resides within nonstandard data fields in the messages, the data having flags and a call identifier, the call identifier being associated with and uniquely identifying the call and the flags indicating to the telephony gateway and the peer gateway whether the call can be automatically switched back and forth between the PSTN and the data network.

2. The protocol recited in claim 1 further comprising:

a setup message which is transmitted from the telephony gateway to the peer gateway to set up the call; and a responding message which is transmitted from the peer gateway to the telephony gateway and is issued in response to the setup message, the responding message containing, as part of the call-specific data, the call identifier which distinguishes said call from any other call then being handled by either the telephony gateway or the peer gateway.

3. The protocol recited in claim 2 wherein the setup message comprises an H.323 SETUP message and the responding message comprises either an H.323 CALL PROCEEDING or H.323 CONNECT message.

4. The protocol recited in claim 3 wherein the setup message contains a calling flag, the calling flag indicating whether the telephony gateway can switch the call between the PSTN and data network.

5. The protocol recited in claim 4 wherein the calling flag is contained within the nonstandard data field in the H.323 SETUP message.

6. The protocol recited in claim 5 wherein the responding message contains, as part of the call-specific data, both a called flag and the call identifier, and a pooled directory number associated with the peer gateway.

7. The protocol recited in claim 6 wherein each of the called flag, the call identifier and the pooled directory number is contained within a "nonstandard data" field in either the H.323 CALL PROCEEDING or H.323 CONNECT messages.

8. The protocol recited in claim 7 wherein the call identifier is generated by the peer gateway.

9. Apparatus for a telephony gateway for routing a telephony call through either a public-switched telephone network (PSTN) or a data network to a peer telephony gateway, comprising:
   (A) a processor;
   (B) a memory, connected to the processor and storing computer executable instructions therein; and
   (C) circuitry, controlled by and connected to the processor, for interfacing the gateway to the PSTN and the data network;
   (D) wherein the processor, in response to performing the executable instructions, communicates, through a protocol, with the peer gateway, to exchange call-specific data therebetween and to interact therewith so as to:
      (D1) establish, through the interface, a connection, through one of the PSTN and the data network, with the peer gateway and over which the call is to be carried for at least a portion of its duration; and
      (D2) establish a connection through the other one of the PSTN and the data network to the peer gateway and switch the call to said other one of the PSTN and the data network for another portion of the duration; and
      (D3) wherein the protocol comprises a plurality of H.323 messages which collectively convey call-specific data for the call then being routed between the telephony gateway and the peer gateway, wherein the data is carried through call independent signaling features of the messages and resides within nonstandard data fields in the messages, the data having flags and a call identifier, the call identifier being associated with and uniquely identifying the call and the flags indicating to the telephony gateway and the peer gateway whether the call can be automatically switched back and forth between the PSTN and the data network.

10. The apparatus recited in claim 9 wherein the protocol further comprises:
   a setup message which is transmitted from the telephony gateway to the peer gateway to set up the call; and
   a responding message which is transmitted from the peer gateway to the telephony gateway and is issued in response to the setup message, the responding message containing, as part of the call-specific data, the call identifier which distinguishes said call from any other call then being handled by either the telephony gateway or the peer gateway.

11. The apparatus recited in claim 10 wherein the setup message comprises an H.323 SETUP message and the responding message comprises either an H.323 CALL PROCEEDING or H.323 CONNECT message.

12. The apparatus recited in claim 11 wherein the setup message contains a calling flag, the calling flag indicating whether the telephony gateway can switch the call between the PSTN and data network.

13. The apparatus recited in claim 12 wherein the calling flag is contained within the nonstandard data field in the H.323 SETUP message.

14. The apparatus recited in claim 13 wherein the responding message contains, as part of the call-specific data, both a called flag and the call identifier, and a pooled directory number associated with the peer gateway.

15. The apparatus recited in claim 14 wherein each of the called flag, the call identifier and the pooled directory number is contained within a "nonstandard data" field in either the H.323 CALL PROCEEDING or H.323 CONNECT messages.

16. The apparatus recited in claim 15 wherein the call identifier is generated by the peer gateway.

17. The apparatus recited in claim 16 wherein the processor, in response to performing the executable instructions and as a result of exchanging, through the protocol, the call-specific data with the peer gateway forms a same association in both the telephony gateway and the peer gateway between the call and the call identifier.

18. The apparatus recited in claim 17 wherein the processor, in response to performing the executable instructions:
   dynamically measures at least one predefined characteristic of a data network connection extending from the gateway to the peer gateway, throughout a duration of the call so as to define quality of service (QoS); and
   issues the setup message to switch the call between the PSTN and the data network in response to a measured dynamic change in the QoS.

19. A method for use in a telephony gateway for routing a telephony call through either a public-switched telephone network (PSTN) or a data network to a peer telephony gateway, the gateway having a processor, a memory, connected to the processor and storing computer executable instructions therein, and circuitry, controlled by and connected to the processor, for interfacing the gateway to the PSTN and the data network, wherein the method comprises the steps, performed by the processor, in response to performing the executable instructions and through a protocol, of exchanging call-specific data with the peer gateway and interacting therewith so as to implement the following steps:
   establishing, through the interface, a connection, through one of the PSTN and the data network, with the peer gateway and over which the call is to be carried for at least a portion of its duration; and
   establishing a connection through the other one of the PSTN and the data network to the peer gateway and switching the call to said other one of the PSTN and the data network for another portion of the duration; and
   wherein the protocol comprises a plurality of H.323 messages which collectively convey call-specific data for the call then being routed between the telephony gateway and the peer gateway, wherein the data is carried through call independent signaling features of the messages and resides within nonstandard data fields in the messages, the data having flags and a call identifier, the call identifier being associated with and uniquely identifying the call and the flags indicating to the telephony gateway and the peer gateway whether the call can be automatically switched back and forth between the PSTN and the data network.

20. The method recited in claim 19 wherein the protocol further comprises:
  a setup message which is transmitted from the telephony gateway to the peer gateway to set up the call; and
  a responding message which is transmitted from the peer gateway to the telephony gateway and is issued in response to the setup message, the responding message containing, as part of the call-specific data, the call identifier which distinguishes said call from any other call then-being handled by either the telephony gateway or the peer gateway.

21. The method recited in claim 20 wherein the setup message comprises an H.323 SETUP message and the responding message comprises either an H.323 CALL PROCEEDING or H.323 CONNECT message.

22. The method recited in claim 21 wherein the setup message contains a calling flag, the calling flag indicating whether the telephony gateway can switch the call between the PSTN and data network.

23. The method recited in claim 22 wherein the calling flag is contained within the nonstandard data field in the H.323 SETUP message.

24. The method recited in claim 23 wherein the responding message contains, as part of the call-specific data, both a called flag and the call identifier, and a pooled directory number associated with the peer gateway.

25. The method recited in claim 24 wherein each of the called flag, the call identifier and the pooled directory number is contained within a "nonstandard data" field in either the H.323 CALL PROCEEDING or H.323 CONNECT messages.

26. The method recited in claim 25 wherein the call identifier is generated by the peer gateway.

27. The method recited in claim 26 further comprising the step, performed as a result of exchanging, through the protocol, the call-specific data with the peer gateway, of forming a same association in both the telephony gateway and the peer gateway between the call and the call identifier.

28. The method recited in claim 27 further comprising the steps of:
  dynamically measuring at least one predefined characteristic of a data network connection extending from the gateway to the peer gateway, throughout a duration of the call so as to define quality of service (QoS); and
  issuing the setup message to switch the call between the PSTN and the data network in response to a measured dynamic change in the QoS.

* * * * *

UNITED STATES PATENT AND TRADEMARK OFFICE
CERTIFICATE OF CORRECTION

PATENT NO. : 6,665,293 B2
DATED : December 16, 2003
INVENTOR(S) : Timothy R. Thornton et al.

It is certified that error appears in the above-identified patent and that said Letters Patent is hereby corrected as shown below:

<u>Column 65,</u>
Line 32, change "interface" to -- circuitry --; and

<u>Column 66,</u>
Line 48, change "interface" to -- circuitry --.

Signed and Sealed this

Third Day of May, 2005

JON W. DUDAS
*Director of the United States Patent and Trademark Office*